United States Patent
Jin

(10) Patent No.: US 11,160,279 B2
(45) Date of Patent: Nov. 2, 2021

(54) METHOD OF CONTROLLING HERBICIDE RESISTANT WEEDS

(71) Applicant: Sumitomo Chemical Company, Limited, Tokyo (JP)

(72) Inventor: Yoshinobu Jin, Kasai (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 17/014,359

(22) Filed: Sep. 8, 2020

(65) Prior Publication Data
US 2020/0396999 A1 Dec. 24, 2020

Related U.S. Application Data

(63) Continuation of application No. 16/134,435, filed on Sep. 18, 2018.

(30) Foreign Application Priority Data

Feb. 21, 2018 (JP) .............................. JP2018-028514

(51) Int. Cl.
| | | |
|---|---|---|
| *A01N 43/54* | (2006.01) | |
| *A01N 57/20* | (2006.01) | |
| *A01N 43/90* | (2006.01) | |
| *A01N 43/84* | (2006.01) | |

(52) U.S. Cl.
CPC ............. *A01N 43/54* (2013.01); *A01N 43/84* (2013.01); *A01N 43/90* (2013.01); *A01N 57/20* (2013.01)

(58) Field of Classification Search
CPC combination set(s) only.
See application file for complete search history.

(56) References Cited

U.S. PATENT DOCUMENTS

| | | | |
|---|---|---|---|
| 6,537,948 B1 | 3/2003 | Tohyama et al. | |
| 8,754,008 B2 | 6/2014 | Witschel et al. | |
| 8,987,167 B2 | 3/2015 | Xu et al. | |
| 9,629,366 B2 * | 4/2017 | Sievernich | A01N 43/10 |
| 2008/0227637 A1 * | 9/2008 | Guice | A01N 43/54 |
| | | | 504/128 |
| 2013/0143742 A1 * | 6/2013 | Ikeda | A01N 57/20 |
| | | | 504/128 |

FOREIGN PATENT DOCUMENTS

| | | |
|---|---|---|
| WO | WO 2017/202774 A1 | 11/2017 |
| WO | WO 2018/016635 A1 | 1/2018 |
| WO | WO 2018/016641 A1 | 1/2018 |
| WO | WO 2018/016643 A1 | 1/2018 |
| WO | WO 2018/019842 A1 | 2/2018 |
| WO | WO 2018/019845 A1 | 2/2018 |
| WO | WO 2018/021218 A1 | 2/2018 |
| WO | WO 2018/043764 A2 | 3/2018 |

OTHER PUBLICATIONS

Heap, I. et al., "Overview of glyphosate-resistant weeds worldwide," Pest Management Science, vol. 74, pp. 1040-1049 (2017).*
Salas-Perez, R. et al., "Frequency of Gly-210 deletion mutation among protoporphyrinogen oxidase inhibitor-resistant Palmer Amaranth (Amaranthus palmeri) populations," Weed Science, vol. 65(6), pp. 718-731, Abstract only (Nov. 2017).
International Search Report dated May 7, 2019 in International Application No. PCT/JP2019/005202.
Vranasi et al., "A Statewide Survey of PPO-Inhibitor Resistance and the Prevalent Target-Site Mechanisms in Palmer amaranth (Amaranthus palmeri) Accessions from Arkansas,"Weed Science, vol. 66, pp. 149-158 (2018).
Written Opinion dated May 7, 2019 in International Application No. PCT/JP2019/005202.
Grossmann, K. et al., "Saflufenacil (KixorTM): Biokinetic properties and mechanism of selectivity of a new protoporphyrinogen IX oxidase inhibiting herbicide," Weed Science, vol. 59, pp. 290-298 (2011).
Riar, D.S. et al., "Assessment of weed management practices and problem weeds in the midsouth United States—soybean: a consultant's perspective," Weed Technology, vol. 27(3), pp. 612-622 (2013).
Horak, et al., "Growth analysis of four Amaranthus species," Weed Science, vol. 48, pp. 347-355 (2000).
SHARPEN product label, BASF Corporation, Research Triangle Park, NC, pp. 1-19 (2011).

* cited by examiner

*Primary Examiner* — John Pak
(74) *Attorney, Agent, or Firm* — Oblon, McClelland, Maier & Neustadt, L.L.P.

(57) ABSTRACT

The present invention can provide a method having a high control effect on the removal of herbicide resistant weeds in a cultivation area for crops. The method includes a step of treating weeds with one or more of herbicides selected from the group consisting of saflufenacil, trifludimoxazin, flumioxazin, and ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate, wherein the herbicide resistant weeds are PPO-inhibitor resistant weeds having one or more mutations selected from the group consisting of an Arg128Met mutation, Arg128Gly mutation, Arg128His mutation, and Gly399Ala mutation in PPO.

1 Claim, No Drawings

METHOD OF CONTROLLING HERBICIDE RESISTANT WEEDS

CROSS-REFERENCE TO RELATED APPLICATION

This application is a continuation of and claims the benefit of priority to U.S. application Ser. No. 16/134,435, filed Sep. 18, 2018, which is based on and claims the benefits of priority to Japanese Application No. 2018-028514, filed on Feb. 21, 2018. The entire contents of these applications are incorporated herein by reference.

TECHNICAL FIELD

The present invention relates to a method of controlling herbicide resistant weeds.

BACKGROUND ART

Saflufenacil, trifludimoxazin, flumioxazin, and ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate are known as active ingredients for PPO inhibitors. It has been also disclosed that a certain type of PPO inhibitor controls PPO-inhibitor resistant *Amaranthus palmeri* having Gly210 deletion in PPO and PPO-inhibitor resistant ragweed having an Arg98Leu mutation.

PRIOR ART DOCUMENT

Patent Document

Patent Document 1: U.S. Pat. No. 6,537,948
Patent Document 2: U.S. Pat. No. 8,987,167
Patent Document 3: U.S. Pat. No. 8,754,008
Patent Document 4: WO2018/019842
Patent Document 5: WO2018/019845
Patent Document 6: WO2017/202774

SUMMARY OF THE INVENTION

Problems to be Solved by the Invention

It is an object of the present invention to provide a method having a high effect on the control of herbicide resistant weeds in a cultivation area for crops.

Means for Solving the Problems

The present invention relates to a method of controlling specific PPO-inhibitor resistant weeds by treating the weeds with one or more of herbicides selected from the group consisting of saflufenacil, trifludimoxazin, flumioxazin, and ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate.

The present invention includes the following aspects.

[1] A method of controlling herbicide resistant weeds, the method including a step of treating herbicide resistant weeds with one or more of herbicides selected from the group consisting of saflufenacil, trifludimoxazin, flumioxazin, and ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate, wherein the herbicide resistant weeds are PPO-inhibitor resistant weeds having one or more mutations selected from the group consisting of an Arg128Met mutation, Arg128Gly mutation, Arg128His mutation, and Gly399Ala mutation in PPO.

[2] The method of controlling herbicide resistant weeds according to the above [1], wherein the herbicide resistant weed is *Amaranthus palmeri*, waterhemp, or ragweed.

[3] The method of controlling herbicide resistant weeds according to the above [1] or [2], the method being performed in cultivation of a crop.

[4] The method of controlling herbicide resistant weeds according to the above [3], wherein the crop is a crop selected from the group consisting of a soybean, corn, cotton, rape seed, rice, wheat, barley, sugarcane, sugar beet, *sorghum*, and sunflower.

[5] The method of controlling herbicide resistant weeds according to the above [3] or [4], wherein the crop is a crop which is tolerant to saflufenacil, trifludimoxazin, flumioxazin, or ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate.

[6] The method of controlling herbicide resistant weeds according to any one of the above [1] to [5], wherein the herbicide resistant weed is a lactofen resistant weed or fomesafen resistant weed.

Effect of the Invention

Herbicide resistant weeds in a cultivation area for crops can be controlled by the method of controlling herbicide resistant weeds according to the present invention.

MODE FOR CARRYING OUT THE INVENTION

In the method of controlling herbicide resistant weeds according to the present invention, saflufenacil, trifludimoxazin, flumioxazin, or ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate is applied in a cultivation area for crops before, when, and/or after sowing crop seeds or in a non-cultivated field.

Examples of the crop in the present invention include corn, cotton, rape seed, rice, wheat, barley, sugarcane, sugar beet, *sorghum*, and sunflower. However, no limitation is imposed on the crop as long as it is a type which is usually cultivated as a crop.

The aforementioned plants may be plants producible by natural crossing, plants producible by a mutation, F1 hybrid plants, or transgenic plants (also called genetically modified plants). These plants generally have characteristics such as impartment of tolerance to herbicides, accumulation of substances harmful to pests, reduction in sensitivity to diseases, increase in yield potential, improvement in resistance to biological or non-biological stress factors, accumulation of substances, and improvement in preservability and processability.

The F1 hybrid plants are those which are each a first filial hybrid obtained by crossing two different varieties with each other and are usually those having characteristics superior in heterosis, that is a nature more excellent than both of the parents. The transgenic plants are those which are obtained by introducing an exogeneous gene from other organisms such as microorganisms and have characteristics like those that cannot be easily obtained by crossbreeding, mutation induction, or natural recombination in natural environments.

Examples of the technologies used to create the above plants include conventional type variety improvement; genetic recombination technologies; genome breeding technologies; new breeding technologies; and genome editing technologies. The conventional type variety improvement is specifically a technology for obtaining plants having desired properties by a spontaneous mutation and crossing. The genetic recombination technologies are technologies in which a target gene (DNA) is extracted from a certain organism (for example, microorganism) to introduce it into a genome of a different target organism, thereby new properties to the organism, and antisense technologies or RNA interference technologies for imparting new or improved characteristics by silencing other genes existing in plants. The genome breeding technologies are those improving breeding efficiency by using genome information and include DNA marker (also called genome markers or genetical markers) breeding technologies and genomic selection. For example, the DNA marker breeding is a method in which a progeny having a gene with a target and useful trait is selected from a lot of cross progenies by using a DNA marker which is a DNA sequence and is a target of the presence position of a gene with a specific useful trait on a genome. This method has the characteristics that the time required for breeding can be efficiently reduced by analyzing the cross progeny by using a DNA marker when the progeny is a juvenile plant.

Also, the genomic selection is a technique in which a prediction formula is created from a phenotype obtained in advance and genome information to predict the characteristics from the prediction formula and the genome information without any evaluation of the phenotype and is technologies contributing to improvement in efficient breeding. The new breeding techniques are a generic term of variety-improvement (=breeding) techniques that are combinations of molecular biological techniques. Examples of the new breeding techniques include cisgenesis/intragenesis, introduction of an oligonucleotide-directed mutation, RNA-dependent DNA methylation, genome editing, grafting onto a GM rootstock or scion, reverse breeding, agroinfiltration, and seed production technology (SPT). The genome editing technologies are those in which gene information is transformed in a sequence-specific manner which enables, for example, deletion of a base sequence, substitution of an amino sequence, and introduction of an exogenous gene. Examples of tools for these techniques include sequence-specific genome modification techniques such as zinc-finger nuclease (ZFN), TALEN, CRISPR/Cas9, CRISPER/Cpfl, and Meganuclease which each enable sequence-specific DNA scission and CAS9 Nickase and Target-AID which are each created by modifying the aforementioned tools.

Examples of the plants mentioned above include plants listed in GM APPROVAL DATABASE of genetically modified crops in the electronic information site (http://www.isaaa.org/) of INTERNATIONAL SERVICE for the ACQUISITION of AGRI-BIOTECH APPLICATIONS (ISAAA). More specifically, these examples include herbicide tolerant plants, harmful insect tolerant plants, disease tolerant plants, and quality modified (for example, increase or decrease in content or change in composition) plants of products (for example, starch, amino acid, and fatty acid), fertile trait modified plants, abiotic stress tolerant plants, or plants modified in traits relating to growth and yield.

Examples of plants having tolerance to herbicides are given as follows.

The mechanism of tolerance to herbicides is obtained, for example, by reducing the compatibility of a chemical with its target, by rapid metabolism (for example, breakdown or modification) resulting from the expression of a chemical deactivation enzyme, or by inhibiting the incorporation of a chemical into a plant body or the transfer of the chemical in the plant body.

The plants to which herbicide tolerance is imparted by genetic recombination technologies include plants to which tolerances to the following inhibitors are imparted by genetic recombination technologies: 4-hydroxyphenyl pyruvate dioxygenase (hereinafter abbreviated as HPPD) inhibitors such as isoxaflutole and mesotrione, acetolactate synthetase (hereinafter: abbreviated as ALS) inhibitors such as imidazolinone type herbicides containing imazethapyr and sulfonylurea type herbicides containing thifensulfuron-methyl, 5-enolpyruvylshikimate-3-phosphate synthase (hereinafter abbreviated as EPSP) inhibitors such as glyphosate, glutamine synthetase inhibitors such as glufosinate, auxin type herbicides such as 2,4-D and dicamba, and oxynil type herbicides containing bromoxynil. Preferable examples of the transgenic plants tolerant to herbicides include cereals such as wheat, barley, rye, and oats, and canola, sorghum, soybean, rice, rape seed, sugar beet, sugarcane, grape, lentil, sunflower, alfalfa, pome fruits, stone fruits, coffee, tea, strawberry, turf grass, and vegetables such as tomato, potato, cucumber, and lettuce, and among them, cerealns such as wheat, barley, rye, and oats and soybean, rice, vine, tomato, potato, and pome fruits are more preferable.

Examples of the Herbicide Tolerant Plants are Shown Below:

Glyphosate herbicide tolerant plants: which are obtained by introducing one or more of a glyphosate tolerant EPSPS gene (CP4 epsps) derived from *Agrobacterium tumefaciens* strain CP4, glyphosate metabolism enzyme gene (gat4601, gat4621) obtained by strengthening the metabolism activity of a glyphosate metabolism enzyme (glyphosate N-acetyltransferase) gene derived from *Bacillus licheniformis* by shuffling technologies, glyphosate metabolism enzyme (glyphosate oxidase) gene (goxv247) derived from *Ochrobacterum anthropi* strain (LBAA), or EPSPS gene (mepsps, 2mepsps) having a glyphosate tolerance mutation derived from corn. Examples of main plants include alfalfa (*Medicago sativa*), Argentine canola (*Brassica napus*), cotton (*Gossypium hirsutum* L.), creeping bentgrass (*Agrostis stolonifera*), corn (*Zea mays* L.), polish canola (*Brassica rapa*), potato (*Solanum tubeHDDrosum* L.), soybean (*Glycine max* L.), sugar beet (*Beta vulgaris*), and wheat (*Triticum aestivum*). Some of these glyphosate resistant transgenic plants are commercially available. For example, genetically modified plants expressing glyphosate tolerant EPSPS genes derived from *Agrobacterium* strains are commercially available under the names including "Roundup Ready (registered trademark)", genetically modified plants expressing a glyphosate metabolism enzyme which is derived from *Bacillus subtilis* and obtained by strengthening its metabolism activity by shuffling technologies are commercially available under the names of "Optimum (registered trademark) GAT (trademark)", "Optimum (registered trademark) Gly canola", and the like. Genetically modified plants expressing the EPSPS genes having a glyphosate tolerance mutation derived from corn are commercially available under the name of "GlyTol (trademark)".

Glufosinate herbicide tolerant plants: which are obtained by introducing one or more of a phosphinothricin N-acetyltransferase (PAT) gene (bar) which is a glufosinate metabolism enzyme derived from *Streptomyces hygroscopicus*, phosphinothricin N-acetyltransferase (PAT) enzyme gene (pat) which is a glufosinate metabolism enzyme derived from *Streptomyces viridochromogenes*, and a synthesized pat gene (pat syn) derived from *Streptomyces viridochro-*

*mogenes* strain Tu494. Examples of main plants include Argentine canola (*Brassica napus*), chicory (*Cichorium intybus*), cotton (*Gossypium hirsutum* L.), corn (*Zea mays* L.), polish canola (*Brassica rapa*), rice (*Oryza sativa* L.), soybean (*Glycine max* L.), and sugar beet (*Beta vulgaris*). Some of these glufosinate tolerant transgenic plants are commercially available. For example, genetically modified plants derived from a glufosinate metabolism enzyme (bar) derived from *Streptomyces hygroscopicus* and genetically modified plants derived from *Streptomyces viridochromogenes* are commercially available under the names including "LibertyLink (trademark)", "InVigor (trademark)", and "WideStrike (trademark)". Oxynil type herbicides (for example, bromoxynil" tolerant plants: there are oxynil type herbicides, for example, bromoxynil tolerant transgenic plants, which are obtained by introducing a nitrilase gene (bxn) which is an oxynil type herbicide (for example, bromoxynil) metabolism enzyme derived from *Klebsiella pneumoniae* subsp. *Ozaenae*). Examples of main plants include Argentine canola (*Brassica napus*), cotton (*Gossypium hirsutum* L.), and tobacco (*Nicotiana tabacum* L.). These plants are commercially available under the names including "Navigator (trademark) canola" and "BXN (trademark)". There are also the following plants commercially available under the following names: ALS herbicide tolerant plants: carnations (*Dianthus caryophyllus*) "Moondust (trademark)", "Moonshadow (trademark)", "Moonshade (trademark)", "Moonlite (trademark)", "Moonaqua (trademark)", "Moonvista (trademark)", "Moonique (trademark)", "Moonpearl (trademark)", "Moonberry (trademark)", and "Moonvelvet (trademark)" obtained by introducing an ALS herbicide tolerant ALS gene (surB) derived from tobacco (*Nicotiana tabacum*) as a selective marker; Flax (*Linum usitatissumum* L.) "CDC Triffid Flax" obtained by introducing an ALS herbicide tolerant ALS gene (als) derived from thale cress (*Arabidopsis thaliana*); Corn (*Zea mays* L.) "Optimum (trademark) GAT (trademark)" which is obtained by introducing an ALS herbicide tolerant ALS gene (zm-hra) derived from corn and is tolerant to sulfonylurea-type and imidazolinone-type herbicides; Soybean "Cultivance" which is obtained by introducing an ALS herbicide tolerant ALS gene (csr1-2) derived from thale cress and is tolerant to imidazolinone type herbicides; and Soybean "Treus (trademark)", "Plenish (trademark)", and "Optimum GAT (trademark)", which is obtained by introducing an ALS herbicide tolerant ALS gene (gm-hra) derived from soybean (*Glycine max*) and is tolerant to sulfonylurea type herbicides. Also, cotton is available into which an ALS herbicide tolerant ALS gene derived from tobacco (*Nicotiana tabacum* cv. *Xanthi*) is introduced. HPPD herbicide tolerant plants: soybean into which mesotrione tolerant HPPD genes (avhppd-03) derived from oats (*Avena sativa*) and phosphinothricin N-acetyltransferase (PAT) enzyme genes (pat) tolerant to phomesotrione which is a glufosinate metabolism enzyme derived from *Streptomyces viridochromogenes* are both introduced is commercially available under the name of "Herbicide-tolerant Soybean line (trademark)".

2,4-D tolerant plants: corn obtained by introducing aryloxyalkanoate dioxygenase genes (aad-1) which are a 2,4-D metabolism enzyme derived from *Sphingobium herbicidovorans* is commercially available under the name of "Enlist (trademark) maize". There are soybean and cotton obtained by introducing an allyloxyalkanoate dioxygenase gene (aad-12) which is a 2,4-D metabolism enzyme derived from *Delftia acidovorans* and these plants are commercially available under the name of "Enlist (trademark) Soybean".

Dicamba tolerant plants: there are soybean and cotton obtained by introducing a Dicamba monooxygenase gene (dmo) which is a dicamba metabolism enzyme derived from *Stenotrophomonas maltophilia* strain DI-6. Soybean (*Glycine max* L.) obtained by introducing, in addition to the above gene, a glyphosate tolerant type EPSPS gene (CP4 epsps) derived from *Agrobacterium tumefaciens* strain CP4 is commercially available under the name of "Genuity (registered trademark) Roundup Ready (trademark) 2 Xtend (trademark)".

Examples of commercially available products of the transgenic plants to which herbicide tolerance is imparted include glyphosate tolerant corn: "Roundup Ready Corn", "Roundup Ready 2", "Agrisure GT", "Agrisure GT/CB/LL", "Agrisure GT/RW", "Agrisure 3000GT", YieldGard VT Rootworm/RR2", and "YieldGard VT Triple"; glyphosate resistant soybean: "Roundup Ready Soybean" and "Optimum GAT"; glyphosate tolerant cotton: "Roundup Ready Cotton" and "Roundup Ready Flex"; glyphosate tolerant canola: "Roundup Ready Canola"; glyphosate tolerant alfalfa "Roundup Ready Alfalfa"; glyphosate tolerant rice: "Roundup Ready Rice"; glufosinate tolerant corn: "Roundup Ready 2", "Liberty Link", "Herculex 1", "Herculex RW", "Herculex Xtra", "Agrisure GT/CB/LL", "Agrisure CB/LL/RW", and "Bt10"; glufosinate tolerant cotton: "FiberMax Liberty Link"; glufosinate tolerant rice: "Liberty Link Rice" (product from Bayer); glufosinate tolerant canola: "InVigor"; bromoxynil tolerant cotton: "BXN"; bromoxynil tolerant canola: "Navigator" and "Compass". Further plants modified in respect to herbicides are widely known. Examples of these plants include glyphosate tolerant plants such as alfalfa, apple, barley, *eucalyptus*, flax, grape, lentil, rape seed, pea, potato, rice, sugar beet, sunflower, tobacco, tomato, turf grass, and wheat (see, for example, U.S. Pat. Nos. 5,188,642, 4,940,835, 5,633,435, 5,804,425, and 5,627,061); dicamba tolerant plants such as bean, cotton, soybean, pea, potato, sunflower, tomato, tobacco, corn, *sorghum*, and sugarcane (see, for example, WO2008051633, U.S. Pat. Nos. 7,105,724, and 5,670,454); glufosinate tolerant plants such as soybean, sugar beet, potato, tomato, and tobacco (see, for example, U.S. Pat. Nos. 6,376,754, 5,646, 024, and 5,561,236); 2,4-D resistant plants such as cotton, peppers, apple, tomato, sunflower, tobacco, potato, corn, cucumber, wheat, soybean, *sorghum*, and cereal crops (see, for example, U.S. Pat. Nos. 6,153,401, 6,100,446, WO2005107437, U.S. Pat. Nos. 5,608,147, and 5,670,454); plants resistant to acetolactate synthase (ALS) inhibitors (for example, sulfonylurea type herbicides and imidazolinone type herbicides) such as canola, corn, millet, barley, cotton, Indian mustard, lettuce, lentil, melon, millet, oat, rape seed, potato, rice, rye, *sorghum*, soybean, sugar beet, sunflower, tobacco, tomato, and wheat (see, for example, U.S. Pat. No. 5,013,659, WO2006060634, U.S. Pat. Nos. 4,761,373, 5,304,732, 6,211,438, 6,211,439, and 6,222,100), particularly, rice tolerant to imidazolinone type herbicides is well known, and rice and the like having specific mutations (for example, S653N, S654K, A122T, 5653(At)N, 5654(At)K, A122(At)T) in an acetohydroxyacid synthase gene are well known (see, for example, US 2003/0217381 and WO200520673); and plants resistant to HPPD inhibitors (for example, isoxazole type herbicides such as isoxaflutole, triketone type herbicides such as sulcotrione and mesotrione, pyrazole type herbicides such as pyrazolynate, and diketonitrile which is a degradation product of isoxaflutole), such as barley, sugarcane, rice, corn, tobacco, soybean, cotton, rape seed, sugar beet, wheat, and potato (see, for example, WO2004/055191, WO199638567, WO1997049816 and U.S. Pat. No. 6,791,014).

Examples of plants to which herbicide tolerance is imparted classically or by genome breeding technologies include rice "Clearfield Rice", wheat "Clearfield wheat", sunflower "Clearfield Sunflower", lentil (Clearfield lentils", and canola "Clearfield canola" (BASF products), which are each tolerant to imidazolinone type ALS inhibitors such as imazethapyr and imazamox; soybean "STS soybean" tolerant to sulfonyl type ALS inhibitors such as thifensulfuron methyl; sethoxydim tolerant corn "SR corn" and "Poast Protected (registered trademark) corn" having tolerance to acetyl CoA carboxylase inhibitors such as trione-oxime type or aryloxyphenoxypropionate type herbicides; sunflower "ExpressSun (registered trademark)" having tolerance to sulfonylurea type herbicides such as tribenuron; rice "Provisia (trademark) Rice" having tolerance to acetyl CoA carboxylase inhibitors such as quizalofop; and canola "Triazinon Tolerant Canola" having tolerance to a PSII inhibitor.

Examples of plants to which herbicide tolerance is imparted by genome editing technologies include canola "Su Canola (registered trademark)" having tolerance to sulfonylurea type herbicides and which are developed using Rapid Trait Development System (RTDS) (registered trademark). This RTDS (registered trademark) is a technology corresponding to the introduction of an oligonucleotide-directed mutation in genome editing technologies and is a technology enabling the introduction of a mutation through Gene Repair Oligonucleotide (GRON), that is, DNA-RNA chimeric oligonucleotide without cutting of DNA in the plant. Also, herbicide tolerant corn reduced in phytic acid content by using zinc finger nuclease to delete an endogenous gene IPK1 (see, for example, Nature 459, 437-441, 2009); and an example in which herbicide tolerance is imparted to rice by using CRISPR/Cas9 are given (see, for example, Rice, 7, 5 2014).

In the present invention, examples of the crops tolerant to specific PPO inhibitors include those provided with PPO reduced in compatibility with the inhibitors by genetic recombination technologies. Or, a substance which can detoxify and decompose these PPO inhibitors by the aid of cytochrome P450 monooxygenase may be contained either independently or in combination with the above PPO. These tolerant crops are described in patent documents such as WO2011085221, WO2012080975, WO2014030090, WO2015022640, WO2015022636, WO2015022639, WO2015092706, WO2016203377, WO2017198859, WO2018019860, WO2018022777, WO2017112589, WO2017087672, WO2017039969, WO2017023778, and non patent documents (Pest Management Science, 61, 2005, 277-285).

With regard to the plants to which herbicide tolerance is imparted, examples in which the nature of a rootstock is transferred to a scion in breeding technologies utilizing grafting include an example in which glyphosate tolerance is imparted to a scion of non-transgenetic soybean by using Roundup Ready (registered trademark) soybean having glyphosate tolerance as the rootstock (see, Weed Technology 27:412-416, 2013).

Examples of plants to which pest resistance is imparted are shown below.

Examples of plants to which resistance to lepidopterous pests is imparted by genetic recombination technologies include plants such as corn (*Zea mays* L.), soybean (*Glycine max* L.), cotton (*Gossypium hirsutum* L.), rice (*Oryza sativa* L.), poplar (*Populus* sp.), tomato (*Lycopersicon esculentum*), and eggplant (*Solanum melongena*), each obtained by introducing a gene encoding δ-endotoxin which is an insecticidal protein derived from *Bacillus thuringiensis* (hereinafter abbreviated as Bt bacteria) which is soil bacteria. Examples of the δ-endotoxin imparting resistance to lepidopterous pests include Cry1A, Cry1Ab, modified Cry1Ab (partially deficient Cry1Ab), Cry1Ac, Cry1Ab-Ac (hybrid protein of combined Cry1Ab and Cry1Ac), Cry1C, Cry1F, Cry1Fa2 (modified cry1F), moCry1F (modified Cry1F), Cry1A.105 (hybrid protein of combined Cry1Ab, Cry1Ac, and Cry1F), Cry2Ab2, Cry2Ae, Cry9C, Vip3A, and Vip3Aa20. Examples of plants to which resistance to coleopterous pests is imparted by genetic recombination technologies include plants such as corn and potato, each obtained by introducing a gene encoding δ-endotoxin which is an insecticidal protein derived from Bt bacteria which are soil bacteria. Examples of the δ-endotoxin imparting resistance to coleopterous pests include Cry3A, mCry3A (modified Cry3A), Cry3Bb1, Cry34Ab1, and Cry35Ab1. Examples of plants to which resistance to dipterous pests is imparted by genetic recombination technologies include plants such as genetically modified corn (*Zea mays* L.) obtained by introducing a synthesized gene encoding a hybrid protein eCry3.1Ab of a combination of Cry3A and Cry1Ab derived from Bt bacteria which are soil bacteria, and genetically modified cotton (*Gossypium hirsutum* L.) obtained by introducing a gene encoding a trypsin inhibitor CpTI derived from cowpea (*Vigna unguiculate*). Further examples include genetically modified poplar obtained by introducing a gene encoding API which is a protease inhibitor protein A derived from arrowhead (*Sagittaria sagittifolia*). These plants have tolerance to a wide range of pests.

The insecticidal proteins imparting pest resistance to plants include hybrid proteins of the above insecticidal proteins, partially deficient proteins, and modified proteins. The hybrid proteins are produced by a combination of different domains of a plurality of insecticidal proteins and for example, Cry1Ab-Ac and Cry1A.105 are known. As the partially deficient proteins, Cry 1Ab deficient in a part of amino acid sequences is known. As the modified proteins, Cry1Fa2, moCry1F, mCry3A, and the like are known that are proteins in which one or plural amino acids of natural type δ-endotoxin are substituted. Also, in the amino acid substitution like this, a protease recognition sequence which does not exist in nature is preferably inserted into toxin as shown in the case (see WO2003/018810) of Cry3A055.

Monsanto Company has developed cotton (event MON88702) obtained by introducing a modified BT protein Cry51Aa2 (Cry51Aa2.83416) by genetic recombination technologies and the cotton has resistance to genus *Lygus* such as *Lygus lineolaris*, *Hemiptera* such as aphid and *Thysanoptera* such as genus *Frankliniella*.

Other than the above, examples of the insecticidal protein imparting pest resistance to plants by genetic recombination technologies include insecticidal proteins derived from *Bacillus cereus* or *Bacillus popilliae*, vegetable proteins Vip1, Vip2, Vip3, and Vip3A derived from Bt bacterium strain AB88, insecticidal proteins derived from nematode symbiotic (forms a colony in nematode) bacteria, for example, *Photorhabdus* spp. such as *Photorhabdus luminescens* and *Xenorhabdus nematophilus* and *Xenorhabdus* spp. such as *Xenorhabdus nematophilus*, toxins produced from animals having neurotoxins specific to insects, such as a scorpion toxin, spider toxin, and bee toxin, toxins of filamentous fungi such as a Streptomycetes toxin, vegetable lectin such as pea lectin, barley lectin, and snowdrop lectin, protease inhibitors such as agglutinin, trypsin inhibitor, serine protease inhibitor, protease inhibitors such as patatin, cystatin, and papain inhibitor, ribosome inactivation proteins (RIP) such as lysine, corn-RIP, abrin, luffin, saporin, and bryodin, steroid metabolism enzymes such as 3-hydroxysteroidoxydase, ecdysteroid-UDP-glucosyltransferase, and cholesterol oxidase, ion channel inhibitors such as an ecdysone inhibitor, HMG-CoA-reductase, and sodium channel or calcium channel inhibitor, juvenile hormone esterase, diuretic hormone receptor, stilbene synthase, bibenzyl synthase, chitinase, and glucanase.

Plants to which pest resistance is imparted by introducing one or two or more insecticidal protein genes have been already known and some of these plants are commercially available. Examples of cotton having pest resistance include "Bollgard (trademark) cotton", "BXN (trademark) Plus Bollgard (trademark) Cotton", "BXN (trademark) Plus Bollgard (trademark) Cotton", "JK 1", "Roundup Ready (trademark) Bollgard (trademark) Cotton", and "Ingard (trademark)", which each express an insecticidal protein Cry1Ac derived from Bt bacteria, "Herculex (trademark) I" and "Herculex (trademark) CB", which each express an insecticidal protein modified Cry1F (Cry1Fa2) derived from Bt bacteria; "VIPCOT (trademark) Cotton" expressing an insecticidal protein Vip3A derived from Bt bacteria; "Bollgard II (trademark) cotton", "Roundup Ready (trademark) Bollgard II (trademark) Cotton", "Roundup Ready (trademark) Flex (trademark) Bollgard II (trademark) Cotton" and "Fivermax (trademark) Liberty Link (trademark) Bollgard II (trademark)", which each express insecticidal proteins Cry1Ac and Cry2Ab derived from Bt bacteria; "Bollgard III (registered trademark) cotton" and "Bollgard (registered trademark) III x Roundup Ready (trademark) Flex (trademark)", which express insecticidal proteins Cry1Ac, Cry2Ab, and Vip3A derived from Bt bacteria, "VIPCOT (trademark) Roundup Ready Flex (trademark) Cotton" expressing insecticidal proteins Vip3A and Cry1Ab derived from Bt bacteria; "VIPCOT (registered trademark)" expressing insecticidal proteins Vip3A and Cry1Ac derived from Bt bacteria; "WideStrike (trademark) Cotton", "WideStrike (trademark) Roundup Ready (trademark) Cotton", and "Widestrike (trademark) Roundup Ready Flex (trademark) Cotton", which express insecticidal proteins Cry1Ac and Cry1F derived from Bt bacteria; "VIPCOT (trademark) Cotton expressing an insecticidal protein Vip3A derived from Bt bacteria; "Twinlink (trademark) Cotton" and "Glytol (trademark) x Twinlink (trademark), which express insecticidal proteins Cry1Ab and Cry2Ae derived from Bt bacteria; "Widestrike (registered trademark) 3" and "Widestrike (trademark) x Roundup Ready Flex (trademark) x VIPCOT (trademark) Cotton", which express insecticidal proteins Cry1Ac, Cry1F, and Vip3A derived from Bt bacteria; and "Glytol (trademark) x Twinlink (trademark) x VIPCOT (trademark) Cotton" expressing insecticidal proteins Cry1Ab, Cry2Ae, and Vip3A derived from Bt bacteria.

Examples of the corn having pest resistance include "YieldGard (registered trademark) Rootworm RW", "YieldGard (trademark) RW+RR", "YieldGard (trademark) VT (trademark) Rootworm (trademark) RR2", and "MaxGard (trademark)", which express an insecticidal protein Cry3Bb1 derived from Bt bacteria; "YieldGard (registered trademark) VT Triple" and "YieldGard (trademark) Plus with RR", which express insecticidal proteins Cry3Bb1 and Cry1Ab derived from Bt bacteria; "Bt Xtra (trademark) Maize" expressing an insecticidal protein Cry1Ac derived from Bt bacteria; "YieldGard Plus (registered trademark)" expressing insecticidal proteins Cry1Ab and Cry3Bb1 derived from Bt bacteria; "Bt10", "Liberty Link (trademark) Yieldgard (trademark) Maize", "Agrisure (trademark) GT/CB/LL", and "YieldGard (trademark) CB+RR" expressing an insecticidal protein Cry1Ab derived from Bt bacteria; "YieldGard (trademark) VT Pro (trademark)" and "Genuity (registered trademark) VT Double Pro (trademark)", which express insecticidal proteins Cry1A. 105 and Cry2Ab2 derived from Bt bacteria; "Agrisure (registered trademark) RW" and "Agrisure (trademark) GT/RW", which express an insecticidal protein mCry3A derived from Bt bacteria; "Starlink (trademark) Maize" expressing an insecticidal protein Cry9C derived from Bt bacteria; "YieldGard (trademark)", "MaizeGard (trademark)", "NaturGard KnockOut (trademark)", "Maximizer (trademark)", "Roundup Ready (trademark) YieldGard (trademark) Maize", "Agrisure (trademark) CB/LL", and "Mavera (trademark) YieldGard (trademark) Maize", which express an insecticidal protein Cry1Ab derived from Bt bacteria; "Agrisure (registered trademark) 3122" expressing insecticidal proteins Cry1Ab, Cry1F, modified Cry3A, Cyr34Ab1, and Cyr35Ab1 derived from Bt bacteria; "Agrisure (registered trademark) Viptera" expressing an insecticidal protein Vip3Aa20 derived from Bt bacteria; "Agrisure (registered trademark) Viptera (trademark) 2100" and "Agrisure (registered trademark) Viptera (trademark) 3110", which express insecticidal proteins Vip3Aa20 and Cry1Ab derived from Bt bacterial; "Agrisure (registered trademark) Viptera (trademark) 3100", "Agrisure (registered trademark) Viptera (trademark) 3111" and "Agrisure (registered trademark) Viptera (trademark) 4", which express insecticidal proteins Vip3Aa20, Cry1Ab, and modified Cry3A derived from Bt bacteria; "Agrisure (registered trademark) Viptera (trademark) 3220" expressing insecticidal proteins Vip3Aa20, Cry1Ab, and modified Cry1F derived from Bt bacteria; "Agrisure (registered trademark" Duracade (trademark)" expressing an insecticidal protein eCry3.1Ab (Cry3A-Cry1Ab chimera protein) derived from Bt bacteria; "Agrisure (registered trademark) Duracade (trademark) 5122" expressing insecticidal proteins eCry3.1Ab (Cry3A-Cry1Ab chimera protein), modified Cry3A, Cry1Ab, and modified Cry1F derived from Bt bacteria; "Agrisure (registered trademark) Duracade (trademark) 5222" expressing insecticidal proteins eCry3.1Ab (Cry3A-Cry1Ab chimera protein), modified Cry3A, modified Cry1Ab, and Vip3A variant derived from Bt bacteria; "Herculex (trademark) RW" expressing insecticidal proteins Cyr34Ab1 and Cyr35Ab1 derived from Bt bacteria; "Herculex XTRA (trademark)" expressing insecticidal proteins Cyr34Ab1, Cyr35Ab1, and Cry1F derived from Bt bacteria; "Genuity (registered trademark) VT Triple Pro (trademark)" expressing insecticidal proteins Cry1A. 105, Cry2Ab2, and Cry3Bb1 derived from Bt bacteria; "Genuity (registered trademark) SmartStax (trademark)" expressing insecticidal proteins Cry1F, Cry2Ab, Cyr34Ab1, Cyr35Ab1, Cry3Bb1, and Cry1A. 105 derived from Bt bacteria; "Power Core (trademark)" expressing insecticidal proteins, modified Cry1F, Cry2Ab, and Cry1A. 105 derived from Bt bacteria; "Herculex XTRA (trademark) RR" expressing insecticidal proteins Cry1F, Cyr34Ab1, and Cyr35Ab1 derived from Bt bacteria; "Optimum (registered trademark) Intrasect Xtreme" expressing insecticidal proteins, modified Cry1F, Cyr34Ab1, Cyr35Ab1, Cry1Ab, and modified Cry3A derived from Bt bacteria; "Optimum (registered trademark) Intrasect XTRA" expressing insecticidal proteins, modified Cry1F, Cyr34Ab1, Cyr35Ab1, and Cry1Ab derived from Bt bacteria; and "Optimum (registered trademark) TRIsect" expressing insecticidal proteins, modified Cry1F and modified Cyr3A derived from Bt bacteria: these products being all commercially available.

Examples of other plants having pest resistance include potato "Atlantic NewLeaf (trademark) potato", "NewLeaf (trademark) Russet Burbank potato", "Lugovskoi plus", "Elizaveta plus", "Hi-Lite NewLeaf (trademark) Y potato", "Superior NewLeaf (trademark) potato", and "Shepody NewLeaf (trademark) Y potato", which express an insecticidal protein Cry3A derived from Bt bacteria; rice "hanyou 63" and "Huahui-1", which express insecticidal proteins Cry1Ab and Cry1Ac derived from Bt bacteria; soybean "Intacta (trademark) Roundup Ready (trademark) 2 Pro" expressing an insecticidal protein Cry1Ac derived from Bt bacteria; and eggplant "BARI Bt Begun-1, -2, -3, and -4" expressing an insecticidal protein Cry1Ac derived from Bt bacteria, these products being each commercially available.

Specifically, the following plant products are available: corn "YieldGard corn rootworm" and "YieldGard VT", "Herculex RW" and "Herculex Rootworm", and "Agrisure CRW", which have resistance to corn rootworms; corn "YieldGard corn borer", "YieldGard plus" and "YieldGard VT Pro", "Agrisure CB/LL" and "Agrisure 3000GT", "Hercules I", and "Hercules II", "KnockOut", "NatureGard", and "StarLink", which have resistance to corn borers; corn "Herculex I" and "Herculex Xtra", "NewLeaf", "NewLeaf Y", and "NewLeaf Plus", which have resistance to western bean cutworms, corn borers, black cutworms, and fall armyworms; corn "YieldGard Plus" having resistance to corn borers and corn rootworms; cotton "Bollgard I" and "Bollgard II", which have resistance to *Heliothis virescens*; cotton "Bollgard II", "WideStrike", and "VipCot", which have resistance to *Heliothis virescens*, cotton bollworms, fall armyworms, beet armyworms, cabbage loopers, soybean loopers, and pink bollworms; potato "NewLeaf", "NewLeaf Y", and "NewLeaf Plus", which have resistance to *Manduca sexta*; and eggplant "Bt brinjal", "Dumaguete Long Purple", and "Mara", which have resistance to *Leucimodes orbonalis*, fruit borers, and cotton bollworms; (see, for example, U.S. Pat. No. 5,128,130).

Further plants having insecticidal resistance are usually known and examples of these plants include rice having resistance to yellow rice borers (see, for example, Molecular Breeding, vol 18 (2006), No. 1), lettuce having resistance to *Lepidoptera* (see, for example, U.S. Pat. No. 5,349,124), soybean having resistance to *Lepidoptera* (see, for example, U.S. Pat. No. 7,432,421), and rice having resistance to *Lepidoptera* (for example, *Chilo suppressalis, Parnara guttata, Sesamia inferens, Cnaphalocrocis medinalis*, rice caseworm, and rice armyworm) (see, for example, WO2001021821). The methods of manufacturing such plants are generally well-known to a person skilled in the art and these plants are disclosed in the above publications.

As plants to which pest resistance is imparted by RNA interference technologies, corn resistant to *Lepidoptera* insect pests (for example, corn borers, cutworms such as corn earworms and black cutworms, and fall armyworms) and *Coleoptera* insect pests (corn rootworms) is commercially available or is developed under the names of "SmartStax (registered trademark)", "SmartStax (registered trademark) Pro", "Genuity (registered trademark) SmartStax".

Examples of plants to which pest resistance is imparted classically or by genome breeding technologies include aphid resistant soybean having a Rag1 (Resistance Aphid Gene 1) gene; soybean having resistance to Cysto nematode; cotton having resistance to Root Knot nematode; rice "Kanto BPH No. 1" having resistance to *Nilaparvata lugens*; and soybean "FUKUNOMINORI" having resistance to *Spodoptera litura*.

Resistance to optional insect pests (especially *Lepidoptera* insects, *Coleoptera* insects, and *Diptera* insects), noxious arachnids, and noxious nematodes are imparted to plants to which resistance to these pests is imparted. Plants to which pest resistance is imparted are preferably selected from cereal crops (for example, wheat, barley, rye, and oat); corn, canola, *sorghum*, soybean, rice, rape seed, sugar beet, sugarcane, grape, lentil, sunflower, alfalfa, kernel fruits; stone fruits; peanuts; coffee; tea; strawberries; turf grass; vegetables (for example, tomato, potato, plants of the family Cucurbitaceae, and lettuce), more preferably selected from soybean, corn, tomatoes, rice, and cereal crops (for example, wheat, barley, rye, and oat), and even more preferably selected from soybean, rice, corn, and cereal crops (for example, wheat, barley, rye, and oat).

Examples of the plants to which disease tolerance is imparted are given below.

Plants to which disease tolerance is imparted by genetic recombination technologies are those expressing so-called "pathogen related proteins" (PRP, see, for example, EP0392225) or so-called "antifungal proteins" (AFP, see, for example, U.S. Pat. No. 6,864,068). Various antifungal proteins having activity to plant pathogenic fungi are isolated from specific plants and become commonly used. Examples of such pathogenic substances and plants enabling synthesis of these plant pathogenic substances are well known from EP0392225, WO1993/05153, WO1995/33818, and EP0353191. Plants resistant to fungicidal pathogens, viral pathogens, and bacterial pathogens are produced by introducing plant resistant genes. Many resistant genes are identified and isolated, and then, used to improve plant resistance. However, examples of the resistant genes include N genes (see, for example U.S. Pat. No. 5,571,706) introduced into a type of tobacco sensitive to TMV to produce a tobacco plant resistant to tobacco mosaic virus (TMV), Prf genes (see, for example, WO 199802545) introduced into a plant to obtain strengthened pathogenic resistance, and Rps2 genes (see, for example, WO 199528423) derived from thale cress (*Arabidopsis thaliana*) and used to create resistance to bacterial pathogens such as *Pseudomonas syringae*. Plants exhibiting systematic acquired resistance response was obtained by introducing a nucleic acid molecule encoding the TIR domain of N genes (see, for example, U.S. Pat. No. 6,630,618). Further examples of known resistant genes include Xa21 genes (see, for example, U.S. Pat. Nos. 5,952,485, 5,977,434, WO1999/09151, and WO1996/22375) introduced into many rice varieties, Rcg1 genes (see, for example, US2006/225152) and prp1 genes (see, for example, U.S. Pat. No. 5,859,332 and WO 2008017706) for *Colletotrichum* resistance, ppv-cp genes (see, for example, US PP15,154Ps) and P1 genes (see, for example, U.S. Pat. No. 5,968,828) to introduce resistance to Plum pox virus, genes such as Blb1, Blb2, Blb3, RB2, and Rpi-vnt1 (see, for example, U.S. Pat. No. 7,148,397) and LRPKml genes (see, for example, WO1999064600) to introduce resistance to *Phytophthora infestans* in potato, P1 genes (see, for example, U.S. Pat. No. 5,968,828) and HA5-1 genes (see, for example, U.S. Pat. Nos. 5,877,403 and 6,046,384) for resistance to potato virus Y, PIP genes (see, for example, EP0707069) to introduce a wide range of resistance to viruses such as potato virus X (PVX), potato virus Y (PVY), and potato leafroll virus (PLRV), and genes such as NI16 genes, ScaM4 genes, and ScaM5 genes (see, for example, U.S. Pat. No. 6,706,952 and EP1018553) of thale cress (*Arabidopsis*) to obtain fungus resistance. Common beans having resistance to Bean golden mosaic virus (hereinafter referred to as BGMV) are plants to which the resistance is imparted by RNA interference (hereinafter referred to as RNAi) technologies and in which double stranded RNA genes (sense and antisense act genes) of a replication protein are introduced to inhibit the synthesis of replication protein of BGMV, thereby exhibiting resistance to BGMV. The methods of manufacturing such plants are generally well-known to a person skilled in the art and are described in the above publications.

Examples of antipathogenic substances which can be expressed by these plants include ion channel blockers (for example, a sodium channel blocker and calcium channel blocker), for example, a viral KP1, KP4, or KP6 toxin; stilbene synthase; bibenzyl synthase; chitinase; glucanase; so-called "pathogenic related protein" (PRP: see, for example, EP0392225); antipathogenic substances produced by microorganisms, for example, peptide antibiotics or heterocyclic antibiotics (see, for example, WO1995/33818) or a protein factor or polypeptide factor (so-called "plant disease resistant genes" described in WO2003/000906) relating to plant pathogen protection.

Antipathogenic substances produced by plants can protect the plants from various pathogens such as true fungi, virus, and bacteria. Useful plants arousing increased interest in relation to the present invention are selected from cereal crops (for example, wheat, barley, rye, and oat), soybean, corn, rice, rape seed, kernel fruits, stone fruits, peanut, coffee, tea, strawberry, and turf grass, and vegetables (for example, tomato and potato), cucurbits, *papaya*, melon, lenses, and lettuce, preferably from soybean, tomato, rice, and cereal crops (for example, wheat, barley, rye, and oat), and more preferably from soybean, rice, and cereal crops (for example, wheat, barley, rye, and oat).

Examples of Plants having resistance to fungal pathogens include soybean (see, for example, WO 2008017706) having resistance to Asian soybean rust; solanaceous plants such as cotton, tomato, and potato (see, for example, U.S. Pat. Nos. 5,859,332, 7,148,397, and EP1334979) having resistance to *Phytophthora infestans*; corn (see, for example, US2006/225152) having resistance to the genus *Colletotrichum* such as *Colletotrichum graminicola*, apple (see, for example, WO1999064600) having resistance to *Venturia inaequalis*; plants, for example, rice, wheat, barley, rye, corn, oat, potato, melon, soybean, *sorghum* (see, for example, U.S. Pat. No. 6,646,184 and EP1477557) having resistance to *Fusarium* diseases (for example, *Fusarium graminearum, Fusarium sporotrichioides, Fusarium lateritium, Fusarium pseudograminearum, Fusarium sambucinum, Fusarium culmorum, Fusarium poae, Fusarium acuminatum,* and *Fusarium equiseti*); and plants such as corn, soybean, cereal crops (particularly, wheat, rye, barley, oat, and rice), tobacco, *sorghum*, sugarcane, and potato (see, for example, U.S. Pat. Nos. 5,859,332, 5,689,046, 6,706,952, EP1018553, and U.S. Pat. No. 6,020,129), which have a wide range of fungicidal resistance.

Plants having resistance to bacterial pathogens and plants covered by the present invention include rice having resistance to *Xylella fastidiosa* (see, for example, U.S. Pat. No. 6,232,528); plants such as rice, cotton, soybean, potato, *sorghum*, corn, wheat, barley, sugarcane, tomato, and pepper (see, for example, WO2006/42145, U.S. Pat. Nos. 5,952, 485, 5,977,434, WO1999/09151, and WO1996/22375), which have resistance to bacterial blight; and tomato (see, for example, Can. J. Plant Path., 1983, 5:251-255) having resistance to *Pseudomonas syringae*.

Examples of plants having resistance to viral pathogens include kernel fruits (for example, plum, almond, apricot, cherry, peach, and nectarine) having resistance to Plum pox virus (PPV, see, for example, US PP15154Ps and EP0626449); potato (see, for example, U.S. Pat. No. 5,968, 828) having resistance to potato virus Y; plants such as potato, tomato, cucumber, and leguminous plants, which have resistance to tomato spotted with virus (TSWV, see, for example, EP0626449 and U.S. Pat. No. 5,973,135); corn having resistance to corn streak disease virus (see, for example, U.S. Pat. No. 6,040,496); *papaya* having resistance to *papaya* ringspot virus (PRSV, see, for example, U.S. Pat. Nos. 5,877,403 and 6,046,384); plants of the family Cucurbitaceae (for example, cucumber, melon, watermelon, and pumpkin) and solanaceous plants (for example, potato, tobacco, tomato, eggplant, paprika, *capsicum*, and pepper), which have resistance to cucumber mosaic virus (CMV, see, for example, U.S. Pat. No. 6,849,780); plants of the family Cucurbitaceae (for example, cucumber, melon, watermelon, and pumpkin) (see, for example, U.S. Pat. No. 6,015,942), which have resistance to watermelon mosaic potyvirus 2 (WMV2) and zucchini yellow mosaic potyvirus (ZYMV); potato having resistance to potato leafroll virus (PLRV, see, for example, U.S. Pat. No. 5,576,202); potato (see, for example, EP0707069) having a wide range of resistance to virus such as potato virus X (PVX), potato virus Y (PVY), and potato leafroll virus (PLRV); and common bean (see, for example, Mol Plant Microbe Interact. 2007 June; 20(6):717-26.) having resistance to Bean golden mosaic virus.

There are plants having resistance to antibiotics (for example, kanamycin, neomycin, and ampicillin). A naturally derived bacterium nptII gene expresses an enzyme that blocks the effect of antibiotics kanamycin and neomycin. A gene ampR (also known as blaTEM1) that is an ampicillin resistant gene is derived from bacteria *Salmonella paratyphi* and is used as a marker gene in the transformation of microorganisms and plants. The ampR participates in the synthesis of β-lactamase that is an enzyme which neutralizes antibiotics of a penicillin group including ampicillin. Examples of plants having resistance to antibiotics include potato, tomato, flax, canola, rape seed, cole seed, and corn (see, for example, Plant Cell Reports, 20, 2001, 610-615, Trends in Plant Science, 11, 2006, 317-319, Plant Molecular Biology, 37, 1998, 287-296, Mol Gen Genet., 257, 1998, 606-13. Plant Cell Reports, 6, 1987, 333-336, Federal Register (USA), vol 60, No. 113, 1995, P31139, Federal Register (USA), vol 67, No. 226, 2002, P70392, Federal Register (USA), vol 63, No. 88, 1998, P25194, Federal Register (USA), vol 60, No. 141, 1995, P37870, Canadian Food Inspection Agency, FD/OFB-095-264-A, October, 1999, and FD/OFB-099-127-A, October, 1999). The above plants are selected preferably from soybean, tomatoes, and cereal crops (for example, wheat, barley, rye, and oat) and most preferably from soybean and cereal crops (for example, wheat, barley, rye, and oat).

As available plants to which resistance to plant virus is imparted, there are products including *papaya* "Rainbow", "SunUp", and Huanong No. 1" to which resistance to *Papaya* ringspot virus is imparted; potato "Innate (registered trademark) Hibernate", "Innate (registered trademark) Glaciate", and "Innate (registered trademark) Acclimate" having resistance to *Phytophthora infestans*; and potato "Newleaf (trademark)" having resistance to potato virus Y and/or potato leafroll virus (PLRV).

Examples of plants to which disease tolerance is imparted classically or by genome breeding technologies include rice to which tolerance to blast (*Magnaporthe oryzae*) is imparted; rice to which tolerance to sheath blight disease (*Rhizoctonia solani*) is imparted; wheat to which tolerance to red rust (*Puccinia triticina*) is imparted; wheat to which tolerance to yellow rust (*Puccinia striiformis* f. sp. *tritici*) is imparted; wheat to which tolerance to black rust (*Puccinia graminis* f. sp. *tritici*) is imparted; wheat to which tolerance to powdery mildew (*Blumeria graminis* f. sp. *tritici*) is imparted; wheat to which tolerance to speckled leaf blotch (*Zymoseptoria tritici*) is imparted; wheat to which tolerance to glume blotch (*Stagonospora nodorum*) is imparted; wheat to which tolerance to yellow spot (*Pyrenophora tritic-repentis*) is imparted; barley to which tolerance to powdery mildew (*Blumeria graminis* f. sp. *hordei*) is imparted; barley to which tolerance to small rust (*Puccnia hordei*) is imparted; barley to which tolerance to net blotch (*Pyrenophora teres*) is imparted; barley to which tolerance to scald (*Rhynchosporium commune*) is imparted; barley to which tolerance to *Rammularia* disease (*Ramularia collo-cygni*) is imparted; corn to which tolerance to anthrax (Anthracnose stalk rot) is imparted; corn to which tolerance to Gray leaf spot disease (Gray leaf spot) is imparted; corn to which tolerance to bacterial blight (Goss's wilt) is imparted; corn to which tolerance to foot rot (*Fusarium* stalk rot) is imparted; soybean to which tolerance to Asian soybean rust is imparted; soybean to which tolerance to soybean stem and root blight (*Phytophthora* rot) is imparted; soybean to which tolerance to Sudden death syndrome is imparted; pepper to which tolerance to plague (*Phytophthora*) is imparted; lettuce to which tolerance to powdery mildew is imparted; tomato to which tolerance to bacterial wilt is imparted; tomato to which tolerance to Geminivirus is imparted; lettuce to which tolerance to Downy mildew is imparted; cruciferous plants such as rape seed, cabbage, brussels sprout, cauliflower, collard greend (Borekale), and broccoli to which tolerance to Clubroot is imparted; cruciferous plants such as rape seed, cabbage, brussels sprout, cauliflower, collard greend (Borekale), and broccoli to which tolerance to Black leg is imparted; and melon to which tolerance to melon *Fusarium* wilt caused by *Fusarium oxysporum* f. sp. *melonis* is imparted (see, for example, WO2009000736).

Examples of plants to which disease tolerance is imparted classically or by genome breeding technologies include bread wheat (see, for example, Nat. Biotech., 32,947-951, 2014) made resistant to powdery mildew by using TALEN and CRISPR/Cas9 to delete powdery mildew resistant genes (MILDEW RESISTACE LOCUS O, hereinafter abbreviated as MLO); slmlol tomato (Tomelo) (see, for example, Scientific Reports 7, Article number: 482, 2017) made tolerant to powdery mildew by using CRISPR/Cas9 to delete a S1MLO1 gene that is one of MLO; rice (see, for example, Nat. Biotechnol. 30, 390-392, 2012) made tolerant to *Xanthomonas oryzae* pv. *Oryzae* causing rice bacterial leaf blight by using TALEN to undergo edition of OsSWEET 14 genes in rice; rice (see PLoS ONE 11:e0154027. doi: 10.1371/journal.pone.0154027, 2016) made tolerant to *Magnaporthe oryzae* causing rice blast by using CRISPR/Cas9 to modify OsERF922 genes in rice; cucumber (see Mol. Plant Pathol. 17, 7 1140-1153, 2016) made tolerant to cucumber vein yellow ingvirus(CVYV), zucchini yellow mosaic virus (ZYMV), and *papaya* ringspot virus-typeW (PRSV-W) by using CRISPR/Cas9 to degrade a recessive eIF4E (eukaryote translation initiation factor 4E) gene; and soybean (see Mol Plant Pathol 17(1)127-39, 2016) made tolerant to *Phytophthora* root and stem rot caused by *Phytophthora sojae*, by using CRIPR/Cas9 to degrade RXLR effecter genes (Avr4/6).

Examples of plants to which disease tolerance is imparted by new breeding technologies include apple (see, for example, Plant Biotech. J., 12, 2-9, 2014) into which Rvi6 (previously called HcrVf2) gene having tolerance to Apple scab caused by *Venturia inaequalis* is introduced by using cisgenesis and which has tolerance to Apple scab; and sweet cherry (see, Plant Biotech. J., 12, 1319-1328, 2014) prepared by grafting in which a transgenic rootstock having tolerance to the infection of *Prunus* necrotic ringspot virus transfers its tolerant nature to a nontransgenic scion as an example of transferring the nature of a rootstock to a scion in breeding technologies utilizing grafting.

Example of plants in which contents in these plants are modified are given below.

The modification of contents in a plant implies increase and decrease in synthesis of modified compounds or synthetic amount of chemical substances as compared with the corresponding wild-type plants. There are, for example, modified plants increased or decreased in the contents of vitamins, amino acids, proteins, and starch, and various oils and modified plants reduced in nicotine content.

Examples of plants modified in content by genetic recombination technologies include alfalfa reduced in lignin content by RNA interference effects produced by introducing a double strand RNA of S-adenosyl-L-methionine:trans-caffeoyl CoA-methyltransferase (ccomt) gene derived from alfalfa relating to lignin production; canola "Laurical (trademark) Canola" increased in the content of triacylglyceride containing lauric acid by introducing 12:0 ACP thioesterase derived from laurier (*Umbellularia californica*) relating to fatty acid synthesis; soybean "Plenish (trademark)" or "Treus (trademark)" increased in oleic acid content through reduction of gene expression by introducing a partial gene sequence (gm-fad2-1) of co-6 desaturase which is an unsaturated enzyme of fatty acid and is derived from soybean; Soybean "Vistive Gold (trademark)" reduced in fatty acid content by introducing a gene creating a double strand DNA of an acyl-acyl carrier-protein-thioesterase gene (fatbl-A) derived from soybean and a gene creating a double strand DNA of a δ-12 desaturase gene (fad2-1A) derived from soybean; genetically modified soybean increased in the content of ω3 fatty acid by introducing a δ-6 desaturase gene (Pj.D6D) derived from primrose and δ-12 desaturase gene (Nc. Fad3) derived from red bread mold; corn "Enogen (registered trademark)" increased in productivity of bioethanol by introducing a heat resistant α-amylase gene (amy797E) of *Thermococcales* sp. relating to amylolysis; corn "Mavera (trademark) Maize" and "Mavera (trademark) YieldGard (trademark) Maize" increased in productivity of lysin by introducing a dihydrodipicolinate synthetase gene (cordapA) derived from *Corynebacterium glutamicum* relating to the production of lysin that is an amino acid; potato "Amflora (trademark)" and "Starch Potato" decreased in amylose content and increased in amylopectin content in starch particles by introducing an antisense gene gbss of starch synthetase (granule-bound starch synthase enzame, GBSS) derived from potato; potato "Innate (registered trademark) Cultivate", "Innate (registered trademark) Generate", "Innate (registered trademark) Accelerate", "Innate (registered trademark) Invigorate", "Innate (registered trademark) Glaciate", "Innate (registered trademark) Acclimate", and "Innate (registered trademark) Hibernate" reduced in amylolysis by introducing genes pPhL and pR1 creating a double strand RNA of transcription factor genes PhL and R1 promoting amylolysis and derived from potato, reduced in the synthesis of asparagine (for the purpose of reducing the accumulation of asparagine and reducing sugar relating to the generation of acrylamide that is a carcinogenic substance and is generated by heating), and reduced in black spot formation by introducing a gene PPO5 creating a double strand RNA of polyphenol oxidase gene PPO5 derived from potato; tobacco reduced in nicotine content by introducing an antisense gene (NtQPT1) of quinolinate phosphoribosyltransferase QpTase derived from tobacco (*Nicotiana tabacum*); and Golden rice that is a rice plant which produces β-carotene in its albumen tissue and can harvest rice containing vitamin A by introducing a phytoene synthetase gene (psy) derived from daffodil (*Narcissus pseudonarcissus*) and carotene-desaturase gene (crt1) derived from soil bacteria (*Erwinia uredovora*) synthesizing carotenoid to express in a way specific to albumen. Other examples of plants modified in content by genetic recombination technologies include potato and corn (see, for example, U.S. Pat. No. 6,784,338, US20070261136, and WO199704471) modified in amylopectin content; canola, corn, cotton, grape, cattail, *catalpa*, rice, soybean, rape seed, wheat, sunflower, bitter gourd, safflower, and *vernonia* plants (see, for example, U.S. Pat. Nos. 7,294,759, 7,157,621, 5,850,026, 6,441,278, 5,723,761, 6,380,462, 6,365,802, 6,974,898, WO2001079499, US20060075515, and U.S. Pat. No. 7,294,759), which are modified in oil content; sunflower (see, for example, U.S. Pat. No. 6,084,164) increased in in fatty acid content; soybean (see, for example, U.S. Pat. No. 6,864,362) decreased in allergen content; tobacco (see, for example, US20060185684, WO2005000352, and WO2007064636) reduced in nicotine content; canola and soybean (see, for example, Bio/Technology 13, 1995, 577-582) increased in lysin content; corn and soybean (see, for example, U.S. Pat. Nos. 6,946,589 and 6,905,877) modified in the compositions of methionine, leucin, isoleucine, and valine; soybean (see, for example, EP0929685 and WO1997041239) increased in the content of sulfur amino acid; tomato (see, for example, U.S. Pat. No. 6,727,411) increased in the content of free amino acid (for example, asparagine, aspartic acid, serine, threonine, alanine, histidine, and glutamic acid); corn (see WO05077117) increased in amino acid content; potato, corn, and rice (see, for example, WO1997044471 and U.S. Pat. No. 7,317,146) modified in starch content; tomato, corn, grape, alfalfa, apple, pulses, and pea (see, for example, WO0004175) modified in flavonoid content; corn, rice, *sorghum*, cotton, and soybean (see, for example, US20080235829) modified in the amount of phenolic compound; tomato and canola (see, for example, U.S. Pat. Nos. 6,797,498 and 7,348,167) increased in the content of vitamin A; tomato, canola, soybean, wheat, sunflower, rice, corn, barley, and rye (see, for example, U.S. Pat. No. 7,348,167 and WO2004058934) increased in the amount of vitamin E; and alfalfa, apple, bean, corn, grape, tomato, and pea (see, for example, WO0004175) modified in flavonoid content. The methods of manufacturing such plants are generally well-known to a person skilled in the art and these plants are, for example, disclosed in the above publications. These plants are preferably selected from soybean, canola, tomatoes, rice, and cereal crops (for example, wheat, barley, rye, and oat) and more preferably from soybean, canola, rice, wheat, and barley.

As plants modified in content either classically or by genome breeding technologies, rape seed "Nexera (registered trademark) Canola" producing unsaturated co-9 fatty acid; soybean "Yumeminori" reduced in allergen content; and rice developed with the intension of improving taste, for example, rice "Yumepirika" reduced in amylose content are commercially available. Also, citrus fruits modified in fruit characteristics (weight, amount of fragrance, succulence, and sugar content of fruit) by genomic selection (see, Scientific Reports 7, 4721, 2017).

Plants modified in plant nutrient utilization are those improved in assimilation or metabolization of nitrogen or phosphorus. Plants having nitrogen assimilation ability and nitrogen utilization ability enhanced by genetic recombination technologies are selected from canola, corn, wheat, sunflower, rice, tobacco, soybean, cotton, alfalfa, tomato, wheat, potato, sugar beet, sugarcane, and rape seed (see, for example, WO1995009911, WO1997030163, U.S. Pat. Nos. 6,084,153, 5,955,651, and 6,864,405). Plants improved in phosphorous uptake by genetic recombination technologies include alfalfa, barley, canola, corn, cotton, tomato, rape seed, rice, soybean, sugar beet, sugarcane, sunflower, wheat, and potato (see, for example, U.S. Pat. No. 7,417,181 and US 20050137386). The methods of manufacturing such plants are generally known to a person skilled in the art and these plants are, for example, disclosed in the above publications. These plants are preferably selected from soybean, tomato, and cereal crops (for example, wheat, barley, rye, and oat) and more preferably from soybean, rice, corn, and wheat.

As plants modified in fertility trait and the like by genetic recombination technologies, plants to which male sterility and fertility restoring traits are imparted are exemplified. Examples of these plants include corn and chicory to which a male sterility trait is imparted by expressing a ribonuclease gene (barnase) derived from *Bacillus amyloliquefaciens* in tapetum cells of an anther; corn to which male sterility trait is imparted by introducing a DNA adeninemethylase gene (dam) derived from *Escherichia coli*; corn controlled in fertility trait by introducing an α-amylase gene (zm-aal) derived from corn imparting a male sterility trait and a ms45 protein gene (ms45) derived from corn imparting a fertility restoring trait; canola to which fertility restoring ability is imparted by expressing a ribonuclease inhibitory protein gene (barstar) derived from *Bacillus* in tapetum cells of an anther; and canola controlled in a fertility trait by expressing a ribonuclease gene (barnase) derived from *Bacillus* imparting a male sterility trait and a ribonuclease inhibitory protein gene (barstar) derived from *Bacillus* imparting a fertility restoring trait. Other examples of plants to which a fertility trait is imparted by genetic recombination technologies include tomato, rice, Indian mustard, wheat, soybean, and sunflower (see, for example, U.S. Pat. Nos. 6,720,481, 6,281,348, 5,659,124, 6,399,856, 7,345,222, 7,230,168, 6,072,102, EP1135982, WO2001092544, and WO1996040949). The methods of manufacturing such plants are generally known to a person skilled in the art and these plants are, for example, disclosed in the above publications. These plants are preferably selected from corn, canola, soybean, tomatoes, and cereal crops (for example, wheat) and most preferably from corn, canola, soybean, rice, and wheat.

Plants to which non-biological stress tolerance is imparted are those increased in tolerance to nonbiological stress condition such as drought, high salt content, high light intensity, high UV irradiation, chemical contamination (for example, high concentrations of heavy metals), low or high temperature, limited supply of nutrients, and collective stress (see, for example, WO200004173, WO2007131699, CA2521729, and US20080229448).

Examples of plants to which non-biological stress tolerance is imparted include rice, corn, soybean, sugarcane, alfalfa, wheat, tomato, potato, barley, rape seed, bean, oak, *sorghum*, and cotton, which have tolerance to drought (see, for example, WO2005048693, WO2008002480, and WO 2007030001); corn, soybean, wheat, cotton, rice, rape seed, and alfalfa, which have tolerance to low temperature (see, for example, U.S. Pat. No. 4,731,499 and WO2007112122); and rice, cotton, potato, soybean, wheat, barley, rye, *sorghum*, alfalfa, grape, tomato, sunflower, and tobacco, which have tolerance to high salt content (see, for example, U.S. Pat. Nos. 7,256,326, 7,034,139, and WO/2001/030990). Examples of these plants also include corn "DroughtGard (registered trademark)" (product from Monsanto) into which a cold shock protein gene cspB of *Bacillus subtilis* is introduced.

As the plants to which abiotic stress tolerance is imparted either classically or by genetic recombination technologies, for example, corn having drought tolerance are commercially available under the names of "Agrisure Artesian (registered trademark) and "Optimum (registered trademark) AQUAmax (trademark)".

The modifications of maturation characteristics are, for example, delayed maturation, delayed softening, and acceleration of maturation. Examples of plants modified in maturation characteristics by genetic recombination technologies include melon and tomato improved in shelf life by introducing a S-adenosylmethionine hydrolase gene (sam-K) derived from colon *bacillus* bacteriophage T3 relating to generation of ethylene of a plant hormone, tomato improved in shelf life by introducing a partially deficient ACC synthetase gene derived from tomato relating to generation of ethylene of a plant hormone, an Acc deaminase gene derived from *Pseudomonas chlororaphis* which degrades ACC that is an ethylene precursor, a gene generating a double strand RNA of a polygalacturonase gene which is derived from tomato and degrades cell wall pectin, or ACC oxidase gene derived from tomato relating to generation of ethylene, and tomato "FLAVR SAVR (trademark)" improved in shelf life by introducing a gene pg generating a double strand RNA of a polygalacturonase gene derived from tomato. Other examples of plants modified by genetic recombination technologies include tomato, melon, raspberry, strawberry, mask melon, pepper, and *papaya* which are each produced by way of delayed maturation (see, for example, U.S. Pat. Nos. 5,767,376, 7,084,321, 6,107,548, 5,981,831, WO1995035387, U.S. Pat. Nos. 5,952,546, 5,512,466, WO1997001952, WO1992/008798, Plant Cell. 1989, 53-63. Plant Molecular Biology, 50, 2002). The methods of manufacturing such plants are generally known to a person skilled in the art and these plants are, for example, disclosed in the above publications. These plants are preferably selected from fruits (tomato, climbing plants, melon, *papaya*, banana, pepper, raspberry, and strawberry); stone fruits (for example, cherry, apricot, and peach); kernel fruits (for example, apple and European pear); and citrus fruits (for example, citron, lime, orange, shaddock, grape fruits, and mandarin) and more preferably from tomato, melon, *papaya*, climbing plants, apple, banana, orange, and strawberry, and tomato, melon, and *papaya* are most preferable.

Examples of plants modified in other qualities by genetic recombination technologies include canola "Phytaseed (registered trademark) Canola" improved in the degradation of endogenous phytic acid by introducing a 3-phytase gene (phyA) derived from *Aspergillus niger* that is an enzyme that breaks down plant phytic acid; carnation "Moondust (trademark)", "Moonshadow (trademark)", "Moonshade (trademark)", "Moonlite (trademark)", "Moonaqua (trademark)", "Moonvista (trademark)", "Moonique (trademark)", "Moonpearl (trademark)", "Moonberry (trademark)", and "Moonvelvet (trademark)" controlled to change each flower color to blue by introducing a dihydroflavonol-4-reductase gene derived from *petunia* (*Petunia hybrida*) that is an enzyme producing delphinidin that is a blue pigment and its derivative or a flavonoid-3',5'-hydroxylase gene derived from *petunia*, pansy (*Viola wittrockiana*), salvia (*Salvia splendens*), or carnation; rose controlled to change each flower color to blue by introducing an anthocyanin-5-acyl-transferase gene derived from *Torenia* (*Torenia* sp.) that is an enzyme producing delphinidin that is a blue pigment and its derivative and a flavonoid-3,5'-hydroxylase gene derived from pansy; genetically modified rice having pollinosis deactivation effect associated with an immunotolerance action by introducing an antigen protein gene (7crp) of modified cedar pollen; corn improved in the degradation of endogenous phytic acid by introducing a 3-phytase gene (phyA) derived from *Aspergillus niger*; and cotton producing high-quality fibers improved in fiber micronaire, fiber strength increase, length uniformity, and color (see, for example, WO 1996/26639, U.S. Pat. Nos. 7,329,802, 6,472, 588, and WO 2001/17333).

Examples of plants modified in plant growth and yield include plants improved in growing ability. As plants modified by genetic recombination technologies, soybean has been developed which is improved in plant growth with the expectation of resultant high yield by introducing a gene (bbx32) encoding a transcription factor controlling daily periodicity specific to thale cress; and corn has been also developed which is increased in female panicle weight with the expectation of resultant high yield by introducing a transcription factor gene (athb17) belonging to homeodomain-leucine 14 zipper (HD-Zip) family, class II (HD-Zip II) derived from thale cress.

Examples of plants modified in quality by genome editing technologies include corn "ZFN-12 maize" reduced in phytic acid content by using zinc finger nuclease to delete an IPK1 gene encoding inositol-1,3,4,5,6-pentakisphosphate 2-kinase that is a phytic acid synthetic enzyme; and mushroom to which browning tolerance is imparted by using CRISPR-Cas9 to delete a gene encoding a polyphenol oxidase (see, for example, Nature., Vol 532, 21 APRIL, 2016).

Examples of plants modified in quality by new breeding technologies include apple "Arctic (registered trademark)" which is reduced in polyphenol oxidase expression level and is resistant to browning by using cisgenesis to introduce low polyphenol oxidase (enzyme causing browning) production gene sequence GEN-03 isolated from apples into a new apple variety; and an example (see, for example, Physiol Plantarum, 124, 465-475, 2005) in which salt tolerance is imparted to a nontransgenic tomato scion by using a tomato rootstock having salt tolerance as an example in which the nature of a rootstock is transferred to a scion in variety improvement technologies utilizing grafting.

With regard to rice, genes are known which have tolerance to many diseases, noxious insects, and abiotic stress and resistant varieties obtained by introducing these tolerance factors are enthusiastically made. As examples of genes having tolerance to rice diseases and abiotic stress, *Nilaparvata lugens* resistant genes such as BPH1, BPH2, BPH3, BPH4, BPH5, BPH6, BPH7, BPH8, BPH9, BPH10, BPH11, BPH12, BPH13, BPH14, BPH15, BPH17, BPH18, BPH19, BPH20, BPH21, BPH22, BPH23, BPH24, BPH25, BPH26, BPH27, BPH28, BPH29, BPH32, qBPH-12, qBPHR-1, qBPHR-3, qBPHR-8, qBPHR-5-1qBPHR-5-2qBPHR-11-1, qBPHR-11-2; *Sogatella furcifera* resistant species such as WBPH1, WBPH2, WBPH3, WBPH4, WBPH5, WBPH6, OVC, qOVA-5-2, qOVA1-3, qOVA5-1; *Laodelphax striatella* resistant genes such as Qsbph2b, Qsbph3, Qsbph3b, Qsbph3c, Qsbph3d, Qsbph4, Qsbph8, Qsbph11, Qsbph11d, Qsbph11e, Qsbph11f, Qsbph11g, Qsbph12a; sidewinder resistant genes such as GLH, GLH1, GLH3, GLH4, GLH5, GLH6, GLH7, GLH8, GLH9, GLH10, GLH11, GLH12, GLH13, GRH1, GRH2, GRH3, GRH4, GRH5, Zlh1, Zlh2, Zlh3, qGRH-4, qGRH-2, qGRH-5, qGRH-6, qGRH-11, qGRH-3; *Chilo suppressails* resistant genes such as SB; rice blast resistant genes such as Pii, PI65, PIZT, PI24, PI29, PI25, Pi-jnw1, PB1, PIQ6, PID3, PI67, PITQ5, PITP, PITQ6, PLM2, PISE3, IPI, PISE1, PI157, PIQ4, PI21, PIA, PIB, PIK, PIKUR1, PIKUR2, PI3, PIF, PIZH, PIR4, PIR7, PI30, PI, PIGD2, PIG, PIGD3, PIGD1, PIZ, PI(, PI18, PIM, PI17, PI20, PI1, PI19, PI5, PISH, PI10, PI9, PI21, PI22, PI44, PI22, PI13, PII, PIB1, PIQ1, PIQ2, PIQ3, PIIS1, PII2, PI62, PII2, IPI3, PI14, PI15, PI16, PIT, PI11, PI6, PI23, PI14, PI11, PIIS2, PIB2, PI12, PI39, PI40, PITA, PIR2-3, PIR9-2, PIR12-2, PIRF2-1, qRBR-2, qRBR-3, PI27, PI28, PI26, PIGM, PI47, PI48, PI7, PI56, PI49, PI34, PIKG, PI38, PI32, PI31, PI46, PIX, PIXY, Pita3, PI41, PI42, PI2, PI36, PI37, PIKH, PIKM, PIKP, PI35, PIZS, PIB2, PI43, PI50, PI51, PID1, PIY1, PIY2, PI55-2, PIC039, PI55-1, PIBH8, PIR7A, PIR7B, PID2, PI33, qBFR4-1, qBFR4-2, qRBR-2, qRBR-3, qRBR-8, qRBR-1-1, qRBR-1-3, qRBR-7-1, qRBR-7-2, qRBR-9-1, qRBR-9-2, qRBR-9-3, qRBR-1-2, qRBR-1-4; leaf stripe disease resistant genes such as STVA, STVB, and Stvb-i; leaf bright resistant genes such as XA21D, XA, XA40, XA NM, XA8, XA33, XA34, XA35, XA36, XA37, XA7, XA3, XA25, XA28, XA29, XA30, XA31, XA32, XA38, XA39, XA11, XA16, XA17, XA18, XA19, XA20, XA14, XA2, XA12, XA1, XA K, XA A, XA H, XA10, XA23, XA22, XA24, XA21, SERRT13, XA4, XA5, XA13; sheath blight disease resistant genes such as qSB-2, qSB-3, qSB-7, qSB-11, and qSB-9-1; brown spot resistant genes such as CE; yellow dwarf resistant genes such as YDV; black streaked dwarf resistant genes such as BSV; high-temperature ripening resistant genes such as Amy1A, Amy1C, Amy3A, and Amy3B; low-amylose genes such as du13, qAC9.3, rsr1, Wx, and Wx1-1; lodging resistant genes such as AP01, SCM2, and Sd1; sprouting resistant genes such as Sdr4; low-temperature resistant genes such as CTB1, CTB2, and qLTG3-1; drought tolerant genes such as Dro1; genes such as DEP1, Cn1a, GPS, SPIKE, PTB1, TAWAWA1, WFP, IPA1, GS3, GS5, GS6, GL3.1, GW2, GW8, qGL3, qSS7, and qSW5 which relate to chaff number or seed form; genes controlling photoperiod-insensitivity such as Hd1, Ghd8, and DTH8; endosperm mealiness genes such as FLO4 and PDIL1; lipoxygenase deletion (reducing old-rice smell) genes such as LOX3; and genes such as Alk relating to amylopectin chain length are known. Rice varieties into which one or two or more of these genes are incorporated simultaneously are developed and put on the market.

The above plants include plant lines having two or more natures specific to parent lines by crossing a line added with two or more of the properties like those mentioned above, for example, abiotic stress tolerance, disease tolerance, herbicide tolerance, pest tolerance, growth and yield traits, nutrient-uptake, product qualities, and sterility trait with a plant of the same kind, or with a plant having different natures by using genetic recombination technologies, classical breeding technologies, genome breeding technologies, new breeding technologies, or genome editing technologies.

Examples of commercially available plants to which tolerance to two or more herbicides is imparted include cotton "GlyTol (trademark) LibertyLink (trademark)" and "GlyTol (trademark) LibertyLink (trademark)" having tolerance to glyphosate and glufosinate; corn "Roundup Ready (trademark) LibertyLink (trademark) Maize" having tolerance to glyphosate and glufosinate; soybean "Enlist (trademark) Soybean" having tolerance to glufosinate and 2,4-D; soybean "Genuity (trademark) Roundup Ready (trademark) 2 Xtend (trademark)" having tolerance to glyphosate and dicamba; corn and soybean "OptimumGAT (trademark)" having tolerance to glyphosate and ALS inhibitors; genetically modified soybean "Enlist E3 (trademark)" and "Enlist (trademark) Roundup Ready 2 Yield (trademark) having tolerance to three herbicides: glyphosate, glufosinate, and 2,4-D; genetically modified corn "Enlist (trademark) Roundup Ready (registered trademark) Corn 2" having tolerance to glyphosate, 2,4-D, and allyloxyphenoxypropionate type (FOPs) herbicides; genetically modified corn "Enlist (trademark) Roundup Ready (registered trademark) Corn 2" having tolerance to glyphosate, 2,4-D, and allyloxyphenoxypropionate type (FOPs) herbicides; genetically modified cotton "Bollgard II (registered trademark) XtendFlex (trademark) Cotton" having tolerance to dicamba, glyphosate, and glufosinate; and genetically modified cotton "Enlist (trademark) Cotton" having tolerance to three herbicides: glyphosate, glufosinate, and 2,4-D. Other than the above, cotton having tolerance to glufosinate and 2,4-D, cotton having tolerance to both glufosinate and dicamba, corn having tolerance to both glyphosate and 2,4-D, soybean having tolerance to both glyphosate and HPPD herbicides, and genetically modified corn having tolerance to glyphosate, glufosinate, 2,4-D, allyloxyphenoxypropionate type (FOPs) herbicides, and cyclohexadione type (DIMs) herbicides are also developed.

Examples of commercially available products of plants to which herbicide tolerance and pest resistance are imparted include corn "YieldGard Roundup Ready" and "YieldGard Roundup Ready 2" having glyphosate tolerance and corn borer resistance; corn "Agrisure CB/LL" having glufosinate tolerance and corn borer resistance; corn "Yield Gard VT Root worm/RR2" having glyphosate tolerance and corn rootworm resistance; corn "Yield Gard VT Triple" having glyphosate tolerance and corn rootworm resistance and corn borer resistance; corn "Herculex I" having glufosinate tolerance and *Lepidoptera* insect pest resistance (Cry1F) (resistance to, for example, a western bean cutworm, corn borer, black cutworm, and fall armyworm); corn "YieldGard Corn Rootworm/Roundup Ready 2" having glyphosate tolerance and corn root worm resistance; corn "Agrisure GT/RW" having glufosinate tolerance and *Coleoptera* insect pest resistance (Cry3A) (resistance to, for example, a western corn rootworm, northern corn rootworm, and Mexican corn rootworm); corn "Herculex RW" having glufosinate tolerance and *Coleoptera* insect pest resistance (Cry34/35Ab1) (resistance to, for example, a western corn rootworm, northern corn rootworm, and Mexican corn rootworm); corn "Yield Gard VT Root worm/RR2" having glyphosate tolerance and corn rootworm resistance; and cotton "Bollgard 3 (registered trademark) XtendFlex (registered trademark)" having dicamba tolerance, glyphosate tolerance, glufosinate tolerance, and *Lepidoptera* insect pest resistance (resistance to, for example, bollworms, tobacco budworm, and armyworms).

Examples of commercially available plants to which disease tolerance and pest resistance are imparted include potato "Hi-Lite NewLeaf (trademark) Y Potato", "NewLeaf (trademark) Y Russet Burbank Potato", and "Shepody NewLeaf (trademark) Y Potato" to which potato virus Y tolerance and pest resistance are imparted; and potato "NewLeaf (trademark) Plus Russet Burbank Potato" to which potato leaf roll virus tolerance and pest resistance are imparted.

Examples of commercially available plants to which herbicide tolerance and modified product quality are imparted include canola "InVigor (trademark) Canola" to which glufosinate tolerance and fertility trait are imparted; corn "InVigor (trademark) Maize" to which glufosinate tolerance and fertility trait are imparted; and soybean "Vistive Gold (trademark)" modified in glyphosate tolerance and oil content.

Examples of commercially available plants having three or more traits include corn "Herculex I/Roundup Ready 2" having glyphosate tolerance, glufosinate tolerance, and *Lepidoptera* insect pest resistance (Cry1F) (specifically, resistance to western bean cutworm, corn borer, black cutworm, and fall armyworm); corn "YieldGard Plus/Roundup Ready 2" having glyphosate tolerance, corn rootworm resistance, and corn borer resistance; corn "Agrisure GT/CB/LL" having glyphosate tolerance, glufosinate tolerance, and corn borer resistance; corn "Herculex Xtra" having glufosinate tolerance, *Lepidoptera* insect pest resistance (Cry1F), and *Coleoptera* insect pest resistance (Cry34/35Ab1) (specifically, resistance to *Lepidoptera* insect pests such as a western bean cutworm, corn borer, black cutworm, and fall armyworm and resistance to *Coleoptera* insect pests such as western corn rootworm, northern corn rootworm, and Mexican corn rootworm); corn "Agrisure CB/LL/RW" having glufosinate tolerance, corn borer resistance (Cry1Ab), and *Coleoptera* insect pest resistance (Cry3A) (specifically, resistance to *Coleoptera* insect pests such as western corn rootworm, northern corn rootworm, and Mexican corn rootworm); corn "Agrisure (trademark) 3000GT" having glyphosate tolerance+corn borer resistance (Cry1Ab), and *Coleoptera* insect pest resistance (Cry3A) (specifically, resistance to western corn rootworm, northern corn rootworm, and Mexican corn rootworm); corn "Mavera high-value corn" having glyphosate tolerance, resistance to a corn rootworm and European corn borer, and a high lysine trait; corn "Optimum (registered trademark) Leptra (trademark)" having resistance to pests such as a European corn borer, southwestern corn borer, corn earworm, fall armyworm, black cutworm, and western beanworm causing damages on the ground, Soybean "Credenz (registered trademark) soybean" which is added with resistance to frogeye leaf spot, Sudden death syndrome, southern stem canker, *Phytophthora* root rot, southern root-knot nematode, *Sclerotinia* white mold, brown stem rot, and soybean cyst nematode, is improved in iron chlorosis, and is modified in chloride sensitivity, and cotton "Stoneville (registered trademark) Cotton" to which tolerance to a plurality of herbicides and pest resistance are imparted, while there are nine cotton varieties ST5517GLTP, ST4848GLT, ST4949GLT, ST5020GLT, ST5115GLT, ST6182GLT, ST4747GLB2, ST4946GLB2, and ST6448GLB2 to cope with the situation of the outbreak of weeds and noxious insects on the fields in various districts.

Plants which are commercially available or are developed are listed below (A1 to A550). It is to be noted that the items in parentheses indicate [Plant Name, Event Name, Event Code, Tradename] and NA means "No information" or "Unavailable information". Most of these plants are listed in the registered database (GM APPROVAL DATABASE) in the electronic information site (http://www.isaaa.org/) of INTERNATIONAL SERVICE for the ACQUISITION of AGRI-BIOTECH APPLICATIONS (ISAAA).

A1:[alfalfa, J101, MON-00101-8, Roundup Ready (trademark) Alfalfa], A2:[alfalfa, J101 x J163, MON-00101-8 x MON-00163-7, Roundup Ready (trademark) Alfalfa], A3: [alfalfa, J163, MON-00163-7, Roundup Ready (trademark) Alfalfa], A4:[alfalfa, KK179, MON-00179-5, HarvXtra (trademark)], A5: [alfalfa, KK179 x J101, MON-00179-5 x MON-00101-8], A6: [apple, GD743, OKA-NB001-8, Arctic (trademark) "Golden Delicious" Apple], A7: [apple, GS784, OKA-NB002-9, Arctic (trademark)], A8: [apple, NF872, OKA-NB003-1, Arctic (trademark) Fuji Apple], A9: [Argentine canola, 23-18-17 (Event 18), CGN-89111-8, Laurical (trademark) Canola], A10: [Argentine canola, 23-198 (Event 23), CGN-89465-2, Laurical (trademark) Canola], A11: [Argentine canola, 61061, DP-061061-7], A12: [Argentine canola, 73496, DP-073496-4, Optimum (registered trademark) Gly canola], A13: [Argentine canola, 73496 x RF3, DP-073496-4 x ACS-BN003-6, NA], A14: [Argentine canola, GT200 (RT200), MON-89249-2, Roundup Ready (trademark) Canola], A15: [Argentine canola, GT73 (RT73), MON-00073-7, Roundup Ready (trademark) Canola], A16: [Argentine canola, HCN10 (Topas 19/2), NA, Liberty Link (trademark) Independence (trademark)], A17: [Argentine canola, HCN28 (T45), ACS-BN008-2, InVigor (trademark) Canola], A18: [Argentine canola, HCN28 x MON88302, ACS-BN008-2 x MON-88302-9, InVigor (trademark) x TruFlex (trademark) Roundup Ready (trademark) Canola], A19: [Argentine canola, HCN92 (Topas 19/2), ACS-BN007-1, Liberty Link (trademark) Innovator (trademark)], A20: [Argentine canola, HCN92 x MON88302, ACS-BN007-1 x MON-88302-9, Liberty Link (trademark) Innovator (trademark) x TruFlex (trademark) Roundup Ready (trademark) Canola], A21: [Argentine canola, MON88302, MON-88302-9, TruFlex (trademark) Roundup Ready (trademark) Canola], A22: [Argentine canola, MON88302 x MS8 x RF3, MON-88302-9 x ACS-BN005-8 x ACS-BN003-6, InVigor (trademark) x TruFlex (trademark) Roundup Ready (trademark) Canola], A23: [Argentine canola, MON88302 x RF3, MON-88302-9 x ACS-BN003-6, NA], A24: [Argentine canola, MPS961, NA, Phytaseed (trademark) Canola], A25: [Argentine canola, MPS962, NA, Phytaseed (trademark) Canola], A26: [Argentine canola, MPS963, NA, Phytaseed (trademark) Canola], A27: [Argentine canola, MPS964, NA, Phytaseed (trademark) Canola], A28: [Argentine canola, MPS965, NA, Phytaseed (trademark) Canola], A29: [Argentine canola, MS1 (B91-4), ACS-BN004-7, InVigor (trademark) Canola], A30: [Argentine canola, MS1 x MON88302, ACS-BN004-7 x MON-88302-9, InVigor (trademark) x TruFlex (trademark) Roundup Ready (trademark) Canola], A31: [Argentine canola, MS1 x RF1 (PGS1), ACS-BN004-7 x ACS-BN001-4, InVigor (trademark) Canola], A32: [Argentine canola, MS1 x RF1 (PGS2), ACS-BN004-7 x ACS-BN002-5, InVigor (trademark) Canola], A33: [Argentine canola, MS1 x RF3, ACS-BN004-7 x ACS-BN003-6, InVigor (trademark) Canola], A34: [Argentine canola, MS8, ACS-BN005-8, InVigor (trademark) Canola], A35:[Argentine canola, MS8 x MON88302, ACS-BN005-8 x MON-88302-9, InVigor (trademark) x TruFlex (trademark) Roundup Ready (trademark) Canola], A36:[Argentine canola, MS8 x RF3, ACS-BN005-8 x ACS-BN003-6, InVigor (trademark) Canola], A37: [Argentine canola, MS8 x RF3 x GT73 (RT73), ACS-BN005-8 x ACS-BN003-6 x MON-00073-7, NA], A38:[Argentine canola, OXY-235, ACS-BN011-5, Navigator (trademark) Canola], A39: [Argentine canola, PHY14, NA, NA], A40:[Argentine canola, PHY23, NA, NA], A41: [Argentine canola, PHY35, NA, NA], A42: [Argentine canola, PHY36, NA, NA], A43: [Argentine canola, RF1 (B93-101), ACS-BN001-4, InVigor (trademark) Canola], A44:[Argentine canola, RF1 x MON88302, CS-BN001-4 x MON-88302-9, InVigor (trademark) x TruFlex (trademark) Roundup Ready (trademark) Canola], A45:[Argentine canola, RF2 (B94-2), ACS-BN002-5, InVigor (trademark) Canola], A46:[Argentine canola, RF2 x MON88302, ACS-BN002-5 x MON-88302-

9, InVigor (trademark) x TruFlex (trademark) Roundup Ready (trademark) Canola], A47:[Argentine canola, RF3, ACS-BN003-6, InVigor (trademark) Canola], A48:[bean, EMBRAPA5.1, EMB-PV051-1, NA], A49:[carnation, 11(7442), FLO-07442-4, Moondust (trademark)], A50:[carnation, 11363(1363A), FLO-11363-1, Moonshadow (trademark)], A51:[carnation, 1226A(11226), FLO-11226-8, Moonshade (trademark)], A52:[carnation, 123.2.2(40619), FLO-40619-7, Moonshade (trademark)], A53:[carnation, 123.2.38(40644), FLO-40644-4, Moonlite (trademark)], A54:[carnation, 123.8.12, FLO-40689-6, Moonaqua (trademark)], A55:[carnation, 123.8.8(40685), FLO-40685-1, Moonvista (trademark)], A56:[carnation, 1351A(11351), FLO-11351-7, Moonshade (trademark)], A57:[carnation, 1400A(11400), FLO-11400-2, Moonshade (trademark)], A58:[carnation, 15, FLO-00015-2, Moondust (trademark)], A59:[carnation, 16, FLO-00016-3, Moondust (trademark)], A60:[carnation, 19907, IFD-19907-9, Moonique (trademark)], A61:[carnation, 25947, IFD-25947-1, Moonpearl (trademark)], A62:[carnation, 25958, IFD-25958-3, Moonberry (trademark)], A63:[carnation, 26407, IFD-26407-2, Moonvelvet (trademark)], A64:[carnation, 4, FLO-00004-9, Moondust (trademark)], A65:[carnation, 66, FLO-00066-8, NA]A66:[carnation, 959A(11959), FLO-11959-3, Moonshade (trademark)], A67:[carnation, 988A(11988), FLO-11988-7, Moonshade (trademark)], A68:[chicory, RM3-3, NA, SeedLink (trademark)], A69:[chicory, RM3-4, NA, SeedLink (trademark)], A70:[chicory, RM3-6, NA, SeedLink (trademark)], A71:[cotton, 19-51a, DD-01951A-7, NA], A72:[cotton, 281-24-236, DAS-24236-5, NA], A73: [cotton, 281-24-236x3006-210-23(MXB-13), DAS-24236-5xDAS-21023-5, WideStrike (trademark) Cotton], A74: [cotton, 281-24-236x3006-210-23xCOT102x81910, DAS-24236-5xDAS-21023-5xSYN-IR102-7xDAS-81910-7, NA], A75:[cotton, 3006-210-23, DAS-21023-5, NA], A76: [cotton, 3006-210-23x281-24-236xMON1445, DAS-21023-5xDAS-24236-5xMON-01445-2, WideStrike (trademark) RoundupReady (trademark) Cotton], A77:[cotton, 3006-210-23x281-24-236xMON88913, DAS-21023-5NAxNADAS-24236-5NAxNAMON-88913-8, Widestrike (trademark) RoundupReadyFlex (trademark) Cotton], A78: [cotton, 3006-210-23x281-24-236xMON88913xCOT102, DAS-21023-5NAxNADAS-24236-5NAxNAMON-88913-8NAxNASYN-IR102-7, Widestrike (trademark) RoundupReadyFlex (trademark) Cotton], A79:[cotton, 31707, NA, BXN (trademark) PlusBollgard (trademark) Cotton], A80: [cotton, 31803, NA, BXN (trademark) PlusBollgard (trademark) Cotton], A81:[cotton, 31807x31808, NA, NA], A82: [cotton, 31807, NA, BXN (trademark) PlusBollgard (trademark) Cotton], A83:[cotton, 31808, NA, BXN (trademark) PlusBollgard (trademark) Cotton], A84:[cotton, 42317, NA, BXN (trademark) PlusBollgard (trademark) Cotton], A85:[cotton, 81910, DAS-81910-7, NA], A86:[cotton, BNLA-601, NA, NA], A87:[cotton, BXN10211 (10211), BXN-10211-9, NA], A88:[cotton, BXN10215 (10215), BXN-10215-4NA, BXN (trademark) Cotton], A89: [cotton, BXN10222(10222), BXN-10222-2, BXN (trademark) Cotton], A90:[cotton, BXN10224(10224), BXN-10224-4NA, BXN (trademark) Cotton], A91:[cotton, COT102(IR102), SYN-IR102-7, VIPCOT (trademark) Cotton], A92:[cotton, COT102xCOT67B, SYN-IR102-7NAxNASYN-IR67B-1, VIPCOT (trademark) Cotton], A93:[cotton, COT102xCOT67BxMON88913, SYN-IR102-7NAxNASYN-IR67B-1NAxNAMON-88913-8, VIPCOT (trademark) RoundupReadyFlex (trademark) Cotton], A94: [cotton, COT102xMON15985, SYN-IR102-7NAxNAMON-15985-7, Bollgard(registered trademark) III], A95: [cotton, COT102xMON15985xMON88913, SYN-IR102-7NAxNAMON-15985-7NAxNAMON-88913-8, Bollgard (registered trademark) IIIxRoundupReady (trademark) Flex (trademark)], A96:[cotton, COT102xMON15985xMON88913xMON88701, SYN-IR102-7NAxNAMON-15985-7NAxNAMON-88913-8NAxNAMONNA88701-3, NA], A97:[cotton, COT67B (IR67B), SYN-IR67B-1, NA], A98:[cotton, Eventl, NA, JK1], A99:[cotton, GFMCry1A, GTL-GFM311-7, NA], A100:[cotton, GHB119, BCS-GH005-8, NA], A101:[cotton, GHB614, BCS-GH002-5, GlyTol (trademark)], A102: [cotton, GHB614xLLCotton25, BCS-GH002-5NAxNAACS-GH001-3, GlyTol (trademark) LibertyLink (trademark)], A103:[cotton, GHB614xLLCotton25xMON15985, BCS-GH002-5NAxNAACS-GH001-3NAxNAMON-15985-7, NA], A104:[cotton, GHB614xMON15985, BCS-GH002-5NAxNAMON-15985, NA], A105:[cotton, GHB614xT304-40xGHB119, BCS-GH002-5NAxNABCS-GH004-7NAxNABCS-GH005-8, Glytol (trademark) xTwinlink (trademark)], A106:[cotton, GHB614xT304-40xGHB119xCOT102, BCS-GH002-5NAxNABCS-GH004-7NAxNABCS-GH005-8NAxNASYN-IR102-7, Glytol (trademark) xTwinlink (trademark) xVIPCOT (trademark) Cott on], A107: [cotton, GK12, NA, NA], A108:[cotton, LLCotton25, ACS-GH001-3NA, Fibermax (trademark) LibertyLink (trademark)], A109:[cotton, LLCotton25xMON15985, ACS-GH001-3NAxNAMON-15985-7, Fibermax (trademark) LibertyLink (trademark) BollgardII (trademark)], A110:[cotton, MLS9124, NA, NA], A111:[cotton, MON1076, MON-89924-2, Bollgard (trademark) Cotton], A112:[cotton, MON1445, MON-01445-2, RoundupReady (trademark) Cotton], A113:[cotton, MON15985, MON-15985-7, BollgardII (trademark) Cotton], A114:[cotton, MON15985xMON1445, MON-15985-7NAxNAMON-01445-2, RoundupReady (trademark) BollgardII (trademark) Cotton], A115:[cotton, MON1698, MON-89383-1, RoundupReady (trademark) Cotton], A116:[cotton, MON531, MON-00531-6, Bollgard (trademark) Cotton, Ingard (trademark)], A117:[cotton, MON531xMON1445, MON-0531-6NAxNAMON-01445-2, RoundupReady (trademark) Bollgard (trademark) Cotton], A118:[cotton, MON757, MON-00757-7, Bollgard (trademark) Cotton], A119:[cotton, MON88701, MONNA88701-3, NA], A120: [cotton, MON88701xMON88913, MONNA88701-3NAxNAMON-88913-8, NA], A121:[cotton, MON88701xMON88913xMON15985, MONNA88701-3NAxNAMON-88913-8NAxNAMON-15985-7, Bollgard II(registered trademark)XtendFlex (trademark) Cotton], A122:[cotton, MON88913, MON-88913-8, RoundupReady (trademark) Flex (trademark) Cotton], A123:[cotton, MON88913xMON15985, MON-88913-8NAxNAMON-15985-7, RoundupReady (trademark) Flex (trademark) BollgardII (trademark) Cotton], A124:[cotton, NgweChi6Bt, NA, NgweChi6Bt], A125:[cotton, SGK321, NA, NA], A126:[cotton, T303-3, BCS-GH003-6, NA], A127:[cotton, T304-40, BCS-GH004-7, NA], A128:[cotton, T304-40xGHB119, BCS-GH004-7NAxNABCS-GH005-8, TwinLink (trademark) Cotton], A129:[Creeping bentgrass, ASR368, SMG-36800-2, NA], A130:[eggplant, BtBrinjalEventEE1, BtBrinjalEventEE1, BARIBtBegun-1, -2, -3 and -4], A131:[*eucalyptus*, H421, H421, GMEucalyptus], A132: [flax, FP967(CDCTriffid), CDC-FLO01-2, CDCTriffid-Flax], A133:[lentil, RH44, RH44, Clearfield (trademark) lentil], A134:[corn, 32138, DP-32138-132138, 2138SPT-maintainer], A135:[corn, 3272, SYN-E3272-5, Enogen (trademark)], A136:[corn, 3272xBt11, SYN-E3272-5xSYN- BT011-1, NA], A137:[corn, 3272xBt11xGA21, SYN-E3272-5xSYN-BT011-1xMON-00021-9, NA], A138:[corn, 3272xBt11xMIR604, SYN-E3272-5xSYN-BT011-1xSYN-IR604-5, NA], A139:[corn, 3272xBT11xMIR604xGA21, SYN-E3272-5xSYN-BT011-1xSYN-IR604-5xMON-00021-9, NA], A140:[corn, 3272xBt11xMIR604xTC1507x5307xGA21, SYN-E3272-5xSYN-BT011-1xSYN-IR604-5xDAS-01507-1xSYN-05307-1xMON-00021-9, NA], A141:[corn, 3272xGA21, SYN-E3272-5xMON-00021-9, NA], A142:[corn, 3272xMIR604, SYN-E3272-5xSYN-IR604-5, NA], A143:[corn, 3272xMIR604xGA21, SYN-E3272-5xSYN-IR604-5xMON-00021-9, NA], A144:corn, 33121, DP-033121-3, NA], A145:[corn, 4114, DP-004114-3, NA], A146:[corn, 5307, SYN-05307-1, Agrisure(registered trademark)Duracade (trademark)], A147:[corn, 5307xGA21, SYN-05307-1xMON-00021-9, NA], A148:[corn, 5307xMIR604xBt11xTC1507xGA21, SYN-05307-1xSYN-IR604-5xSYN-BT011-1xDAS-01507-1xMON-00021-9, Agrisure(registered trademark)Duracade (trademark) 5122], A149:[corn, 5307xMIR604xBt11xTC1507xGA21xMIR162, SYN-05307-1xSYN-IR604-5xSYN-BT011-1xDAS-01507-1xMON-00021-9xSYN-IR162-4, Agrisure(registered trademark)Duracade (trademark) 5222], A150:[corn, 59122, DAS-59122-7, Herculex (trademark) RW], A151:[corn, 59122xDAS40278, DAS-59122-7xDAS-40278-9, NA], A152:[corn, 59122xGA21, DAS-59122-7xMON-00021-9, NA], A153:[corn, 59122xMIR604, DAS-59122-7xSYN-IR604-5, NA], A154:[corn, 59122xMIR604xGA21, DAS-59122-7xSYN-IR604-5xMON-00021-9, NA], A155:[corn, 59122xMIR604x1C1507, DAS-59122-7xSYN-IR604-5xDAS-01507-1, NA], A156:[corn, 59122xMIR604x1C1507xGA21, DAS-59122-7xSYN-IR604-5xDAS-01507-1xMON-00021-9, NA], A157:[corn, 59122xMON810, DAS-59122-7xMON-00810-6, NA], A158:[corn, 59122xMON810xMIR604, DAS-59122-7xMON-00810-6xSYN-IR604-5, NA], A159:[corn, 59122xMON810xNK603, DAS-59122-7xMON-00810-6xMON-00603-6, NA], A160:[corn, 59122xMON810xNK603xMIR604, DAS-59122-7xMON-00810-6xMON-00603-6xSYN-IR604-5, NA], A161:[corn, 59122xMON88017, DAS-59122-7xMON-88017-3, NA], A162:[corn, 59122xMON88017xDAS40278, DAS-59122-7xMON-88017-3xDAS-40278-9, NA], A163:[corn, 59122xNK603, DAS-59122-7xMON-00603-6, Herculex (trademark) RWRoundupReady (trademark) 2], A164:[corn, 59122xNK603xMIR604, DAS-59122-7xMON-00603-6xSYN-IR604-5, NA], A165:[corn, 59122x1C1507xGA21, DAS-59122-7xDAS-01507-1xMON-00021-9, NA], A166:[corn, 676, PH-000676-7, NA], A167:[corn, 678, PH-000678-9, NA], A168:[corn, 680, PH-000680-2, NA], A169:[corn, 98140, DP-098140-6, Optimum (trademark) GAT (trademark)], A170:[corn, 98140x59122, DP-098140-6xDAS-59122-7, NA], A171:[corn, 98140xTC1507, DP-098140-6xDAS-01507-1, NA], A172:[corn, 98140xTC1507x59122, DP-098140-6xDAS-01507-1xDAS-59122-7, NA], A173:[corn, Bt10, NA, Bt10], A174:[corn, Bt11(X4334CBR, X4734CBR), SYN-BT011-1, Agrisure (trademark) CB/LL], A175:[corn, Bt11x5307, SYN-BT011-1xSYN-05307-1, NA], A176:[corn, Bt11x5307xGA21, SYN-BT011-1xSYN-05307-1xMON-00021-9, NA], A177:[corn, Bt11x59122, SYN-BT011-1xDAS-59122-7, NA], A178:[corn, Bt11x59122xGA21, SYN-BT011-1xDAS-59122-7xMON-00021-9, NA], A179:[corn, Bt11x59122xMIR604, SYN-BT011-1xDAS-59122-7xSYN-IR604-5, NA], A180:[corn, Bt11x59122xMIR604xGA21, SYN-BT011-1xDAS-59122-7xSYN-IR604-5xMON-00021-9, NA], A181:[corn, Bt11x59122xMIR604x1C1507, SYN-BT011-1xDAS-59122-7xSYN-IR604-5xDAS-01507-1, NA], A182:[corn, BT11x59122xMIR604x1C1507xGA21, SYN-131011-1xDAS-59122-7xSYN-IR604-5xDAS-01507-1xMON-00021-9, Agrisure(registered trademark)3122], A183:[corn, Bt11x59122x1C1507, SYN-BT011-1xDAS-59122-7xDAS-01507-1, NA], A184:[corn, Bt11x59122xTC1507xGA21, SYN-BT011-1xDAS-59122-7xDAS-01507-1xMON-00021-9, NA], A185:[corn, Bt11xGA21, SYN-BT011-1xMON-00021-9, Agrisure (trademark) GT/CB/LL], A186:[corn, Bt11xMIR162, SYN-BT011-1xSYN-IR162-4, Agrisure(registered trademark)Viptera (trademark) 2100], A187:[corn, Bt11xMIR162x5307, SYN-BT011-1xSYN-IR162-4xSYN-05307-1, NA], A188:[corn, Bt11xMIR162x5307xGA21, SYN-BT011-1xSYN-IR162-4xSYN-05307-1xMON-00021-9, NA], A189:[corn, Bt11xMIR162xGA21, SYN-BT011-1xSYN-IR162-4xMON-00021-9, Agrisure(registered trademark)Viptera (trademark) 3110], A190:[corn, BT11xMIR162xMIR604, SYN-BT011-1xSYN-IR162-4xSYN-IR604-5, Agrisure (registered trademark)Viptera (trademark) 3100], A191:[corn, BT11xMIR162xMIR604x5307, SYN-BT011-1xSYN-IR162-4xSYN-IR604-5xSYN-05307-1, NA], A192:[corn, Bt11xMIR162xMIR604x5307xGA21, SYN-BT011-1xSYN-IR162-4xSYN-IR604-5xSYN-05307-1xMON-00021-9, NA], A193:[corn, Bt11xMIR162xMIR604xGA21, SYN-BT011-1xSYN-IR162-4xSYN-IR604-5xMON-00021-9, Agrisure(registered trademark)Viptera (trademark) 3111, Agrisure(registered trademark)Viptera (trademark) 4], A194:[corn, Bt11xMIR162xMIR604xMON89034x5307xGA21, SYN-BT011-1xSYN-IR162-4xSYN-IR604-5xMON-89034-3xSYN-05307-1xMON-00021-9, NA], A195:[corn, BT11xMIR162xMIR604x1C1507, SYN-131011-1xSYN-IR162-4xSYN-IR604-5xDAS-01507-1, NA], A196:[corn, BT11xMIR162xMIR604xTC1507x5307, SYN-BT011-1xSYN-IR162-4xSYN-IR604-5xDAS-01507-1xSYN-05307-1, NA], A197:[corn, Bt11xMIR162xMIR604xTC1507xGA21, SYN-BT011-1xSYN-IR162-4xSYN-IR604-5xDAS-01507-1xMON-00021-9, NA], A198:[corn, Bt11xMIR162xMON89034, SYN-BT011-1xSYN-IR162-4xMON-89034-3, NA], A199:[corn, Bt11xMIR162xMON89034xGA21, SYN-BT011-1xSYN-IR162-4xMON-89034-3xMON-00021-9, NA], A200:[corn, Bt11xMIR162xTC1507, SYN-BT011-1xSYN-IR162-4xDAS-01507-1, NA], A201:[corn, Bt11xMIR162xTC1507x5307, SYN-BT011-1xSYN-IR162-4xDAS-01507-1xSYN-05307-1, NA], A202:[corn, Bt11xMIR162xTC1507x5307xGA21, SYN-BT011-1xSYN-IR162-4xDAS-01507-1xSYN-05307-1xMON-00021-9, NA], A203:[corn, Bt11xMIR162xTC1507xGA21, SYN-BT011-1xSYN-IR162-4xDAS-01507-1xMON-00021-9, Agrisure (trademark) Viptera3220], A204:[corn, Bt11xMIR604, SYN-BT011-1xSYN-IR604-5, Agrisure (trademark) CB/LL/RW], A205:[corn, Bt11xMIR604x5307, SYN-BT011-1xSYN-IR604-5xSYN-05307-1, NA], A206:[corn, Bt11xMIR604x5307xGA21, SYN-BT011-1xSYN-IR604-5xSYN-05307-1xMON-00021-9, NA], A207:[corn, BT11xMIR604xGA21, SYN-BT011-1xSYN-IR604-5xMON-00021-9, Agrisure (trademark) 3000G1], A208:[corn, Bt11xMIR604x1C1507, SYN-BT011-1xSYN-IR604-5xDAS-01507-1, NA], A209:[corn, Bt11xMIR604x1C1507x5307, SYN-BT011-1xSYN-IR604-5xDAS-01507-1xSYN-05307-1, NA], A210:[corn, Bt11xMIR604x1C1507xGA21, SYN-BT011-1xSYN- IR604-5xDAS-01507-1xMON-00021-9, NA], A211:[corn, Bt11xMON89034, SYN-BT011-1xMON-89034-3, NA], A212:[corn, Bt11xMON89034xGA21, SYN-BT011-1xMON-89034-3xMON-00021-9, NA], A213:[corn, Bt11x1C1507, SYN-BT011-1xDAS-01507-1, NA], A214: [corn, Bt11x1C1507x5307, SYN-BT011-1xDAS-01507-1xSYN-05307-1, NA], A215:[corn, Bt11xTC1507x5307xGA21, SYN-BT011-1xDAS-01507-1xSYN-05307-1xMON-00021-9, NA], A216:[corn, Bt11xTC1507xGA21, SYN-BT011-1xDAS-01507-1xMON-00021-9, NA], A217:[corn, Bt176(176), SYN-EV176-9, NaturGardKnockOut(trademark, Maximizer (trademark)], A218:[corn, BVLA430101, NA, NA], A219: [corn, CBH-351, ACS-ZM004-3, Starlink (trademark) Maize], A220:[corn, DAS40278, DAS-40278-9, Enlist (trademark) Maize], A221:[corn, DAS40278xNK603, DAS-40278-9xMON-00603-6, NA], A222:[corn, DBT418, DKB-89614-9, BtXtra (trademark) Maize], A223:[corn, DLL25 (B16), DKB-89790-5, NA], A224:[corn, GA21, MON-00021-9, RoundupReady (trademark) Maize, Agrisure (trademark) GT], A225:[corn, GA21xMON810, MON-00021-9xMON-00810-6, RoundupReady (trademark) YieldGard (trademark) maize], A226:[corn, GA21xT25, MON-00021-9xACS-ZM003-2, NA], A227:[corn, HCEM485, HCEM485, NA], A228:[corn, LY038, REN-00038-3, Mavera (trademark) Maize], A229:[corn, LY038xMON810, REN-00038-3xMON-00810-6, Mavera (trademark) YieldGard (trademark) Maize], A230:[corn, MIR162, SYN-IR162-4, Agrisure (trademark) Viptera], A231:[corn, MIR162x5307, SYN-IR162-4xSYN-05307-1, NA], A232:[corn, MIR162x5307xGA21, SYN-IR162-4xSYN-05307-1xMON-00021-9, NA], A233:[corn, MIR162xGA21, SYN-IR162-4xMON-00021-9, NA], A234:[corn, MIR162xMIR604, SYN-IR162-4xSYN-IR604-5, NA], A235:[corn, MIR162xMIR604x5307, SYN-IR162-4xSYN-IR604-5xSYN-05307-1, NA], A236:[corn, MIR162xMIR604x5307xGA21, SYN-IR162-4xSYN-IR604-5xSYN-05307-1xMON-00021-9, NA], A237:[corn, MIR162xMIR604xGA21, SYN-IR162-4xSYN-IR604-5xMON-00021-9, NA], A238:[corn, MIR162xMIR604xTC1507x5307, SYN-IR162-4xSYN-IR604-5xDAS-01507-1xSYN-05307-1, NA], A239:[corn, MIR162xMIR604xTC1507x5307xGA21, SYN-IR162-4xSYN-IR604-5xDAS-01507-1xSYN-05307-1xMON-00021-9, NA], A240:[corn, MIR162xMIR604xTC1507xGA21, SYN-IR162-4xSYN-IR604-5xDAS-01507-1xMON-00021-9, NA], A241:[corn, MIR162xMON89034, SYN-IR162-4xMON-89034-3, NA], A242:[corn, MIR162xMON89034xGA21, SYN-IR162-4xMON-89034-3xMON-00021-9, NA], A243:[corn, MIR162xNK603, SYN-IR162-4xMON-00603-6, NA], A244:[corn, MIR162xTC1507, SYN-IR162-4xDAS-01507-1, NA], A245:[corn, MIR162xTC1507x5307, SYN-IR162-4xDAS-01507-1xSYN-05307-1, NA], A246:[corn, MIR162xTC1507x5307xGA21, SYN-IR162-4xDAS-01507-1xSYN-05307-1xMON-00021-9, NA], A247:[corn, MIR162xTC1507xGA21, SYN-IR162-4xDAS-01507-1xMON-00021-9, NA], A248:[corn, MIR604, SYN-IR604-5, Agrisure (trademark) RW], A249:[corn, MIR604x5307, SYN-IR604-5xSYN-05307-1, NA], A250:[corn, MIR604x5307xGA21, SYN-IR604-5xSYN-05307-1xMON-00021-9, NA], A251:[corn, MIR604xGA21, SYN-IR604-5xMON-00021-9, Agrisure (trademark) GT/RW], A252:[corn, MIR604xNK603, SYN-IR604-5xMON-00603-6, NA], A253:[corn, MIR604xTC1507, SYN-IR604-5xDAS-01507-1, Optimum(registered trademark)TRIsect (trademark)], A254:[corn, MIR604xTC1507x5307, SYN-IR604-5xDAS-01507-1xSYN-05307-1, NA], A255:[corn, MIR604xTC1507x5307xGA21, SYN-IR604-5xTC1507xSYN-05307-1xMON-00021-9, NA], A256: [corn, MIR604xTC1507xGA21, SYN-IR604-5xTC1507xMON-00021-9, NA], A257:[corn, MON801 (MON80100), MON801, NA], A258:[corn, MON802, MON-80200-7, NA], A259:[corn, MON809, PH-MON-809-2, NA], A260:[corn, MON810, MON-00810-6, YieldGard (trademark), MaizeGard (trademark)], A261:[corn, MON810xMIR162, MON-00810-6xSYN-IR162-4, NA], A262:[corn, MON810xMIR162xNK603, MON-00810-6xSYN-IR162-4xMON-00603-6, NA], A263:[corn, MON810xMIR604, MON-00810-6xSYN-IR604-5, NA], A264:[corn, MON810xMON88017, MON-00810-6xMON-88017-3, YieldGard (trademark) VITriple], A265:[corn, MON810xNK603xMIR604, MON-00810-6xMON-00603-6xSYN-IR604-5, NA], A266:[corn, MON832, NA, RoundupReady (trademark) Maize], A267:[corn, MON863, MON-00863-5, YieldGard (trademark) RootwormRW, MaxGard (trademark)], A268:[corn, MON863xMON810, MON-00863-5xMON-00810-6, YieldGard (trademark) Plus], A269:[corn, MON863xMON810xNK603, MON-00603-6xMON-00810-6xMON-00863-5, YieldGard (trademark) PluswithRR], A270:[corn, MON863xNK603, MON-00863-5xMON-00603-6, YieldGard (trademark) RW+RR], A271:[corn, MON87403, MON87403-1, NA], A272:[corn, MON87411, MON-87411-9, NA], A273:[corn, MON87419, MON87419-8, NA], A274:[corn, MON87427, MON-87427-7, RoundupReady (trademark) Maize], A275:[corn, MON87427x59122, MON-87427-7xDAS-59122-7, NA], A276:[corn, MON87427xMON88017, MON-87427-7xMON-88017-3, NA], A277:[corn, MON87427xMON88017x59122, MON-87427-7xMON-88017-3xDAS-59122-7, NA], A278:[corn, MON87427xMON89034, MON-87427-7xMON-89034-3, NA], A279:[corn, MON87427xMON89034x59122, MON-87427-7xMON-89034-3xDAS-59122-7, NA], A280:[corn, MON87427xMON89034xMON88017, MON-87427-7xMON-89034-3xMON-88017-3, NA], A281:[corn, MON87427xMON89034xMON88017x59122, MON-87427-7xMON-89034-3xMON-88017-3x59122, NA], A282:[corn, MON87427xMON89034xNK603, MON-87427-7xMON-89034-3xMON-00603-6, NA], A283:[corn, MON87427xMON89034xTC1507, MON-87427-7xMON-89034-3xDAS-01507-1, NA], A284:[corn, MON87427xMON89034xTC1507x59122, MON-87427-7xMON-89034-3xDAS-01507-1xDAS-59122-7, NA], A285:[corn, MON87427xMON89034xTC1507xMON87411x59122, MON-87427-7xMON-89034-3xDAS-01507-1xMON-87411-9xDAS-59122-7, NA], A286:[corn, MON87427xMON89034xTC1507xMON88017, MON-87427-7xMON-89034-3xDAS-01507-1xMON-88017-3, NA], A287:[corn, MON87427xMON89034xMIR162xNK603, MON-87427-7xMON-89034-3xSYN-IR162-4xMON-00603-6, NA], A288:[corn, MON87427xMON89034xTC1507xMON88017x59122, MON-87427-7xMON-89034-3xDAS-01507-1xMON-88017-3xDAS-59122-7, NA], A289:[corn, MON87427xNK603, MON-87427-7xMON-00603-6, NA], A290:[corn, MON87427xTC1507, MON-87427-7xDAS-01507-1, NA], A291:[corn, MON87427xTC1507x59122, MON-87427-7xDAS-01507-1xDAS-59122-7, NA], A292: [corn, MON87427xTC1507xMON88017, MON-87427-7xDAS-01507-1xMON-88017-3, NA], A293:[corn, MON87427xTC1507xMON88017x59122, MON-87427-

7xDAS-01507-1xMON-88017-3xDAS-59122-7, NA], A294:[corn, MON87460, MON-87460-4, Genuity(registered trademark)DroughtGard (trademark)], A295:[corn, MON87460xMON88017, MON-87460-4xMON-88017-3, NA], A296:[corn, MON87460xMON89034xMON88017, MON-87460-4xMON-89034-3xMON-88017-3, NA], A297:[corn, MON87460xMON89034xNK603, MON-87460-4xMON-89034-3xMON-00603-6, NA], A298:[corn, MON87460xNK603, MON-87460-4xMON-00603-6, NA], A299:[corn, MON88017, MON-88017-3, YieldGard (trademark) VT (trademark) Rootworm (trademark) RR2], A300: [corn, MON88017xDAS40278, MON-88017-3xDAS-40278-9, NA], A301:[corn, MON89034, MON-89034-3, YieldGard (trademark) VTPro (trademark)], A302:[corn, MON89034x59122, MON-89034-3xDAS-59122-7, NA], A303:[corn, MON89034x59122xDAS40278, MON-89034-3xDAS-59122-7xDAS-40278-9, NA], A304:[corn, MON89034x59122xMON88017, MON-89034-3xDAS-59122-7xMON-88017-3, NA], A305:[corn, MON89034x59122xMON88017xDAS40278, MON-89034-3xDAS-59122-7xMON-88017-3xDAS-40278-9, NA], A306:[corn, MON89034xDAS40278, MON-89034-3xDAS-40278-9, NA], A307:[corn, MON89034xMON87460, MON-89034-3xMON-87460-4, NA], A308:[corn, MON89034xMON88017, MON-89034-3xMON-88017-3, Genuity(registered trademark)VTTriplePro (trademark)], A309:[corn, MON89034xMON88017xDAS40278, MON-89034-3xMON-88017-3xDAS-40278-9, NA], A310:[corn, MON89034xNK603, MON-89034-3xMON-00603-6, Genuity(registered trademark)VTDoublePro (trademark)], A311:[corn, MON89034xNK603xDAS40278, MON-89034-3xMON-00603-6xDAS-40278-9, NA], A312:[corn, MON89034xTC1507, MON-89034-3xDAS-01507-1, NA], A313:[corn, MON89034x1C1507x59122, MON-89034-3xDAS-01507-1xDAS-59122-7, NA], A314:[corn, MON89034x1C1507x59122xDAS40278, MON-89034-3xDAS-01507-1xDAS-59122-7xDAS-40278-9, NA], A315:[corn, MON89034x1C1507xDAS40278, MON-89034-3xDAS-01507-1xDAS-40278-9, NA], A316:[corn, MON89034xTC1507xMON88017, MON-89034-3xDAS-01507-1xMON-88017-3, NA], A317:[corn, MON89034x1C1507xMON88017x59122, MON-89034-3xDAS-01507-1xMON-88017-3xDAS-59122-7, Genuity (registered trademark)SmartStax (trademark)], A318:[corn, MON89034xTC1507xMON88017x59122xDAS40278, MON-89034-3xDAS-01507-1xMON-88017-3xDAS-59122-7xDAS-40278-9, NA], A319:[corn, MON89034xTC1507xMON88017xDAS40278, MON-89034-3xDAS-01507-1xMON-88017-3xDAS-59122-7xDAS-40278-9, NA], A320:[corn, MON89034xTC1507xNK603, MON-89034-3xDAS-01507-1xMON-00603-6, PowerCore (trademark)], A321: [corn, MON89034x1C1507xNK603xDAS40278, MON-89034-3xDAS-01507-1xMON-00603-6xDAS-40278-9, NA], A322:[corn, MON89034xTC1507xNK603xMIR162, MON-89034-3xDAS-01507-1xMON-00603-6xSYN-IR162-4, NA], A323:[corn, MON89034x1C1507xNK603xMIR162xDAS40278, MON-89034-3xDAS-01507-1xMON-00603-6xSYN-IR162-4xDAS-40278-9, NA], A324:[corn, MON89034xGA21, MON-89034-3xMON-00021-9, NA], A325:[corn, MS3, ACS-ZM001-9, InVigor (trademark) Maize], A326:[corn, MS6, ACS-ZM005-4, InVigor (trademark) Maize], A327: [corn, MZHGOJG, SYN-000JG-2, NA], A328:[corn, MZIR098, SYN-00098-3, NA], A329:[corn, NK603, MON-00603-6, RoundupReady (trademark) 2Maize], A330:[corn, NK603xMON810x4114xMIR604, MON-00603-6xMON-00810-6xDP004114-3xSYN-IR604-4, NA], A331:[corn, NK603xMON810, MON-00603-6xMON-00810-6, YieldGard (trademark) CB+RR], A332:[corn, NK603x125, MON-00603-6xACS-ZM003-2, RoundupReady (trademark) LibertyLink (trademark) Maize], A333:[corn, T14, ACS-ZM002-1, LibertyLink (trademark) Maize], A334: [corn, T25, ACS-ZM003-2, LibertyLink (trademark) Maize], A335:[corn, 125xMON810, ACS-ZM003-2xMON-00810-6, LibertyLink (trademark) Yieldgard (trademark) Maize], A336:[corn, TC1507, DAS-01507-1, Herculex (trademark) I, Herculex (trademark) CB], A337:[corn, TC1507x59122xMON810xMIR604xNK603, DAS-01507-1xDAS-59122-7xMON-00810-6xSYN-IR604-5xMON-00603-6, Optimum (trademark) IntrasectXtreme], A338: [corn, TC1507xMON810xMIR604xNK603, DAS-01507-1xMON-00810-6xSYN-IR604-5xMON-00603-6, NA], A339:[corn, TC1507x5307, DAS-01507-1xSYN-05307-1, NA], A340:[corn, TC1507x5307xGA21, DAS-01507-1xSYN-05307-1xMON-00021-9, NA], A341:[corn, TC1507x59122, DAS-01507-1xDAS-59122-7, HerculexXTRA (trademark)], A342:[corn, TC1507x59122xDAS40278, DAS-01507-1xDAS-59122-7xDAS-40278-9, NA], A343:[corn, TC1507x59122xMON810, DAS-01507-1xDAS-59122-7xMON-00810-6, Optimum(registered trademark) AcreMax (registered trademark) Xtra], A344:[corn, TC1507x59122xMON810xMIR604, DAS-01507-1xDAS-59122-7xMON-00810-6xSYN-IR604-5, Optimum(registered trademark) AcreMax(registered trademark) XTreme], A345:[corn, TC1507x59122xMON810xNK603, DAS-01507-1xDAS-59122-7xMON-00810-6xMON-00603-6, Optimum (trademark) IntrasectXTRA], A346:[corn, TC1507x59122xMON88017, DAS-01507-1xDAS-59122-7xMON-88017-3, NA], A347:[corn, TC1507x59122xMON88017xDAS40278, DAS-01507-1xDAS-59122-7xMON-88017-3xDAS-40278-9, NA], A348:[corn, TC1507x59122xNK603, DAS-01507-1xDAS-59122-7xMON-00603-6, HerculexXTRA (trademark) RR], A349:[corn, TC1507x59122xNK603xMIR604, DAS-01507-1xDAS-59122-7xMON-00603-6xSYN-IR604-5, NA], A350:[corn, TC1507xDAS40278, DAS-01507-1xDAS-40278-9, NA], A351:[corn, TC1507xGA21, DAS-01507-1xMON-00021-9, NA], A352:[corn, TC1507xMIR162xNK603, DAS-01507-1xSYN-IR162-4xMON-00603-6, Optimum(registered trademark)Leptra (trademark)], A353:[corn, TC1507xMIR604xNK603, DAS-01507-1xSYN-IR604-5xMON-00603-6, Optimum (trademark) TRIsect], A354:[corn, TC1507xMON810, DAS-01507-1xMON-00, NA], A355:[corn, TC1507xMON810xMIR162, DAS-01507-1xMON-00810-6xSYN-IR162-4, NA], A356:[corn, TC1507xMON810xMIR162xNK603, DAS-01507-1xMON-00810-6xSYN-IR162-4xMON-00603-6, NA], A357:[corn, TC1507xMON810xMIR604, DAS-01507-1xMON-00810-6xSYN-IR604-5, NA], A358:[corn, TC1507xMON810xNK603, DAS-01507-1xMON-00810-6xMON-00603-6, Optimum (trademark) Intrasect], A359: [corn, TC1507xMON810xNK603xMIR604, DAS-01507-1xMON-00810-6xMON-00603-6xSYN-IR604-5, NA], A360:[corn, TC1507xMON88017, DAS-01507-1xMON-88017-3, NA], A361:[corn, TC1507xMON88017xDAS40278, DAS-01507-1xMON-88017-3xDAS-40278-9, NA], A362:[corn, TC1507xNK603, DAS-01507-1xMON-00603-6, Herculex (trademark) IRR], A363:[corn, TC1507xNK603xDAS40278, DAS-01507-1xMON-00603-

6xDAS-40278-9, NA], A364:[corn, TC6275, DAS-06275-8, NA], A365:[corn, VCO-01981-5, VCO-01981-5, NA], A366:[corn, DK404SR, DK404SR, NA], A367:[corn, EXP1910IT, EXP1910IT, NA], A368:[melon, MelonA, NA, NA], A369:[melon, MelonB, NA, NA], A370:[*papaya*, 55-1, CUH-CP551-8, Rainbow, SunUp], A371:[*papaya*, 63-1, CUH-CP631-7, NA], A372:[*papaya*, HuanongNo. 1, NA, HuanongNo. 1], A373:[*papaya*, X17-2, UFL-X17CP-6, NA], A374:[*petunia, Petunia*-CHS, NA, NA], A375:[plum, C-5, ARS-PLMC5-6, NA], A376:[Polish canola, HCR-1, NA, NA], A377:[Polish canola, ZSR500, NA, Hysyn101RRRoundup-Ready (trademark)], A378:[Polish canola, ZSR502, NA, Hysyn101RRRoundup-Ready (trademark)], A379:[Polish canola, ZSR503, NA, Hysyn101RRRoundup-Ready (trademark)], A380:[poplar, Btpoplar, poplar12(Populusnigra), NA, NA], A381:[poplar, Hybridpoplarclone741, NA, NA], A382:[potato, 1210amk, NA, Lugovskoiplus], A383:[potato, 2904/1kgs, NA, Elizavetaplus], A384:[potato, AM04-1020, BPS-A1020-5, StarchPotato], A385:[potato, ATBT04-27, NMK-89367-8, AtlanticNewLeaf (trademark) potato], A386:[potato, ATBT04-30, NMK-89613-2, AtlanticNewLeaf (trademark) potato], A387:[potato, ATBT04-31, NMK-89170-9, AtlanticNewLeaf (trademark) potato], A388:[potato, ATBT04-36, NMK-89279-1, AtlanticNewLeaf (trademark) potato], A389:[potato, ATBT04-6, NMK-89761-6, AtlanticNewLeaf (trademark) potato], A390:[potato, BT06, NMK-89812-3, NewLeaf (trademark) RussetBurbankpotato], A391:[potato, BT10, NMK-89175-5, NewLeaf (trademark) RussetBurbankpotato], A392:[potato, BT12, NMK-89601-8, NewLeaf (trademark) RussetBurbankpotato], A393: [potato, BT16, NMK-89167-6, NewLeaf (trademark) RussetBurbankpotato], A394:[potato, BT17, NMK-89593-9, NewLeaf (trademark) RussetBurbankpotato], A395: [potato, BT18, NMK-89906-7, NewLeaf (trademark) RussetBurbankpotato], A396:[potato, BT23, NMK-89675-1, NewLeaf (trademark) RussetBurbankpotato], A397: [potato, E12, SPS-00E12-8, Innate(registered trademark)Cultivate], A398:[potato, E24, SPS-00E24-2, NA], A399:[potato, EH92-527-1, BPS-25271EH92-527-1-9, Amflora (trademark)], A400:[potato, F10, SPS-00F10-7, Innate(registered trademark)Generate], A401:[potato, F37, SPS-00F37-7, NA], A402:[potato, G11, SPS-00G11-9, NA], A403:[potato, H37, SPS-00H37-9, NA], A404:[potato, H50, SPS-00H50-4, NA], A405:[potato, HLMT15-15, NA, Hi-LiteNewLeaf (trademark) Ypotato], A406:[potato, HLMT15-3, NA, Hi-LiteNewLeaf (trademark) Ypotato], A407:[potato, HLMT15-46, NA, Hi-LiteNewLeaf (trademark) Ypotato], A408:[potato, J3, SPS-000J3-4, Innate(registered trademark)Accelerate], A409:[potato, J55, SPS-00J55-2, NA], A410:[potato, J78, SPS-00J78-7, NA], A411:[potato, RBMT15-101, NMK-89653-6, NewLeaf (trademark) YRussetBurbankpotato], A412:[potato, RBMT21-129, NMK-89684-1, NewLeaf (trademark) PlusRussetBurbankpotato], A413:[potato, RBMT21-152, NA, NewLeaf (trademark) PlusRussetBurbankpotato], A414:[potato, RBMT21-350, NMK-89185-6, NewLeaf (trademark) PlusRussetBurbankpotato], A415:[potato, RBMT22-082, NMK-89896-6, NewLeaf (trademark) PlusRussetBurbankpotato], A416: [potato, RBMT22-186, NA, NewLeaf (trademark) PlusRussetBurbankpotato], A417: [potato, RBMT22-238, NA, NewLeaf (trademark) PlusRussetBurbankpotato], A418:[potato, RBMT22-262, NA, NewLeaf (trademark) PlusRussetBurbankpotato], A419: [potato, SEMT15-02, NMK-89935-9, ShepodyNewLeaf (trademark) Ypotato], A420:[potato, SEMT15-07, NA, ShepodyNewLeaf (trademark) Ypotato], A421:[potato, SEMT15-15, NMK-89930-4, ShepodyNewLeaf (trademark) Ypotato], A422:[potato, SPBT02-5, NMK-89576-1, SuperiorNewLeaf (trademark) potato], A423:[potato, SPBT02-7, NMK-89724-5, SuperiorNewLeaf (trademark) potato], A424:[potato, TIC-AR233-5, TIC-AR233-5, NA], A425:[potato, V11, SPS-00V11-6, Innate (registered trademark)Invigorate], A426:[potato, W8, SPS-000W8-4, Innate(registered trademark)Glaciate], A427: [potato, X17, SPS-00X17-5, Innate(registered trademark) Acclimate], A428:[potato, Y9, SPS-000Y9-7, Innate (registered trademark) Hibernate], A429:[rice, 7Crp #10, NA, NA], A430:[rice, GMShanyou63, NA, BTShanyou63], A431:[rice, Huahui-1/TT51-1, NA, Huahui-1], A432:[rice, LLRICE06, ACS-0S001-4, LibertyLink (trademark) rice], A433:[rice, LLRICE601, BCS-0S003-7, LibertyLink (trademark) rice], A434:[rice, LLRICE62, ACS-0S002-5, LibertyLink (trademark) rice], A435:[rice, Tarommolaii+cry1Ab, NA, NA], A436:[rice, CL121xCL141xCFX51, CL121xCL141xCFX51, Clearfield (trademark) Rice], A437:[rice, IMINTA-1xIMINTA-4, IMINTA-1xIMINTA-4, Clearfield (trademark) Rice], A438:[rice, PWC16, PWC16, NA], A439:[rose, WKS82/130-4-1, IFD-52401-4, NA], A440:[rose, WKS92/130-9-1, IFD-52901-9, NA], A441: [soybean, 260-05(G94-1, G94-19, G168), DD-026005-3, NA], A442:[soybean, A2704-12, ACS-GM005-3, LibertyLink (trademark) soybean], A443:[soybean, A2704-21, ACS-GM004-2, LibertyLink (trademark) soybean], A444:[soybean, A5547-127, ACS-GM006-4, LibertyLink (trademark) soybean], A445:[soybean, A5547-35, ACS-GM008-6, LibertyLink (trademark) soybean], A446:[soybean, CV127, BPS-CV127-9, Cultivance], A447:[soybean, DAS44406-6, DAS-44406-6, NA], A448:[soybean, DAS68416-4, DAS-68416-4, Enlist (trademark) Soybean], A449:[soybean, DAS68416-4xMON89788, DAS-68416-4xMON-89788-1, NA], A450:[soybean, DAS81419, DAS-81419-2, NA], A451:[soybean, DAS81419xDAS44406-6, DAS-81419-2xDAS-44406-6, NA], A452:[soybean, DP305423, DP-305423-1, Treus (trademark) or, Plenish (trademark)], A453:[soybean, DP305423xGTS40-3-2, DP-305423-1xMON-04032-6, NA], A454:[soybean, DP356043, DP-356043-5, OptimumGAT (trademark)], A455:[soybean, FG72(FG072-2, FG072-3), MST-FG072-3, NA], A456: [soybean, FG72xA5547-127, MST-FG072-3xACS-GM006-4, NA], A457:[soybean, GTS40-3-2(40-3-2), MON-04032-6, RoundupReady (trademark) soybean], A458:[soybean, GU262, ACS-GM003-1, LibertyLink (trademark) soybean], A459:[soybean, IND-00410-5, IND-00410-5, erdecaHB4Soybean], A460:[soybean, MON87701, MON-87701-2, NA], A461:[soybean, MON87701xMON89788, MON-87701-2xMON-89788-1, Intacta (trademark) RoundupReady (trademark) 2Pro], A462:[soybean, MON87705, MON-87705-6, VistiveGold (trademark)], A463:[soybean, MON87705xMON87708, MON-87705-6xMON-87708-9, NA], A464:[soybean, MON87705xMON87708xMON89788, MON-87705-6xMON-87708-9xMON-89788-1, NA], A465:soybean, MON87705xMON89788, MON-87705-6xMON-89788-1, NA], A466:[soybean, MON87708, MON-87708-9, Genuity (registered trademark)RoundupReady (trademark) 2 Xtend (trademark)], A467:[soybean, MON87708xMON89788, MON-87708-9xMON-89788-1, Roundup Ready 2 Xtend (registered trademark)NA], A468:[soybean, MON87712, MON-87712-4, NA], A469:[soybean, MON87751, MON-87751-7, NA], A470:[soybean, MON87751xMON87701xMON87708xMON89788, MON-87751-7xM0N-87701-2xM0N87708xM0N89788, NA], A471:[soybean, MON87769, MON87769-7, NA], A472: [soybean, MON87769xMON89788, MON-87769-7xMON- 89788-1, NA], A473:[soybean, MON89788, MON-89788-1, Genuity(registered trademark)Roundup Ready 2 Yield (trademark)], A474:[soybean, SYHTOH2, SYN-000H2-5, Herbicide-tolerantSoybeanline], A475:[soybean, W62, ACS-GM002-9, LibertyLink (trademark) soybean], A476: [soybean, W98, ACS-GM001-8, LibertyLink (trademark) soybean], A477:[soybean, OT96-15, OT96-15, NA], A478: [Cucurbitapepo, CZW3, SEM-OCZW3-2, NA], A479:[*Cucurbita pepo*, ZW20, SEM-0ZW20-7, NA], A480:[sugar beet, GTSB77(T9100152), SY-GTSB77-8, InVigor (trademark) sugarbeet], A481:[sugar beet, H7-1, KM-000H71-4, Roundup Ready (trademark) sugarbeet], A482:[sugar beet, T120-7, ACS-BV001-3, LibertyLink (trademark) sugarbeet], A483:[sugarcane, CTB141175/01-A, CTB141175/01-A, NA], A484:[sugarcane, NXI-1T, NXI-1T, NA], A485: [sugarcane, NXI-4T, NXI-4T, NA], A486:[sugarcane, NXI-6T, NXI-6T, NA], A487:[sunflower, X81359, X81359, Clearfield (trademark) Sunflower], A488:[sweet pepper, PK-SP01, X81359, NA], A489:[tobacco, C/F/93/08-02, NA, NA], A490:[tobacco, Vector21-41, NA, NA], A491:[tomato, 1345-4, NA, NA], A492:[tomato, 35-1-N, NA, NA], A493: [tomato, 5345, NA, NA], A494:[tomato, 8338, CGN-89322-3, NA], A495:[tomato, B, SYN-0000B-6, NA], A496:[tomato, Da, SYN-000DA-9, NA], A497:[tomato, DaDongNo9, NA, NA], A498:[tomato, F(1401F, h38F, 11013F, 7913F), SYN-0000E-1, FLAVRSAVR (trademark)], A499:[tomato, FLAVRSAVR, CGN-89564-2, FLAVRSAVR (trademark)], A500:[tomato, HuafanNo1, NA, NA], A501:[tomato, PK-TM8805R(8805R), NA, NA], A502:[wheat, MON71800, MON-71800-3, RoundupReady (trademark) wheat], A503:[wheat, AP205CL, AP205CL, Clearfield (trademark) Wheat], A504:[wheat, AP602CL, AP602CL, Clearfield (trademark) Wheat], A505:[wheat, BW255-2xBW238-3, BW255-2xBW238-3, Clearfield (trademark) Wheat], A506:[wheat, BW7, BW7, Clearfield (trademark) Wheat], A507:[wheat, Tea111A, Tea111A, Clearfield (trademark) Wheat], A508:[wheat, SWP965001, SWP965001, NA], A509:[corn, NA, NA, Agrisure Artesian (trademark)], A510:[corn, NA, NA, Optimum(registered trademark) AQUAmax(registered trademark)], A511: [canola, NA, NA, SU canola(registered trademark)], A512: [canola, NA, NA, Nexera(registered trademark)Canola], A513:[soybean, NA, NA, STS soybean], A514:[corn, NA, NA, SR corn], A514:[sunflower, NA, NA, ExpressSun(registered trademark)], A515:[rice, NA, NA, Golden rice], A516:[corn, NA, NA, Poast Protected(registered trademark) corn], A517:[sunflower, NA, NA, ExpressSun(registered trademark)], A518:[rice, NA, NA, Rrovisia (trademark) Rice], A519:[canola, NA, NA, Triazinon Tolerant Canola], A520:[corn, NA, NA, SmartStax(registered trademark) Pro], A521:[soybean, NA, NA, Credenz(registered trademark)soybean], A522:[corn, TC1507x59122, DAS-01507-1xDAS-59122-7, Optimum(registered trademark)AcreMax (registered trademark)1], A523:[corn, 4114xMON810xMIR604, DP-004114-3xMON-00810-6xSYN-IR604-5, Qrome (trademark)], A524:[cotton, NA, NA, Stoneville(registered trademark) Cotton ST5517GLTP], A525:[cotton, NA, NA, Stoneville(registered trademark) Cotton ST4848GLT], A526:[cotton, NA, NA, Stoneville(registered trademark)Cotton ST4949GLT], A527:[cotton, NA, NA, Stoneville (registered trademark) Cotton ST5020GLT], A528:[cotton, NA, NA, Stoneville (registered trademark) Cotton ST5115GLT], A529:[cotton, NA, NA, Stoneville(registered trademark)Cotton ST6182GLT], A530:[cotton, NA, NA, Stoneville (registered trademark) Cotton ST4747GLB2], A531:[cotton, NA, NA, Stoneville(registered trademark) Cotton ST4946GLB2], A532:[cotton, NA, NA, Stoneville(registered trademark) Cotton ST6448GLB2], A533:[soybean, NA, NA, Enlist E3 (trademark)], A534:[soybean, NA, NA, Enlist (trademark) Roundup Ready 2 Yield(registered trademark)], A535:[corn, NA, NA, Enlist (trademark) Roundup Ready(registered trademark)Corn 2], A536:[corn, NA, NA, Smartstax(registered trademark)Enlist (trademark)], A537:[corn, NA, NA, Powercore(registered trademark)Enlist (trademark)], A538: [cotton, NA, NA, Enlist (trademark) Cotton], A539:[cotton, NA, NA, Bollgard 3 (registered trademark)XtendFlex(registered trademark)], A540:[corn, NA, NA, SmartStax (registered trademark) RIB Complete (registered trademark) Corn], A541:[corn, NA, NA, VT Double PRO (registered trademark) RIB Complete(registered trademark) Corn], A542:[corn, NA, NA, VT Double PRO (registered trademark) Corn], A543:[corn, NA, NA, Genuity(registered trademark)VT Triple PRO (registered trademark) RIB Complete Corn], A544:[corn, NA, NA, Trecepta (trademark) Corn], A545:[soybean, NA, NA, FUKUNOMINORI], A546:[soybean, NA, NA, Yumeminori], A547:[corn, NA, NA, ZFN-12 maize], A548:[rice, NA, NA, Yumepirika], A549:[rice NA, NA, Kanto BPH No. 1], A550:[cotton, NA, MON88702, NA]

In the present invention, a neonicotinoide type compound, diamide type compound, carbamate type compound, organic phosphorous type compound, biological nematicidal compound, other insecticidal compound and nematicidal compound, azole type compound, strobilurin type compound, metalaxyl type compound, SDHI compound, other fungicidal compound, or plant growth regulator may be applied as the compound of a compound group A consisting of an insecticidal compound, nematicidal compound, fungicidal compound, or plant growth regulator to treat plants in the cultivation of crops.

As the neonicotinoid compound which may be applied to crop seeds in the present invention, the following compounds are given as examples.

clothianidin, imidacloprid, nitenpyram, acetamiprid, thiamethoxam, flupyradifurone, sulfoxaflor, triflumezopyrim, dicloromezotiaz, thiacloprid, and dinotefuran.

As the diamide type compound which may be applied to crop seeds in the present invention, the following compounds are given as examples.

flubendiamide, chlorantraniliprole, cyantraniliprole, cyclaniliprole, broflanilide, tetraniliprole, and cyhalodiamide.

As the carbamate type compound which may be applied to crop seeds in the present invention, the following compounds are given as examples.

aldicarb, oxamyl, thiodicarb, carbofuran, carbosulfan, and dimethoate.

As the organic phosphorous type compound which may be applied to crop seeds in the present invention, the following compounds are given as examples.

fenamiphos, imicyafos, fensulfothion, terbufos, fosthiazate, phosphocarb, dichlofenthion, isamidofos, isazophos, ethoprophos, cadusafos, chlorpyrifo, heterofos, mecarphon, phorate, thionazin, triazophos, diamidafos, fosthietan, and phosphamidon.

As the biological nematicide compound which may be applied to crop seeds in the present invention, the following compounds are given as examples.

Harpin Protein, *Pasteuria nishizawae, Pasteuria penetrans, Pasteuria usage, Myrothecium verrucaria, Burholderia cepacia, Bacillus chitonosporus, Paecilomyces lilacinus, Bacillus amyloliquefaciens, Bacillus firmus, Bacillus subtillis, Bacillus pumulis, Trichoderma harzianum, Hirsutella*

*rhossiliensis, Hirsutella minnesotensis, Verticillium chlamydosporum,* and *Arthrobotrys dactyloides.*

As the other insecticidal compound which may be applied to crop seeds in the present invention, the following compounds are given as examples.
fipronil, ethiprole, beta-cyfluthrin, tefluthrin, chlorpyrifos, abamectin, spirotetramat, tioxazafen, fluazaindolizine, fluensulfone, and fluxametamide.

As the azole type compound which may be applied to crop seeds in the present invention, the following compounds are given as examples.
azaconazole, bitertanol, bromuconazole, cyproconazole, difenoconazole, diniconazole, epoxyconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimenol, triticonazole, fenarimol, nuarimol, pyrifenox, imazalil, oxpoconazole fumarate, efurazoate, prochloraz, triflumizole, ipfentrifluconazole, and mefentrifluconazole.

As the strobilurin type compound which may be applied to crop seeds in the present invention, the following compounds are given as examples.
kresoxim-methyl, azoxystrobin, trifloxystrobin, fluoxastrobin, picoxystrobin, pyraclostrobin, dimoxystrobin, pyribencarb, metominostrobin, orysastrobin, and mandestrobin.

As the metalaxyl type compound which may be applied to crop seeds in the present invention, the following compounds are given as examples.
Metalaxyl and Metalaxyl-M or Mefenoxam.

As the SDHI compound which may be applied to crop seeds in the present invention, the following compounds are given as examples.
sedaxane, penflufen, carboxin, boscalid, furametpyr, flutolanil, fluxapyroxad, isopyrazam, fluopyram, isofetamid, pyraziflumid, pydiflumetofen, fluindapyr, inpyrfluxam, and thifluzamide.

As the plant growth regulator which may be applied to crop seeds in the present invention, the following compounds are given as examples.
Ethephon, chlormequat-chloride, mepiquat-chloride, 4-oxo-4-(2-phenyethyl)aminobutylic acid (hereinafter also referred to as "compound 2").

As the other fungicidal compounds which may be applied to crop seeds in the present invention, the following compounds are given as examples.
Tolclofos-methyl, thiram, captan, carbendazim, thiophanate-methyl, mancozeb, thiabendazole, isotianil, triazoxide, picarbutrazox, and oxathiapiprolin.

In the present invention, the compounds of the above group A to be applied to seeds are known compounds and can be synthesized based on already published technical literatures, and also, commercially available preparations and standard products can be obtained from the market to use.

In the present invention, compounds of a group B consisting of insecticidal compounds or fungicidal compounds may be applied to plant stems and leaves of a crop in the growing period of the crop. Specifically, examples of the compounds of the group B include a strobilurin type compound, azole type compound, SDHI compound, pyrethroid type compound, benzoylphenylurea compound, organic phosphorous type insecticidal compound, neonicotinoid type compound, and diamide type compound.

In the present invention, examples of the strobilurin type compound applied for the foliar treatment in the growing period of a crop include the following compounds: Pylacrostrobin, azoxystrobin, mandestrobin, trifloxystrobin, and picoxystrobin.

In the present invention, examples of the azole type compound applied for the foliar treatment in the growing period of a crop include the following compounds: Prothioconazole, epoxiconazole, tebuconazole, cyproconazole, propiconazole, metconazole, bromuconazole, tetraconazole, triticonazole, ipfentrifluconazole, and mefentrifluconazole.

In the present invention, examples of the SDHI compound applied for the foliar treatment in the growing period of a crop include the following compounds: Benzovindiflupyl, bixafen, fluxapyroxad, fluindapyr, and inpyrfluxam.

In the present invention, other examples of the fungicidal compound applied for the foliar treatment in the growing period of a crop include the following compounds: Tolclofos-methyl and ethaboxam.

In the present invention, examples of the pyrethroid type compound applied for the foliar treatment in the growing period of a crop include the following compounds: Bifenthrin, λ-cyhalothrin, γ-cyhalothrin, cypermethrin, fenpropathrin, ethofenprox, silafluofen, and esfenvalerate.

In the present invention, examples of the benzoylphenylurea compound applied for the foliar treatment in the growing period of a crop include the following compounds: Teflubenzuron and Triflumuron.

In the present invention, examples of the organic phosphorous type insecticidal compound applied for the foliar treatment in the growing period of a crop include the following compounds:
Acephate and methomyl.

In the present invention, examples of the neonicotinoid type insecticidal compound applied for the foliar treatment in the growing period of a crop include the following compounds:
Imidacloprid, clothianidin, thiamethoxam, sulfoxaflor, flupyradifurone, triflumezopyrim, and dicloromezotiaz.

In the present invention, examples of the diamide type insecticidal compound applied for the foliar treatment in the growing period of a crop include the following compounds:
Flubendiamide, chlorantraniliprole, cyantraniliprole, broflanilide, tetraniliprol, and cyhalodiamide.

In the present invention, the compounds of the above group B to be applied to foliar treatment are known compounds and can be synthesized based on already known patent literatures, and also, commercially available formulations and standard products can be obtained from the market to use.

In the case of applying a compound of the group A to crop seeds, the compound of the group A is usually mixed with a carrier such as a solid carrier and liquid carrier and, according to the need, further added with a formulation auxiliary agent such as a surfactant to make a formualation. Its dosage form is preferably an aqueous liquid suspension form.

As the compounds of the group A which may be applied to crop seeds in the present invention, formulations each containing a single ingredient may be used either singly or in combinations, or a formulation containing two or more ingredients may be used.

The amount of the compound of the group A to be used for the treatment is in a range of generally 0.2 to 5000 g and preferably 0.5 to 1000 g per 100 kg of seeds. Examples of the method of applying active ingredients to plant seeds include a method in which the seed is powder-coated with a preparation containing the active ingredients, a method in which the seed is dipped in the formulation containing the active ingredients, a method in which the formulation containing the active ingredients is sprayed onto the seed, and a method in which the seed is coated with the carrier containing the active ingredients.

In the present invention, ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate is applied to a cultivation area before and/or after the crop seeds are sown.

Any crop cultivation area may be used without any particular limitation as long as it is a place capable of growing crops and examples of the cultivation area include a farmland, cultivation field, no-till field, park, levee, nursery tray, nursery box, and nursery land.

Ethyl [3-[2-chloro-4-fluoro-5-(1-methyl-6-trifluoromethyl-2,4-dioxo-1,2,3,4-tetrahydropyrimidine-3-yl)phenoxy]-2-pyridyloxy]acetate is a known compound and is represented by the formula 1. This compound is called "compound X". The compound X may be manufactured by a known method such as U.S. Pat. No. 6,537,948.

[Formula 1]

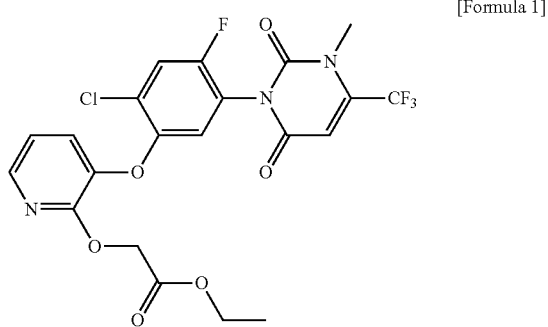 [SMILES: CCOC(=O)COc1ncccc1Oc1cc(-n2c(=O)cc(C(F)(F)F)n(C)c2=O)c(F)cc1Cl]

In a step of applying saflufenacil, trifludimoxazin, flumioxazin, or compound X, each of these compounds is usually mixed with a carrier such as a solid or liquid carrier, to which a formulation auxiliary agent such as a surfactant is further added according to the need to make a formulation. The formulation type is preferably an aqueous liquid suspension, oil suspension, wettable powder, water dispersible granule, granule, aqueous emulsion, oil-based emulsion, and emulsifiable concentrate, among which the emulsifiable concentrate is more preferable. Moreover, a formulation containing compound X singly as an active ingredient may be independently used or may be used in combination with a formulation containing other herbicides as active ingredients. Also, a formulation containing saflufenacil, trifludimoxazin, flumioxazin, or compound X, and other herbicide as active ingredients may be used. Also, a formulation containing saflufenacil, trifludimoxazin, flumioxazin, or compound X, and other herbicide as active ingredients may be used in combination with a formulation containing other herbicide as active ingredients.

Examples of the method of applying saflufenacil, trifludimoxazin, flumioxazin, or compound X onto a cultivation area include a method in which each of these compounds is sprayed on the soil of the cultivation area and a method in which each of these compounds is sprayed on weeds after these weeds sprout. The spraying is usually performed after diluting the compound in water and the amount of water to be sprayed is usually 50 to 1000 L/ha, preferably 100 to 500 L/ha, and more preferably 150 to 300 L/ha though no particular limitation is imposed on it.

The amount of saflufenacil, trifludimoxazin, flumioxazin, or compound X to be used in the step of applying it onto a cultivation area is generally 1 to 1000 g, preferably 2 to 500 g, more preferably 5 to 200 g, and even more preferably 10 to 100 g per 10000 m² of the cultivation area. In the step of applying saflufenacil, trifludimoxazin, flumioxazin, or compound X for treatment in a cultivation area, an adjuvant may be added to saflufenacil, trifludimoxazin, flumioxazin, or compound X prior to the treatment. Although no particular limitation is imposed on the kind of adjuvant, examples of the adjuvant include an oil type such as Agri-Dex or MSO, nonionic type (ester or ether of polyoxyethylene) such as Induce, anionic type (substituted sulfonate) such as gramine S, and cationic type (polyoxyethyleneamine) such as Genamin T 200BM, and organic silicone type such as Silwett L77.

The pH and hardness of the spraying dilution when applying saflufenacil, trifludimoxazin, flumioxazin, or compound X for treatment in a cultivation area are usually in a range from pH 5 to 9 and in a range from 0 to 500 in hardness though no particular limitation is imposed on the pH and hardness. When applying saflufenacil, trifludimoxazin, flumioxazin, or compound X for treatment in a cultivation area, the time zone of the application is usually in a range from 5 a.m. to 9 p.m., though no particular limitation is imposed on the time zone and the photon flux density is usually 10 to 2500 μmol/m²/s.

In the present invention, crop seeds are sown in a cultivation area using a usual method. In the method of controlling resistant weeds according to the present invention, saflufenacil, trifludimoxazin, flumioxazin, or compound X may be applied for the treatment before sowing crop seeds or may be applied when and/or after sowing crop seeds. Specifically, the number of treatments using saflufenacil, trifludimoxazin, flumioxazin, or compound X is any one of one time before, when, or after sowing crop seeds, two times excluding the time before sowing crop seeds, two times excluding the time when sowing crop seeds, or two times excluding the time after sowing crop seeds, or three times allotted to perform treatment in every timing before, when, and after the sowing.

In the case of applying saflufenacil, trifludimoxazin, flumioxazin, or compound X before sowing crop seeds, the compound is applied just before or within 50 days, preferably within 30 days, more preferably within 20 days, and even more preferably within 10 days before sowing.

In the case of applying saflufenacil, trifludimoxazin, flumioxazin, or compound X after sowing the crop seeds, the compound is usually applied during a period just after sowing and before blooming. The compound is more preferably applied during a period just after sowing and before sprouting or during a period between 1 and 6 leaf stages of the crop. When applying saflufenacil, trifludimoxazin, flumioxazin, or compound X to perform foliar treatment during a period between 1 and 6 leaf stages, this treatment may be performed simultaneously when or sequentially before or after performing the aforementioned foliar treatment using the compound of the group B. In the case of the sequential treatments, there is no particular limitation to the order.

The case where saflufenacil, trifludimoxazin, flumioxazin, or compound X is applied when sowing crop seeds implies the case where a seeding machine is integrated with a spraying machine.

When a compound of the above group B is applied for foliar treatment during a crop growing period, the compound of the group B is usually mixed with a carrier such as a solid or liquid carrier and, according to the need, a formulation auxiliary agent such as a surfactant is added to make a formulation. The formulation is preferably an emulsifiable concentrate, aqueous suspension, or aqueous soluble liquid.

When a compound of the above group B is applied for foliar treatment during a crop growing period, it is applied preferably 10 to 120 days and more preferably 21 to 90 days after sowing crop seeds. At this time, one compound selected from the compounds of the group B may be only applied or a plurality of compounds selected from the compounds of the group B may be applied for the treatment. When the plurality of compounds is applied, a plurality of formulations each singly containing one of these compounds may be used and at this time, these formulations are used either in combination or sequentially. Also, when the plurality of compounds is applied, a mixed formulation containing a plurality of compounds as active ingredients may be used.

The amount of the compound of the group B to be applied is generally 5 to 5000 g, preferably 20 to 2000 g, and more preferably 500 to 1500 g per 10000 m². In this case, when applying the compound of the group B in a cultivation area, an adjuvant may be mixed in the compound to apply the mixture in the treatment.

Examples of the weed species that are the subjects to be controlled by saflufenacil, trifludimoxazin, flumioxazin, or compound X in the present invention include, but not limited to, the following weeds:

Urticaceae: *Urtica urens*

Polygonaceae: *Polygonum convolvulus, Polygonum lapathifolium, Polygonum pensylvanicum, Polygonum persicaria, Polygonum longisetum, Polygonum aviculare, Polygonum arenastrum, Polygonum cuspidatum, Rumex japonicus, Rumex crispus, Rumex obtusifolius, Rumex acetosa* Portulacaceae: *Portulaca oleracea*

Caryophyllaceae: *Stellaria media, Stellaria aquatica, Cerastium holosteoides, Cerastium glomeratum, Spergula arvensis, Silene gallica*

Molluginaceae: *Mollugo verticillata*

Chenopodiaceae: *Chenopodium album, Chenopodium ambrosioides, Kochia scoparia, Salsola kali, Atriplex* spp.

Amaranthaceae: *Amaranthus retroflexus, Amaranthus viridis, Amaranthus lividus, Amaranthus spinosus, Amaranthus hybridus, Amaranthus palmeri, Amaranthus patulus,* waterhemp (*Amaranthus tuberculatus*=*Amaranthus rudis*=*Amaranthus tamariscinus*), *Amaranthus blitoides, Amaranthus deflexus, Amaranthus quitensis, Alternanthera philoxeroides, Alternanthera sessilis, Alternanthera tenella*

Papaveraceae: *Papaver rhoeas, Papaver dubium, Argemone mexicana*

Brassicaceae: *Raphanus raphanistrum, Raphanus sativus, Sinapis arvensis, Capsella bursa-pastoris, Brassica juncea, Brassica napus, Descurainia pinnata, Rorippa islandica, Rorippa sylvestris, Thlaspi arvense, Myagrum rugosum, Lepidium virginicum, Coronopus didymus*

Capparaceae: *Cleome affinis*

Fabaceae: *Aeschynomene indica, Aeschynomene rudis, Sesbania exaltata, Cassia obtusifolia, Cassia occidentalis, Desmodium tortuosum, Desmodium adscendens, Desmodium illinoense, Trifolium repens, Pueraria lobata, Vicia angustifolia, Indigofera hirsuta, Indigofera truxillensis, Vigna sinensis*

Oxalidaceae: *Oxalis corniculata, Oxalis strica, Oxalis oxyptera*

Geraniaceae: *Geranium carolinense, Erodium cicutarium*

Euphorbiaceae: *Euphorbia helioscopia, Euphorbia maculata, Euphorbia humistrata, Euphorbia esula, Euphorbia heterophylla, Euphorbia brasiliensis, Acalypha australis, Croton glandulosus, Croton lobatus, Phyllanthus corcovadensis, Ricinus communis*

Malvaceae: *Abutilon theophrasti, Sida rhombifolia, Sida cordifolia, Sida spinosa, Sida glaziovii, Sida santaremnensis, Hibiscus trionum, Anoda cristata, Malvastrum coromandelianum*

Onagraceae: *Ludwigia epilobioides, Ludwigia octovalvis, Ludwigia decurre, Oenothera biennis, Oenothera laciniata*

Sterculiaceae: *Waltheria indica*

Violaceae: *Viola arvensis, Viola tricolor*

Cucurbitaceae: *Sicyos angulatus, Echinocystis lobata, Momordica charantia*

Lythraceae: *Ammannia multiflora, Ammannia auriculata, Ammannia coccinea, Lythrum salicaria, Rotala indica* Elatinaceae: *Elatine triandra, Elatine californica*

Apiaceae: *Oenanthe javanica, Daucus carota, Conium maculatum*

Araliaceae: *Hydrocotyle sibthorpioides, Hydrocotyle ranunculoides*

Ceratophyllaceae: *Ceratophyllum demersum*

Cabombaceae: *Cabomba caroliniana*

Haloragaceae: *Myriophyllum aquaticum, Myriophyllum verticillatum, Myriophyllum spicatum, Myriophyllum heterophyllum,* and the like Sapindaceae: *Cardiospermum halicacabum*

Primulaceae: *Anagallis arvensis*

Asclepiadaceae: *Asclepias syriaca, Ampelamus albidus*

Rubiaceae: *Galium aparine, Galium spurium* var. *echinospermon, Spermacoce latifolia, Richardia brasiliensis, Borreria alata*

Convolvulaceae: *Ipomoea nil, Ipomoea hederacea, Ipomoea purpurea, Ipomoea hederacea* var. *integriuscula, Ipomoea lacunosa, Ipomoea triloba, Ipomoea acuminata, Ipomoea hederifolia, Ipomoea coccinea, Ipomoea quamoclit, Ipomoea grandifolia, Ipomoea aristolochiafolia, Ipomoea cairica, Convolvulus arvensis, Calystegia hederacea, Calystegia japonica, Merremia hedeacea, Merremia aegyptia, Merremia cissoides, Jacquemontia tamnifolia*

Boraginaceae: *Myosotis arvensis*

Lamiaceae: *Lamium purpureum, Lamium amplexicaule, Leonotis nepetaefolia, Hyptis suaveolens, Hyptis lophanta, Leonurus sibiricus, Stachys arvensis*

Solanaceae: *Datura stramonium, Solanum nigrum, Solanum americanum, Solanum ptycanthum, Solanum sarrachoides, Solanum rostratum, Solanum aculeatissimum, Solanum sisymbriifolium, Solanum carolinense, Physalis angulata, Physalis subglabrata, Nicandra physaloides*

Scrophulariaceae: *Veronica hederaefolia, Veronica persica, Veronica arvensis, Lindernia procumbens, Lindernia dubia, Lindernia angustifolia, Bacopa rotundifolia, Dopatrium junceum, Gratiola japonica*

Plantaginaceae: *Plantago asiatica, Plantago lanceolata, Plantago major, Callitriche palustris*

Asteraceae: *Xanthium pensylvanicum, Xanthium occidentale, Xanthium italicum, Helianthus annuus, Matricaria chamomilla, Matricaria perforata, Chrysanthemum segetum, Matricaria matricarioides, Artemisia princeps, Artemisia vulgaris, Artemisia verlotorum, Solidago altissima, Taraxacum officinale, Galinsoga ciliata, Galinsoga parviflora, Senecio vulgaris, Senecio brasiliensis, Senecio grisebachii, Conyza bonariensis, Conyza smatrensis, Conyza canadensis,* ragweed (*Ambrosia artemisiaefolia*), *Ambrosia trifida, Bidens tripartita, Bidens pilosa, Bidens frondosa, Bidens subalternans, Cirsium arvense, Cirsium vulgare, Silybum marianum, Carduus nutans, Lactuca serriola, Sonchus oleraceus, Sonchus asper, Wedelia glauca, Melampo-* dium perfoliatum, Emilia sonchifolia, Tagetes minuta, Blainvillea latifolia, Tridax procumbens, Porophyllum ruderale, Acanthospermum australe, Acanthospermum hispidum, Cardiospermum halicacabum, Ageratum conyzoides, Eupatorium perfoliatum, Eclipta alba, Erechtites hieracifolia, Gamochaeta spicata, Gnaphalium spicatum, Jaegeria hirta, Parthenium hysterophorus, Siegesbeckia orientalis, Soliva sessilis, Eclipta prostrata, Eclipta alba, Centipeda minima Alismataceae: *Sagittaria pygmaea, Sagittaria trifolia, Sagittaria sagittifolia, Sagittaria montevidensis, Sagittaria aginashi, Alisma canaliculatum, Alisma plantago-aquatica*

Limnocharitaceae: *Limnocharis flava*

Hydrocharitaceae: *Limnobium spongia, Hydrilla verticillata, Najas guadalupensis*

Araceae: *Pistia stratiotes*

Lemnaceae: *Lemna aoukikusa, Spirodela polyrhiza, Wolffia spp.*

Potamogetonaceae: *Potamogeton distinctus, Potamogeton crispus, Potamogeton illinoensis, Stuckenia pectinata*, and the like Liliaceae: *Allium canadense, Allium vineale, Allium macrostemon*

Pontederiaceae: *Eichhornia crassipes, Heteranthera limosa, Monochoria korsakowii, Monochoria vaginalis*

Commelinaceae: *Commelina communis, Commelina bengharensis, Commelina erecta, Murdannia keisak*

Poaceae: *Echinochloa crus-galli, Echinochloa oryzicola, Echinochloa crus-galli var formosensis, Echinochloa oryzoides, Echinochloa colona, Echinochloa crus-pavonis, Setaria viridis, Setaria faberi, Setaria glauca, Setaria geniculata, Digitaria ciliaris, Digitaria sanguinalis, Digitaria horizontalis, Digitaria insularis, Eleusine indica, Poa annua, Poa trivialis, Poa pratensis, Alopecurus aequalis, Alopecurus myosuroides, Avena fatua, Sorghum halepense, Sorghum vulgare, Agropyron repens, Lolium multiflorum, Lolium perenne, Lolium rigidum, Bromus catharticus, Bromus sterilis, Bromus japonicus, Bromus secalinus, Bromus tectorum, Hordeum jubatum, Aegilops cylindrica, Phalaris arundinacea, Phalaris minor, Apera spica-venti, Panicum dichotomiflorum, Panicum texanum, Panicum maximum, Brachiaria platyphylla, Brachiaria ruziziensis, Brachiaria plantaginea, Brachiaria decumbens, Brachiaria brizantha, Brachiaria humidicola, Cenchrus echinatus, Cenchrus pauciflorus, Eriochloa villosa, Pennisetum setosum, Chloris gayana, Chloris virgata, Eragrostis pilosa, Rhynchelitrum repens, Dactyloctenium aegyptium, Ischaemum rugosum, Isachne globosa, Oryza sativa, Paspalum notatum, Paspalum maritimum, Paspalum distichum, Pennisetum clandestinum, Pennisetum setosum, Rottboellia cochinchinensis, Leptochloa chinensis, Leptochloa fascicularis, Leptochloa filiformis, Leptochloa panicoides, Leersia japonica, Leersia sayanuka, Leersia oryzoides, Glyceria leptorrhiza, Glyceria acutiflora, Glyceria maxima, Agrostis gigantea, Agrostis stolonifera, Cynodon dactylon, Dactylis glomerata, Eremochloa ophiuroides, Festuca arundinacea, Festuca rubra, Imperata cylindrica, Miscanthus sinensis, Panicum virgatum, Zoysia japonica*

Cyperaceae: *Cyperus microiria, Cyperus iria, Cyperus compressus, Cyperus difformis, Cyperus flaccidus, Cyperus globosus, Cyperus nipponicus, Cyperus odoratus, Cyperus serotinus, Cyperus rotundus, Cyperus esculentus, Kyllinga gracillima, Kyllinga brevifolia, Fimbristylis miliacea, Fimbristylis dichotoma, Eleocharis acicularis, Eleocharis kuroguwai, Schoenoplectiella hotarui, Schoenoplectiella juncoides, Schoenoplectiella wallichii, Schoenoplectiella mucronatus, Schoenoplectiella triangulatus, Schoenoplec-* *tiella nipponicus, Schoenoplectiella triqueter, Bolboschoenus koshevnikovii, Bolboschoenus fluviatilis*

Equisetaceae: *Equisetum arvense, Equisetum palustre*

Salviniaceae: *Salvinia natans*

Azollaceae: *Azolla japonica, Azolla imbricata*

Marsileaceae: *Marsilea quadrifolia.*

Other weeds: filamentous algae (*Pithophora* and *Cladophora*), mosses, bryophyte, hornwort, cyanobacteria, bracken, and suckers of perennial crops (for example, pome fruits, stone fruits, berries, tree nuts, citrus fruits, hop, and grape).

In the present invention, specific PPO inhibitor resistant weeds which are control targets each have one or more mutations selected from an Arg128Met mutation, Arg128Gly mutation, Arg128His mutation, and Gly399Ala mutation. PPO means protoporphyrinogen oxidase. Although PPO1 and PPO2 are usually included in PPO of weeds, the above mutation may be contained in any one of PPO1 and PPO2 or both. The case where the mutation is contained in PPO2 is preferable.

For example, Arg128Met means that the relevant mutation exists on the 128th (the number is standardized in PPO2 of waterhemp) amino acid. In PPO2 of a ragweed, the relevant mutation corresponds to the 98th amino acid (Weed Science 60, 335-344) as known by the notation "Arg98Leu". The notation "Arg98Leu" in this case is equal to "Arg128Leu" defined in the present invention. The Arg128Met mutation and Arg128Gly mutation in PPO of a weed that is a control target in the present invention are known in the case of *Amaranthus palmeri* (Pest Management Science 73, 1159-1563), the Arg128His mutation is known in the case of *Lolium rigidum* (WSSA annual meeting, 2018), and the Gly399Ala mutation is known in the case of *Amaranthus palmeri* (WSSA annual meeting, 2018). Although resistant weeds disclosed in these reports are efficiently controlled in the present invention, the weed in the present invention is not limited to the above resistant weeds. In other words, other weeds having the relevant amino acid mutations are controlled in the same manner. Not only *Amaranthus palmeri* having an Arg128Met mutation, Arg128Gly mutation, Arg128His mutation, or Gly399Ala mutation, but also, for example, waterhemp having the same mutations, ragweed having the same mutations, *Lolium rigidum* having the same mutations, *Lolium multiflorum* having the same mutations, and *Euphorbia heterophylla* having the same mutations are efficiently controlled.

In the method of controlling resistant weeds according to the present invention, the above PPO inhibitor resistant weeds can be controlled by applying saflufenacil, trifludimoxazin, flumioxazin, or compound X in a crop cultivation area. In this case, the above PPO inhibitor resistant weeds are not resistant to the compound to be applied. In the PPO inhibitor resistant weeds, there is no particular limitation to an intraspecific variation in traits other than PPO inhibitor resistance. In other words, the above PPO inhibitor resistant weeds may also include those which are deteriorated in sensitivity to specific herbicides other than the PPO inhibitor and have traits resistant to these herbicides. The deterioration in sensitivity and the resistance may be due to either a mutation at a target site (target-site mutation) or a factor that is not a mutation at a target site (non target-site mutation). Examples of the non target-site mutation include increase in metabolism, malabsorption, transition failure, and external excretion. Examples of the factor promoting metabolism include those caused by increase in the activities of metabolases such as cytochrome P450 monooxygenase, allylacylamidase, esterase, and glutathione S-transferase. Examples of factor of the external excretion include those caused by transportation into vacuoles which is driven by an ABC transporter. Examples of the target-site mutations include any one of the followings in ALS genes or those substituted with a plurality of amino acids: Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Arg377His, Trp574Leu, Trp574Gly, Trp574Met, Ser653Thr, Ser653Thr, Ser653Asn, Ser635Ile, Gly654Glu, and Gly645Asp. Similarly, examples of the deterioration in the sensitivity of weeds caused by target-site mutations include any one of the followings in ACCase genes or those substituted with a plurality of amino acids: Ile1781Leu, Ile1781Val, Ile1781Thr, Trp1999Cys, Trp1999Leu, Ala2004Val, Trp2027Cys, Ile2041Asn, Ile2041Val, Asp2078Gly, and Cys2088Arg. Similarly, examples of the deterioration in the sensitivity of weeds caused by target-site mutations include those substituted with amino acids in EPSP genes such as Thr102Ile, Pro106Ser, Pro106Ala, and Pro106Leu. Particularly, glyphosate resistant weeds such as *Eleusine indica, Lolium multiflorum, Lolium rigidum*, waterhemp, and *Echinochloa colona* containing one or a plurality of these mutations (for example, a double mutation of Thr102Ile and Pro106Ser) are efficiently controlled even if they further have the above mutations in PPO. Similarly, examples of the deterioration in the sensitivity of weeds caused by mutations at a site of action include those increased in the number of copies of EPSP genes, weeds such as *Amaranthus palmeri*, waterhemp, and *Kochia scoparia* which each have the above mutation and glyphosate resistance are efficiently controlled even if they each further have the above mutations in PPO. Glyphosate resistant *Conyza canadensis, Conyza sumatrensis*, and *Conyza bonariensis* in which an ABC transporter is involved are efficiently controlled even if they each have the above mutations in PPO.

In the method of controlling resistant weeds according to the present invention, one or more different herbicides, plant growth regulators, and safeners may be used in combination with saflufenacil, trifludimoxazin, flumioxazin, or compound X. Here, the description "used in combination with" includes blending (tank mixing), mixing (premixing), and sequential treatments and in the case of the sequential treatments, the order is not particularly limited.

Examples of the above herbicides, plant growth regulators, and safeners include the following compounds:

Herbicides: 2,3,6-TBA (2,3,6-trichlorobenzoic acid), 2,3,6-TBA-dimethylammonium, 2,3,6-TBA lithium salt, 2,3,6-TBA potassium salt, 2,3,6-TBA sodium salt, 2,4-D, 2,4-D choline salt, 2,4-D BAPMA salt (2,4-D N,N-bis(3-aminopropyl)methylamine salt), 2,4-D-2-butoxypropyl, 2,4-D-2-ethylhexyl, 2,4-D-3-butoxypropyl, 2,4-D ammonium, 2,4-D-butotyl, 2,4-D-butyl, 2,4-D-diethylammonium, 2,4-D-dimethylammonium, 2,4-D diolamine salt, 2,4-D-dodecylammonium, 2,4-D-ethyl, 2,4-D-heptylammonium, 2,4-D-isobutyl, 2,4-D-isooctyl, 2,4-D-isopropyl, 2,4-D-isopropylammonium, 2,4-D-lithium salt, 2,4-D-meptyl, 2,4-D-methyl, 2,4-D-octyl, 2,4-D-pentyl, 2,4-D-propyl, 2,4-D-sodium salt, 2,4-D-tefuryl, 2,4-D-tetradecylammonium, 2,4-D-triethylammonium, 2,4-D-tris(2-hydroxypropyl) ammonium, 2,4-D-trolamine salt, 2,4-DB, 2,4-DB choline salt, 2,4-DB BAPMA salt (2,4-DB N,N-bis(3-aminopropyl)methylamine salt), 2,4-DB-butyl, 2,4-DB-dimethylammonium, 2,4-DB-isoctyl, 2,4-DB-potassium salt, 2,4-DB sodium salt, acetochlor, acifluorfen, acifluorfen-sodium salt, aclonifen, ACN(2-amino-3-chloronaphthalene-1,4-dione), alachlor, allidochlor, alloxydim, ametryn, amicarbazone, amidosulfuron, aminocyclopyrachlor, aminocyclopyrachlor-methyl, aminocyclopyrachlor-potassium salt, aminopyralid (aminopyralid), aminopyralid choline salt, aminopyralid-potassium salt, aminopyralid-tris(2-hydroxypropyl)ammonium, amiprophos-methyl, amitrole, anilofos, asulam, atrazine, azafenidin, azimsulfuron, beflubutamid, benazolinethyl, bencarbazone, benfluralin, benfuresate, bensulfuron, bensulfuron-methyl, bensulide, bentazon, benthiocarb, benzfendizone, benzobicyclon, benzofenap, benzthiazuron, bialafos (bialafos or bialaphos), bicyclopyrone, bifenox, bispyribac, bispyribac-sodium salt, bromacil, bromobutide, bromofenoxim, bromoxynil, bromoxynil-octanoate, butachlor, butafenacil, butamifos, butralin, butroxydim, butylate, cafenstrole, carbetamide, carfentrazone, carfentrazone-ethyl, chlomethoxyfen, chloramben, chloridazon, chlorimuron, chlorimuron-ethyl, chlorobromuron, chlorotoluron, chloroxuron, chlorpropham, chlorsulfuron, chlorthal-dimethyl, chlorthiamide, cinidon, cinidon-ethyl, cinmethylin, cinosulfuron, clethodim, clodinafop, clodinafop-propargyl, clomazone, clomeprop, clopyralid, clopyralid choline salt, clopyralid-methyl, clopyralid-olamine, clopyralid-potassium salt, clopyralid-tris (2-hydroxypropyl)ammonium, cloransulam, cloransulam-methyl, cumyluron, cyanazine, cyclopyranil, cycloate, cyclopyrimorate, cyclosulfamuron, cycloxydim, cyhalofop, cyhalofop-butyl, daimuron, dalapon, dazomet, desmedipham, desmetryn, di-allate, dicamba, dicamba choline salt, dicamba BAPMA salt (dicamba N,N-bis(3-aminopropyl)methylamine salt), dicamba-trolamine salt, dicamba-diglycolamine salt, dicamba-dimethylammonium, dicamba-diolamine salt, dicamba-isopropylammonium, dicamba-methyl, dicamba-olamine salt, dicamba-potassium salt, dicamba-sodium salt, dichlobenil, dichlorprop, dichlorprop choline salt), dichlorprop BAPMA salt (dichlorprop N,N-bis(3-aminopropyl)methylamine salt), dichlorprop-2-ethylhexyl, dichlorprop-butotyl, dichlorprop-dimethylammonium, dichlorprop-ethylammonium, dichlorprop-isoctyl, dichlorprop-methyl, dichlorprop-P, dichlorprop-P choline salt, dichlorprop-P BAPMA salt (dichlorprop-P N,N-bis(3-aminopropyl)methylamine salt), dichlorprop-P-2-ethylhexyl, dichlorprop-P-dimethylammonium, dichlorprop-potassium, dichlorprop-sodium salt, diclofop, diclofop-methyl, diclosulam, difenoxuron, difenzoquat, diflufenican, diflufenzopyr, diflufenzopyr-sodium salt, dimefuron, dimepiperate, dimethachlor, dimethametryn, dimethenamid, dimethenamid-P, dimepiperate, dinitramine, dinoseb, dinoterb, diphenamid, diquat, diquat-dibromide, DSMA (disodium methylarsonate), dithiopyr, diuron, DNOC (2-methyl-4,6-dinitrophenol), esprocarb, ethalfluralin, ethametsulfuron, ethametsulfuron-methyl, ethidimuron, ethofumesate, ethoxyfen-ethyl, ethoxysulfuron, etobenzanid, fenoxaprop, fenoxaprop-ethyl, fenoxaprop-P, fenoxaprop-P-ethyl, fenoxasulfone, fenquinotrione, fentrazamide, fenuron, flamprop-M, flazasulfuron, florasulam, florpyrauxifen, florpyrauxifen-benzyl, fluazifop, fluazifop-butyl, fluazifop-P, fluazifop-P-butyl, fluazolate, flucarbazone, flucarbazone-sodium salt, flucetosulfuron, flufenacet, flufenpyr, flufenpyr-ethyl, flumetsulam, flumiclorac, flumiclorac-pentyl, fluometuron, fluoroglycofen-ethyl, flupoxam, flupropanate, flupyrsulfuron, flupyrsulfuron-methyl-sodium, flurenol, fluridone, flurochloridone, fluroxypyr, fluroxypyr-meptyl, flurtamone, fluthiacet, fluthiacet-methyl, fomesafen, fomesafen-sodium, foramsulfuron, fosamine, glufosinate, glufosinate-ammonium salt, glufosinate-P, glufosinate-P-ammonium salt, glufosinate-P-sodium salt, glyphosate, glyphosate choline salt, glyphosate guanidine derivative salts, glyphosate isopropylamine salt, glyphosate BAPMA salt (glyphosate N,N-bis(3-aminopropyl)

methylamine salt), glyphosate-ammonium salt, glyphosate-diammonium salt, glyphosate-potassium salt, glyphosate-sodium salt, glyphosate-trimethylsulfonium salt, halauxifen, halauxifen-methyl, halosafen, halosulfuron, halosulfuron-methyl, haloxyfop, haloxyfop-etotyl, haloxyfop-methyl, haloxyfop-P, haloxyfop-P-etotyl, haloxyfop-P-methyl, hexazinone, imazamethabenz, imazamethabenz-methyl, imazamox, imazamox-ammonium salt, imazapic, imazapic-ammonium salt, imazapyr, imazapyr-isopropylammonium salt, imazaquin, imazaquin-ammonium salt, imazethapyr, imazethapyr-ammonium salt, imazosulfuron, indanofan, indaziflam, iodosulfuron, iodosulfuron-methyl-sodium, iofensulfuron, iofensulfuron-sodium, ioxynil, ioxynil-octanoate, ipfencarbazone, isoproturon, isouron, isoxaben, isoxachlortole, isoxaflutole, lactofen, lenacil, linuron, maleic acid hydrazide, MCPA (2-(4-chloro-2-methylphenoxy)acetic acid), MCPA choline salt, MCPA BAPMA salt (MCPA N,N-bis(3-aminopropyl)methylamine salt), MCPA 2-ethylhexyl, MCPA butotyl (MCPA-butotyl), MCPA butyl, MCPA-dimethylammonium, MCPA diolamine salt, MCPA-ethyl, MCPA isobutyl, MCPA-isoctyl, MCPA-isopropyl, MCPA-methyl, MCPA-olamine salt, MCPA-sodium salt, MCPA-trolamine salt, MCPB (4-(4-chloro-2-methylphenoxy)butanoic acid), MCPB choline salt, MCPB BAPMA salt (MCPB N,N-bis(3-aminopropyl)methylamine salt), MCPB-ethyl, MCPB-methyl, MCPB-sodium salt, mecoprop, mecoprop choline salt, mecoprop BAPMA salt (mecoprop N,N-bis(3-aminopropyl)methylamine salt), mecoprop-2-ethylhexyl, mecoprop-dimethylammonium, mecoprop-diolamine salt, mecoprop-ethadyl, mecoprop-isoctyl, mecoprop-methyl, mecoprop-potassium salt, mecoprop-sodium salt, mecoprop-trolamine salt, mecoprop-P, mecoprop-P choline salt, mecoprop-P-2-ethylhexyl, mecoprop-P-dimethylammonium, mecoprop-P-isobutyl, mecoprop-P-potassium salt, mefenacet, mesosulfuron, mesosulfuron-methyl, mesotrione, metam, metamifop, metamitron, metazachlor, metazosulfuron, methabenzthiazuron, methiozolin, methyl-daymuron, metobromuron, metolachlor, metosulam, metoxuron, metribuzin, metsulfuron, metsulfuron-methyl, molinate, monolinuron, naproanilide, napropamide, napropamide-M, naptalam, neburon, nicosulfuron, norflurazon, oleic acid, orbencarb, orthosulfamuron, oryzalin, oxadiargyl, oxadiazon, oxasulfuron, oxaziclomefone, oxyfluorfen, paraquat, paraquat-dichloride, pebulate, pelargonic acid, pendimethalin, penoxsulam, pentanochlor, pentoxazone, pethoxamid, phenisopham, phenmedipham, picolinafen, pinoxaden, piperophos, pretilachlor, primisulfuron, primisulfuron-methyl, prodiamine, profluazol, profoxydim, prometon, prometryn, propachlor, propanil, propaquizafop, propazine, propham, propisochlor, propoxycarbazone, propoxycarbazone-sodium salt, propyrisulfuron, propyzamide, prosulfocarb, prosulfuron, pyraclonil, pyraflufenethyl, pyrasulfotole, pyrazolynate, pyrazosulfuron, pyrazosulfuron-ethyl, pyrazoxyfen, pyribenzoxim, pyributicarb, pyridafol, pyridate, pyriftalid, pyriminobac, pyriminobac-methyl, pyrimisulfan, pyrithiobac, pyrithiobac-sodium salt, pyroxasulfone, pyroxsulam, quinclorac, quinmerac, quizalofop, quizalofop-ethyl, quizalofop-tefuryl, quizalofop-P, quizalofop-P-ethyl, quizalofop-P-tefuryl, rimsulfuron, sethoxydim, EPIC (S-ethyl N,N-dipropylcarbamothioate), siduron, simazine, simetryn, S-metolachlor, MSMA (sodium hydrogen methylarsonate), sulcotrione, sulfentrazone, sulfometuron, sulfometuron-methyl, sulfosulfuron, swep, TCA (2,2,2-trichloroacetic acid), tebutam, tebuthiuron, tefuryltrione, tembotrione, tepraloxydim, terbacil, terbumeton, terbuthylazine, terbutryn, thaxtomin A, thenylchlor, thiazopyr, thidiazimin, thiencarbazone, thiencarbazone-methyl, thifensulfuron, thifensulfuron-methyl, tiafenacil, tiocarbazil, tolpyralate, topramezone, tralkoxydim, triafamone, tri-allate, triasulfuron, triaziflam, tribenuron, tribenuron-methyl, triclopyr, triclopyr-butotyl, triclopyr-ethyl, triclopyr-triethylammonium, tridiphane, trietazine, trifloxysulfuron, trifloxysulfuron-sodium salt, trifluralin, triflusulfuron, triflusulfuron-methyl, tritosulfuron, vernolate, and ethyl [(3-{2-chloro-4-fluoro-5-[3-methyl-4-(trifluoromethyl)-2,6-dioxo-1,2,3,6-tetrahydropyrimidin-1-yl]phenoxy}pyridin-2-yl)oxy]acetate (353292-31-6).

Safener: allidochlor, benoxacor, cloquintocet, cloquintocet-mexyl, cyometrinil, cyprosulfamide, dichlormid, dicyclonone, dimepiperate, disulfoton, daiymuron, fenchlorazole, fenchlorazole-ethyl, fenclorim, flurazole, furilazole, fluxofenim, hexim, isoxadifen, isoxadifen-ethyl, mecoprop, mefenpyr, mefenpyr-ethyl, mefenpyr-diethyl, mephenate, metcamifen, oxabetrinil, 1,8-naphthalic anhydride, 1,8-octamethylene diamine, AD-67 (4-(dichloroacetyl)-1-oxa-4-azaspiro [4.5] decane), MCPA (2-(4-chloro-2-methylphenoxy)acetic acid), CL-304415 (4-carboxy-3,4-dihydro-2H-1-benzopyran-4-acetic acid), CSB (1-bromo-4-[(chloromethyl)sulfonyl]benzene), DKA-24 (2,2-dichloro-N-[2-oxo-2-(2-propenylamino)ethyl]-N-(2-propenyl) acetamide), MG191 (2-(dichloromethyl)-2-methyl-1,3-dioxolane), MG-838 (2-propenyl 1-oxa-4-azaspiro[4.5] decane-4-carbodithioate), PPG-1292 (2,2-dichloro-N-(1,3-dioxan-2-ylmethyl)-N-(2-propenyl)acetamide), R-28725 (3-(dichloroacetyl)-2,2-dimethyl-1,3-oxazolidine), R-29148 (3-(dichloroacetyl)-2,2,5-trimethyl-1,3-oxazolidine), and TI-35 (1-(dichloroacetyl)azepane).

Plant growth regulator: hymexazol, paclobutrazol, uniconazole, uniconazole-P, inabenfide, prohexadione-calcium, 1-methylcyclopropene, and trinexapac.

As the herbicide which may be used in combination with saflufenacil, trifludimoxazin, flumioxazin, or compound X in the present invention, glyphosate potassium salt, glyphosate guanidine salt, glyphosate dimethylamine salt, glyphosate monoethanolamine salt, glufosinate ammonium salt, glyphosate isopropylammonium salt, flumiclorac-pentyl, clethodim, lactofen, S-metolachlor, metribuzin, flufenacet, nicosulfuron, rimsulfuron, acetochlor, mesotrione, isoxaflutole, chlorimuron-ethyl, thifensulfuron-methyl, cloransulam-methyl, imazethapyr-ammonium salt, and metribuzin are particularly preferable.

As the safener which may be used in combination with saflufenacil, trifludimoxazin, flumioxazin, or compound X in the present invention, cyprosulfamide, benoxacor, dichlormid, and furilazole are particularly preferable.

Examples of the combinations of saflufenacil, trifludimoxazin, flumioxazin, or compound X and herbicide and/or safener are given below, but not limited to the following combinations. The ratio by weight of each compound to saflufenacil, trifludimoxazin, flumioxazin, or compound X to be combined is usually 0.01 to 1000 times, preferably 0.1 to 100 times, and more preferably 1 to 10 times.

Specific combinations are disclosed below. Also, those in which the compound X is replaced with trifludimoxazin are disclosed at the same time. Also, those in which the compound X is replaced with saflufenacil are disclosed at the same time. Also, those in which the compound X is replaced with flumioxazin are disclosed at the same time. Also, those in which the compound X is replaced with the compound X+flumioxazin are disclosed at the same time. Also, those in which the compound X is replaced with saflufenacil+trifludimoxazin are disclosed at the same time:
Combination of the compound X and quinclorac;
Combination of the compound X and quinmerac;

Combination of the compound X and bromoxynil;
Combination of the compound X and bromoxynil-octanoate;
Combination of the compound X and dichlobenil;
Combination of the compound X and methiozolin;
Combination of the compound X and ioxynil;
Combination of the compound X and ioxynil-octanoate;
Combination of the compound X and di-allate;
Combination of the compound X and butylate;
Combination of the compound X and tri-allate;
Combination of the compound X and phenmedipham;
Combination of the compound X and chlorpropham;
Combination of the compound X and desmedipham;
Combination of the compound X and asulam;
Combination of the compound X and phenisopham;
Combination of the compound X and benthiocarb;
Combination of the compound X and molinate;
Combination of the compound X and esprocarb;
Combination of the compound X and pyributicarb;
Combination of the compound X and prosulfocarb;
Combination of the compound X and orbencarb;
Combination of the compound X and EPTC;
Combination of the compound X and dimepiperate;
Combination of the compound X and swep;
Combination of the compound X and propachlor;
Combination of the compound X and metazachlor;
Combination of the compound X and alachlor;
Combination of the compound X and acetochlor;
Combination of the compound X and metolachlor;
Combination of the compound X and S-metolachlor;
Combination of the compound X and butachlor;
Combination of the compound X and pretilachlor;
Combination of the compound X and thenylchlor;
Combination of the compound X and aminocyclopyrachlor;
Combination of the compound X and aminocyclopyrachlor-methyl;
Combination of the compound X and aminocyclopyrachlor-potassium;
Combination of the compound X and trifluralin;
Combination of the compound X and pendimethalin;
Combination of the compound X and ethalfluralin;
Combination of the compound X and benfluralin;
Combination of the compound X and prodiamine;
Combination of the compound X and simazine;
Combination of the compound X and atrazine;
Combination of the compound X and propazine;
Combination of the compound X and cyanazine;
Combination of the compound X and ametryn;
Combination of the compound X and simetryn;
Combination of the compound X and dimethametryn;
Combination of the compound X and indaziflam;
Combination of the compound X and triaziflam;
Combination of the compound X and metribuzin;
Combination of the compound X and hexazinone;
Combination of the compound X and terbumeton;
Combination of the compound X and terbuthylazine;
Combination of the compound X and terbutryn;
Combination of the compound X and trietazine;
Combination of the compound X and isoxaben;
Combination of the compound X and diflufenican;
Combination of the compound X and diuron;
Combination of the compound X and linuron;
Combination of the compound X and metobromuron;
Combination of the compound X and metoxuron;
Combination of the compound X and monolinuron;
Combination of the compound X and siduron;
Combination of the compound X and fluometuron;
Combination of the compound X and difenoxuron;
Combination of the compound X and methyl-daymuron;
Combination of the compound X and isoproturon;
Combination of the compound X and isouron;
Combination of the compound X and tebuthiuron;
Combination of the compound X and benzthiazuron;
Combination of the compound X and methabenzthiazuron;
Combination of the compound X and propanil;
Combination of the compound X and mefenacet;
Combination of the compound X and clomeprop;
Combination of the compound X and naproanilide;
Combination of the compound X and bromobutide;
Combination of the compound X and daimuron;
Combination of the compound X and cumyluron;
Combination of the compound X and diflufenzopyr;
Combination of the compound X and etobenzanid;
Combination of the compound X and bentazon;
Combination of the compound X and tridiphane;
Combination of the compound X and indanofan;
Combination of the compound X and amitrole;
Combination of the compound X and fenchlorazole-ethyl;
Combination of the compound X and mefenpyr-diethyl;
Combination of the compound X and benoxacor;
Combination of the compound X and dichlormid;
Combination of the compound X and cloquintocet-mexyl;
Combination of the compound X and cyprosulfamide;
Combination of the compound X and isoxadifen-ethyl;
Combination of the compound X and clomazone;
Combination of the compound X and maleic acid hydrazide;
Combination of the compound X and pyridate;
Combination of the compound X and chloridazon;
Combination of the compound X and bromacil;
Combination of the compound X and terbacil;
Combination of the compound X and lenacil;
Combination of the compound X and oxaziclomefone;
Combination of the compound X and cinmethylin;
Combination of the compound X and benfuresate;
Combination of the compound X and cafenstrole;
Combination of the compound X and flufenacet;
Combination of the compound X and pyrithiobac;
Combination of the compound X and pyrithiobac-sodium salt;
Combination of the compound X and pyriminobac;
Combination of the compound X and pyriminobac-methyl;
Combination of the compound X and bispyribac;
Combination of the compound X and bispyribac-sodium salt;
Combination of the compound X and pyribenzoxim;
Combination of the compound X and pyrimisulfan;
Combination of the compound X and pyriftalid;
Combination of the compound X and triafamone;
Combination of the compound X and fentrazamide;
Combination of the compound X and dimethenamid;
Combination of the compound X and dimethenamid-P;
Combination of the compound X and ACN;
Combination of the compound X and dithiopyr;
Combination of the compound X and triclopyr;
Combination of the compound X and triclopyr-butotyl;
Combination of the compound X and triclopyr-ammonium salt;
Combination of the compound X and fluroxypyr;
Combination of the compound X and fluroxypyr-meptyl;
Combination of the compound X and thiazopyr;
Combination of the compound X and aminopyralid;
Combination of the compound X and aminopyralid-potassium salt;
Combination of the compound X and aminopyralid-triisopanol-ammonium salt;

Combination of the compound X and clopyralid-olamine salt;
Combination of the compound X and clopyralid-potassium salt;
Combination of the compound X and clopyralid-triethylammonium salt;
Combination of the compound X and picloram-potassium salt;
Combination of the compound X and picloram-triisopanol-ammonium salt;
Combination of the compound X and dalapon;
Combination of the compound X and chlorthiamid;
Combination of the compound X and amidosulfuron;
Combination of the compound X and azimsulfuron;
Combination of the compound X and bensulfuron-methyl;
Combination of the compound X and chlorimuron-ethyl;
Combination of the compound X and cyclosulfamuron;
Combination of the compound X and ethoxysulfuron;
Combination of the compound X and flazasulfuron;
Combination of the compound X and flucetosulfuron;
Combination of the compound X and flupyrsulfuron-methyl-sodium;
Combination of the compound X and foramsulfuron;
Combination of the compound X and halosulfuron-methyl;
Combination of the compound X and imazosulfuron;
Combination of the compound X and mesosulfuron-methyl;
Combination of the compound X and metazosulfuron;
Combination of the compound X and nicosulfuron;
Combination of the compound X and orthosulfamuron;
Combination of the compound X and oxasulfuron;
Combination of the compound X and primisulfuron-methyl;
Combination of the compound X and propyrisulfuron;
Combination of the compound X and pyrazosulfuron-ethyl;
Combination of the compound X and rimsulfuron;
Combination of the compound X and sulfometuron-methyl;
Combination of the compound X and sulfosulfuron;
Combination of the compound X and trifloxysulfuron-sodium salt;
Combination of the compound X and chlorsulfuron;
Combination of the compound X and cinosulfuron;
Combination of the compound X and ethametsulfuron-methyl;
Combination of the compound X and iodosulfuron-methyl-sodium;
Combination of the compound X and iofensulfuron-sodium;
Combination of the compound X and metsulfuron-methyl;
Combination of the compound X and prosulfuron;
Combination of the compound X and thifensulfuron-methyl;
Combination of the compound X and triasulfuron;
Combination of the compound X and tribenuron-methyl;
Combination of the compound X and triflusulfuron-methyl;
Combination of the compound X and tritosulfuron;
Combination of the compound X and picolinafen;
Combination of the compound X and beflubutamid;
Combination of the compound X and norflurazon;
Combination of the compound X and fluridone;
Combination of the compound X and flurochloridone;
Combination of the compound X and flurtamone;
Combination of the compound X and benzobicyclon;
Combination of the compound X and bicyclopyrone;
Combination of the compound X and mesotrion;
Combination of the compound X and sulcotrione;
Combination of the compound X and tefuryltrione;
Combination of the compound X and tembotrione;
Combination of the compound X and isoxachlortole;
Combination of the compound X and isoxaflutole;
Combination of the compound X and benzofenap;
Combination of the compound X and pyrasulfotole;
Combination of the compound X and pyrazolynate;
Combination of the compound X and pyrazoxyfen;
Combination of the compound X and topramezone;
Combination of the compound X and tolpyralate;
Combination of the compound X and lancotrion-sodium salt;
Combination of the compound X and flupoxam;
Combination of the compound X and amicarbazone;
Combination of the compound X and bencarbazone;
Combination of the compound X and flucarbazone-sodium salt;
Combination of the compound X and ipfencarbazone;
Combination of the compound X and propoxycarbazone-sodium salt;
Combination of the compound X and thiencarbazone-methyl;
Combination of the compound X and cloransulam-methyl;
Combination of the compound X and diclosulam;
Combination of the compound X and florasulam;
Combination of the compound X and flumetsulam;
Combination of the compound X and metosulam;
Combination of the compound X and penoxsulam;
Combination of the compound X and pyroxsulam;
Combination of the compound X and imazamethabenz-methyl;
Combination of the compound X and imazamox-ammonium salt;
Combination of the compound X and imazapic-ammonium salt;
Combination of the compound X and imazapyr-isopropylammonium salt;
Combination of the compound X and imazaquin-ammonium salt;
Combination of the compound X and imazethapyr-ammonium salt;
Combination of the compound X and clodinafop-propargyl;
Combination of the compound X and cyhalofop-butyl;
Combination of the compound X and diclofop-methyl;
Combination of the compound X and fenoxaprop-ethyl;
Combination of the compound X and fenoxaprop-P-ethyl;
Combination of the compound X and fluazifop-butyl;
Combination of the compound X and fluazifop-P-butyl;
Combination of the compound X and haloxyfop-methyl;
Combination of the compound X and haloxyfop-P-methyl;
Combination of the compound X and propaquizafop;
Combination of the compound X and quizalofop-ethyl;
Combination of the compound X and quizalofop-P-ethyl;
Combination of the compound X and alloxydim;
Combination of the compound X and clethodim;
Combination of the compound X and sethoxydim;
Combination of the compound X and tepraloxydim;
Combination of the compound X and tralkoxydim;
Combination of the compound X and pinoxaden;
Combination of the compound X and fenoxasulfone;
Combination of the compound X and glufosinate;
Combination of the compound X and glufosinate-ammonium salt;
Combination of the compound X and glufosinate-P;
Combination of the compound X and glufosinate-P-sodium salt;
Combination of the compound X and bialafos;
Combination of the compound X and anilofos;
Combination of the compound X and bensulide;
Combination of the compound X and butamifos;
Combination of the compound X and paraquat;
Combination of the compound X and paraquat-dichloride;

Combination of the compound X and diquat;
Combination of the compound X and diquat-dibromide;
Combination of the compound X and halauxifen;
Combination of the compound X and halauxifen-methyl;
Combination of the compound X and florpyrauxifen;
Combination of the compound X and florpyrauxifen-benzyl;
Combination of the compound X and flumiclorac-pentyl;
Combination of the compound X and fomesafen-sodium salt;
Combination of the compound X and lactofen;
Combination of the compound X and tiafenacil;
Combination of the compound X and acifluorfen-sodium salt;
Combination of the compound X and aclonifen;
Combination of the compound X and bifenox;
Combination of the compound X and chlomethoxyfen;
Combination of the compound X and chlornitrofen;
Combination of the compound X and ethoxyfen-ethyl;
Combination of the compound X and fluorodifen;
Combination of the compound X and fluoroglycofen-ethyl;
Combination of the compound X and fluoronitrofen;
Combination of the compound X and halosafen;
Combination of the compound X and nitrofen;
Combination of the compound X and nitrofluorfen;
Combination of the compound X and oxyfluorfen;
Combination of the compound X and cinidon-ethyl;
Combination of the compound X and profluazol;
Combination of the compound X and pyraclonil;
Combination of the compound X and oxadiargyl;
Combination of the compound X and oxadiazon;
Combination of the compound X and pentoxazone;
Combination of the compound X and fluazolate;
Combination of the compound X and pyraflufen-ethyl;
Combination of the compound X and benzfendizone;
Combination of the compound X and butafenacil;
Combination of the compound X and fluthiacet-methyl;
Combination of the compound X and thidiazimin;
Combination of the compound X and azafenidin;
Combination of the compound X and carfentrazone-ethyl;
Combination of the compound X and sulfentrazone;
Combination of the compound X and flufenpyr-ethyl;
Combination of the compound X and glyphosate;
Combination of the compound X and glyphosate isopropylamine salt;
Combination of the compound X and glyphosate-ammonium salt;
Combination of the compound X and glyphosate-potassium salt;
Combination of the compound X and glyphosate guanidine salt;
Combination of the compound X and glyphosate dimethylamine salt;
Combination of the compound X and glyphosate monoethanolamine salt;
Combination of the compound X and MCPA;
Combination of the compound X and MCPA-dimethylammonium salt;
Combination of the compound X and MCPA-2-ethylhexyl ester;
Combination of the compound X and MCPA-isoctyl ester;
Combination of the compound X and MCPA-sodium salt;
Combination of the compound X and MCPB;
Combination of the compound X and mecoprop;
Combination of the compound X and mecoprop-dimethylammonium salt;
Combination of the compound X and mecoprop-diolamine salt;
Combination of the compound X and mecoprop-ethadyl ester;
Combination of the compound X and mecoprop-2-ethylhexyl ester;
Combination of the compound X and mecoprop-isoctyl ester;
Combination of the compound X and mecoprop-methyl ester;
Combination of the compound X and mecoprop-potassium salt;
Combination of the compound X and mecoprop-sodium salt;
Combination of the compound X and mecoprop-trolamine salt;
Combination of the compound X and mecoprop-P;
Combination of the compound X and mecoprop-P-dimethylammonium salt;
Combination of the compound X and mecoprop-P-2-ethylhexyl ester;
Combination of the compound X and mecoprop-P-isobutyl ester;
Combination of the compound X and mecoprop-P-potassium salt;
Combination of the compound X and dichlorprop;
Combination of the compound X and dichlorprop-butotyl ester;
Combination of the compound X and dichlorprop-dimethylammonium salt;
Combination of the compound X and dichlorprop-2-ethylhexyl ester;
Combination of the compound X and dichlorprop-isoctyl ester;
Combination of the compound X and dichlorprop-methyl ester;
Combination of the compound X and dichlorprop-potassium salt;
Combination of the compound X and dichlorprop-sodium salt;
Combination of the compound X and dichlorprop-P;
Combination of the compound X and dichlorprop-P-dimethylammonium salt;
Combination of the compound X and pyroxasulfone;
Combination of the compound X and dicamba;
Combination of the compound X and dicamba choline salt;
Combination of the compound X and dicamba-BAPMA salt;
Combination of the compound X and dicamba-trolamine salt;
Combination of the compound X and dicamba-diglycolamine salt;
Combination of the compound X and dicamba-dimethylammonium;
Combination of the compound X and dicamba-diolamine salt;
Combination of the compound X and dicamba-isopropylammonium;
Combination of the compound X and dicamba-methyl;
Combination of the compound X and dicamba-olamine salt;
Combination of the compound X and dicamba-potassium salt;
Combination of the compound X and dicamba-sodium salt;
Combination of the compound X and pyroxasulfone;
Combination of the compound X and 2,4-D;
Combination of the compound X and 2,4-D choline salt;
Combination of the compound X and 2,4-D BAPMA salt;
Combination of the compound X and 2,4-D-2-butoxypropyl;
Combination of the compound X and 2,4-D-2-ethylhexyl;
Combination of the compound X and 2,4-D-ammonium;

Combination of the compound X and 2,4-D-butotyl;
Combination of the compound X and 2,4-D-butyl;
Combination of the compound X and 2,4-D-diethylammonium;
Combination of the compound X and 2,4-D-dimethylammonium;
Combination of the compound X and 2,4-D-diolamine salt;
Combination of the compound X and 2,4-D-dodecylammonium;
Combination of the compound X and 2,4-D-ethyl;
Combination of the compound X and 2,4-D-heptylammonium;
Combination of the compound X and 2,4-D-isobutyl;
Combination of the compound X and 2,4-D-isooctyl;
Combination of the compound X and 2,4-D-isopropyl;
Combination of the compound X and 2,4-D-isopropylammonium;
Combination of the compound X and 2,4-D-lithium salt;
Combination of the compound X and 2,4-D-meptyl;
Combination of the compound X and 2,4-D-methyl;
Combination of the compound X and 2,4-D-octyl;
Combination of the compound X and 2,4-D-pentyl;
Combination of the compound X and 2,4-D-propyl;
Combination of the compound X and 2,4-D-sodium salt;
Combination of the compound X and 2,4-D-tefuryl;
Combination of the compound X and 2,4-D-tetradecylammonium;
Combination of the compound X and 2,4-D-triethylammonium;
Combination of the compound X and 2,4-D-tris(2-hydroxypropyl)ammonium; and
Combination of the compound X and 2,4-D-trolamine salt.

In crop cultivation in the present invention, plant nutritional control made in usual crop cultivation can be applied. The fertilizing system may be either one based on Precision Agriculture or traditionally uniform one. Also, nitrogen fixation bacteria and mycorrhizal fungi may be inoculated in combination with seed treatment with the compound group A.

EXAMPLES

The present invention will be explained by way of examples, which are however not intended to be limiting of the present invention.

Firstly, the standard of evaluation of herbicide effects and phytotoxic effects on crops which are described in Examples are shown below.

[Herbicidal Effects and Phytotoxic Effects on Crops]

In the evaluation of herbicidal effects, the conditions of budding and growing of a treated test weed upon measurement are rated between 0 to 100 in which a measured test weed having no or almost no difference in the conditions from an untreated plant is rated as "0" and a measured test weed that is perfectly dried to death or completely suppressed in budding or growth is rated as "100".

In the evaluation of the phytotoxic effects on crops, the case where almost no phytotoxic effect is observed is rated as "no phytotoxicity", the case where a light level of phytotoxicity is observed is "small", the case where a mild level of phytotoxicity is observed is rated as "middle", and the case where a strong level of phtotoxicity is observed is rated as "large".

Example 1

*Amaranthus palmeri* having an Arg128Met mutation in PPO2 is sown in a plastic pot. On the same day, a compound X is applied to the surface of soil in an amount of 10, 20, 40, or 80 g/ha by spraying 200 L/ha of an aqueous dilution containing the compound X. Then, the weeds are cultivated in a greenhouse and soybean seeds are sown after 7 days, to examine the effects on the weeds and phytotoxic effects on soybean after 14 days. A valuable effect on the relevant *Amaranthus palmeri* is confirmed.

Example 2

*Amaranthus palmeri* having an Arg128Met mutation in PPO2 and soybean are sown in a plastic pot. On the same day, a compound X is applied to the surface of soil in an amount of 10, 20, 40, or 80 g/ha by spraying 200 L/ha of an aqueous dilution containing the compound X. Then, the weeds and soybean are cultivated in a greenhouse to examine the effects on the weeds and phytotoxic effects on soybean after 21 days. A valuable effect on the relevant *Amaranthus palmeri* is confirmed.

Example 3

*Amaranthus palmeri* having an Arg128Met mutation in PPO2 and soybean are sown in a plastic pot. Then, the weeds and soybean are cultivated in a greenhouse. A compound X is applied in an amount of 10, 20, 40, or 80 g/ha by spraying 200 L/ha of an aqueous dilution containing the compound X to perform foliar treatment 21 days after the sowing. Then, the weeds and soybean are cultivated in a greenhouse to examine the effects on the weeds and phytotoxic effects on soybean 14 days after the treatment. A valuable effect on the relevant *Amaranthus palmeri* is confirmed.

Examples 4 to 6

The same procedures as in Examples 1 to 3 are performed except that the above *Amaranthus palmeri* used in Examples 1 to 3 is altered to *Amaranthus palmeri* having an Arg128Gly mutant in PPO2.

Examples 7 to 9

The same procedures as in Examples 1 to 3 are performed except that the above *Amaranthus palmeri* used in Examples 1 to 3 is altered to *Amaranthus palmeri* having an Arg128His mutant in PPO2.

Examples 10 to 12

The same procedures as in Examples 1 to 3 are performed except that the above *Amaranthus palmeri* used in Examples 1 to 3 is altered to *Amaranthus palmeri* having a Gly399Ala mutant in PPO2.

Examples 13 to 24

The same procedures as in Examples 1 to 12 are performed except that the above *Amaranthus palmeri* used in Examples 1 to 12 is altered to waterhemp.

Examples 25 to 36

The same procedures as in Examples 1 to 12 are performed except that the above *Amaranthus palmeri* used in Examples 1 to 12 is altered to ragweed.

Examples 37 to 48

The same procedures as in Examples 1 to 12 are performed except that the above *Amaranthus palmeri* used in Examples 1 to 12 is altered to *Lolium rigidum* or *Lolium multiflorum*.

Examples 49 to 96

The same procedures as in Examples 1 to 48 are performed except that the compound X used in Examples 1 to 48 is altered to Saflufenacil.

Examples 97 to 144

The same procedures as in Examples 1 to 48 are performed except that the treatment using 10, 20, 40, or 80 g/ha of the compound X used in Examples 1 to 48 is altered to treatment using 20, 40, 80, or 160 g/ha of trifludimoxazin.

Examples 145 to 192

The same procedures as in Examples 97 to 144 are performed except that the trifludimoxazin used in Examples 97 to 144 is altered to flumioxazin.

Examples 193 to 240

The same procedures as in Examples 1 to 48 are performed except that the treatment using 10, 20, 40, or 80 g/ha of the compound X used in Examples 1 to 48 is altered to treatment using a combination of saflufenacil+trifludimoxazin in amounts of 10+160 g/ha, 20+160, 40+160, 80+160 g/ha, 10+80 g/ha, 20+80, 40+80, 80+80 g/ha, 10+40 g/ha, 20+40, 40+40, 80+40 g/ha, 10+20 g/ha, 20+20, 40+20, or 80+20 g/ha.

Examples 241 to 288

The same procedures as in Examples 1 to 48 are performed except that the treatment using 10, 20, 40, or 80 g/ha of the compound X used in Examples 1 to 48 is altered to treatment using a combination of the compound X+flumioxazin in amounts of 10+160, 20+160, 40+160, 80+160, 10+80, 20+80, 40+80, 80+80, 10+40, 20+40, 40+40, 80+40, 10+20, 20+20, 40+20, or 80+20 g/ha.

Examples 289 to 576

The same procedures as in Examples 1 to 288 are performed except that RoundupPowerMax (glyphosate-potassium salt, 660 g/L) is further added in an amount of 32 fluid ounce/acre (1543 g/ha as a glyphosate-potassium salt) in each treatment of Examples 1 to 288.

Examples 577 to 864

The same procedures as in Examples 1 to 288 are performed except that XtendiMax (dicamba diglycol amine salt, 480 g/L) is further added in an amount of 1 pint/acre (560 g/ha as a dicamba glycol amine salt) in each treatment of Examples 1 to 288.

Examples 865 to 1152

The same procedures as in Examples 1 to 288 are performed except that 32 fluid ounce/acre of RoundupPowerMax and 1 pint/acre of XtendiMax are further added in each treatment of Examples 1 to 288.

Examples 1153 to 2304

The same procedures as in Examples 1 to 1152 are performed except that soybean used in Examples 1 to 1152 is altered to corn or cotton.

Examples 2305 to 4608

The same procedures as in Examples 1 to 2304 are performed except that the crop used in Examples 1 to 2304 is altered to a crop modified by gene recombination to have both a Roundup Ready 2 Xtend trait and a PPO inhibitor tolerant trait imparted by the presence of an exotic PPO deteriorated in compatibility with an applied PPO inhibitor to a PPO existing in the crop.

INDUSTRIAL APPLICABILITY

Herbicide resistant weeds in a crop cultivation area can be efficiently controlled by the method of controlling herbicide resistant weeds according to the present invention.

The invention claimed is:

1. A method of controlling herbicide resistant weeds, the method comprising:
   treating the weeds with a composition comprising herbicidal active ingredients consisting of saflufenacil and glyphosate-potassium salt,
   wherein the weeds are resistant to PPO inhibitor and glyphosate,
   an application amount of saflufenacil is from 10 to 80 g per 10000 m$^2$, and
   a weight ratio of saflufenacil to glyphosate-potassium salt is from 1:154.3 to 8:154.3.

* * * * *